United States Patent
Kim et al.

(10) Patent No.: US 8,409,768 B2
(45) Date of Patent: Apr. 2, 2013

(54) TUNING OF FE CATALYSTS FOR GROWTH OF SPIN-CAPABLE CARBON NANOTUBES

(75) Inventors: Jae Hak Kim, Plano, TX (US); Gil Sik Lee, Lewisville, TX (US); Kyung Hwan Lee, Dallas, TX (US); Lawrence J. Overzet, Richardson, TX (US)

(73) Assignee: Board of Regents, The University of Texas Systems, Austin, TX (US)

( * ) Notice: Subject to any disclaimer, the term of this patent is extended or adjusted under 35 U.S.C. 154(b) by 0 days.

(21) Appl. No.: 12/902,392

(22) Filed: Oct. 12, 2010

(65) Prior Publication Data

US 2011/0086464 A1  Apr. 14, 2011

Related U.S. Application Data

(60) Provisional application No. 61/250,827, filed on Oct. 12, 2009.

(51) Int. Cl.
- B82Y 30/00 (2011.01)
- B82Y 40/00 (2011.01)
- C01B 31/02 (2006.01)
- D01F 9/127 (2006.01)

(52) U.S. Cl. ........ 429/528; 977/755; 977/742; 427/113; 423/447.2; 423/447.3; 429/532; 429/231.8

(58) Field of Classification Search .......... 438/82; 429/532; 977/752, 844; 427/113
See application file for complete search history.

(56) References Cited

U.S. PATENT DOCUMENTS

| | | | |
|---|---|---|---|
| 2004/0070393 A1* | 4/2004 | Sarfaty et al. | 324/230 |
| 2007/0243124 A1* | 10/2007 | Baughman et al. | 423/447.1 |
| 2008/0170982 A1 | 7/2008 | Zhang et al. | |
| 2008/0231413 A1* | 9/2008 | Bertin et al. | 338/118 |
| 2009/0238996 A1* | 9/2009 | Nakano et al. | 427/569 |
| 2010/0173228 A1* | 7/2010 | Wallace et al. | 429/532 |
| 2010/0206362 A1* | 8/2010 | Flood | 136/252 |
| 2010/0276072 A1* | 11/2010 | Shah et al. | 156/184 |

FOREIGN PATENT DOCUMENTS

WO  2008/070926  *  6/2008

OTHER PUBLICATIONS

Baughman RH, et al., Carbon nanotubes—the route toward applications, Science 2002 297:787-792.
Cantoro M, et al., Effects of pre-treatment and plasma enhancement on chemical vapor deposition of carbon nanotubes from ultra-thin catalyst films, Diamond Relat Mater 2006 15:1029-1035.
Chakrabarti S, et al., Number of walls controlled synthesis of millimeter-long verticaily aligned brushlike carbon nanotubes, J Phys Chem C 2007 111:1929-1934.

(Continued)

Primary Examiner — Olik Chaudhuri
Assistant Examiner — Wilner Jean Baptiste
(74) Attorney, Agent, or Firm — Greenberg Traurig, LLP

(57) ABSTRACT

Growing spin-capable multi-walled carbon nanotube (MWCNT) forests in a repeatable fashion will become possible through understanding the critical factors affecting the forest growth. Here we show that the spinning capability depends on the alignment of adjacent MWCNTs in the forest which in turn results from the synergistic combination of a high areal density of MWCNTs and short distance between the MWCNTs. This can be realized by starting with both the proper Fe nanoparticle size and density which strongly depend on the sheet resistance of the catalyst film. Simple measurement of the sheet resistance can allow one to reliably predict the growth of spin-capable forests. The properties of pulled MWCNTs sheets reflect that there is a relationship between their electrical resistance and optical transmittance. Overlaying either 3, 5, or 10 sheets pulled out from a single forest produces much more repeatable characteristics.

23 Claims, 79 Drawing Sheets

OTHER PUBLICATIONS

Cheng Q, et al., Fabrication and properties of aligned multi-walled carbon nanotube-reinforced epoxy composites, J Mater Res 2008 23:2975-2983.

Futaba DN, et al, 84% catalyst activity of water-assisted growth of single walled carbon nanotube forest characterization by a statistical and macroscopic approach, J Phys Chem B 2006 110:8035-8038.

Gruner G, Carbon nanotube films for transparent and plastic electronics, J Mater Chem 2006 16:3533-3539.

Hofmann S, et al., Effects of catalyst film thickness on plasma-enhanced carbon nanotube growth, J Appl Phys 2005 98:034308.

Jiang K, et al., Spinning continuous carbon nanolube yarns, Nature 2002;419:801.

Kaempgen M, et al., Transparent carbon nanotube coatings, Appl Surf Sci 2005 252:425-429.

Li Q, et al., Structure-dependent electrical properties of carbon nanotube fibers, Adv Mater 2007 19:3358-3363.

Li Q, et al., Sustained growth of ultralong carbon nanotube arrays for fiber spinning, Adv Mater 2006 18:3160-3163.

Liu H, et al., Controlled growth of Fe catalyst film for synthesis of vertically aligned carbon nanotubes by glancing angle deposition, Surf Coat Technol 2006 201, 938-942.

Liu K, et aL, Controlled growth of super-aligned carbon nanotube arrays for spinning continuous unidirectional sheets with tunable physical properties, Nano Lett 2008 8:700-705.

Nessim GD, et al., Tuning of vertically-aligned carbon nanotube diameter and areal density through catalyst pre-treatment, Nano Lett 2008 8:3587-3593, 15.

Nishimura K, et al., In situ study of iron catalysts for carbon nanotube growth using x-ray diffraction analysis, Jpn J Appl Phys 2004 43:L471-L474.

Patole SP, et al., Alignment and wall control of ultra long carbon nanotubes in water assisted chemical vapour deposition, J Phys D: Appl Phys 2008 41:155311.

Perez-Cabero M. et al., The role of alpha-iron and cementite phases in the growing mechanism of carbon nanotubes: a 57Fe Mössbauer spectroscopy study, Phys Chem Chem Phys 2006 8:1230-1235.

Pisana S, et al., The role of precursor gases on the surface restructuring of catalyst films during carbon nanotube growth, Physica E 2007 37:1-5.

Ulbricht R, Polymeric solar cells with oriented and strong transparent carbon nanotube anode, Phys Stat Sol B 2006 243:3528-3532.

Wang Y, et al., Comparison study of catalyst nanoparticle formation and carbon nanotube growth: Support effect, J Appl Phys 2007 101:124310.

Zhang G. et al., Ultra-high-yield growth of vertical single-wailed carbon nanotubes: hidden roles of hydrogen and oxygen, Proc Nati Acad Sci USA 2005 102:16141-16145.

Zhang M, et al., Multifunctional carbon nanotube yarns by downsizing an ancient technology, Science 2004 306:1358-1361.

Zhang M, et al., Strong, transparent, multifunctional, carbon nanotube sheets, Science 2005 309:1215-1219.

Zhang X, et al., Spinning and processing continuous yarns from 4-inch wafer scale super-aligned carbon nanotube arrays, Adv Mater 2006 18:1505-1510.

Zhang X, et al., Strong carbon-nanotube fibers spun from long carbon-nanotube arrays, Small 2007 3:244-248.

Zhao B, et al., Exploring advantages of diverse carbon nanotube forests with tailored structures synthesized by supergrowth from engineered catalysts, Acs Nano 2009 3:108-114.

* cited by examiner

Fe films

TUNING OF FE CATALYSTS FOR GROWTH OF SPIN-CAPABLE CARBON NANOTUBES

CROSS-REFERENCE TO RELATED PATENT APPLICATION

This Application for Patent claims the benefit of priority from U.S. Provisional Patent Application Ser. No. 61/250,827, filed Oct. 12, 2009, entitled "Tuning Of Fe Catalysts For Growth Of Spin-Capable Carbon Nanotubes," which provisional patent application is commonly assigned to the assignee of the present invention, and which disclosure is considered part of and is incorporated by reference in its entirety in the disclosure of this application.

BACKGROUND

1. Field of Invention

The present invention is a new process for growing spin-capable multi-walled nanotube (MWCNT) forests in a repeatable fashion.

2. Background of the Invention

Since the discovery that one can directly pull multi-walled carbon nanotubes (MWCNTs) into the forms of sheets and/or yarns from forests [Jiang K, Li Q, Fan S. Spinning continuous carbon nanotube yarns. Nature 2002; 419:801 ("Jiang 2002")], the majority of research effort has been focused on the physical, mechanical and electrical properties of these MWCNT yarns and sheets as well as their various applications [Zhang M, Atkinson K R, Baughman R H. Multifunctional carbon nanotube yarns by downsizing an ancient technology. Science 2004 306:1358-1361 ("M Zhang 2004"); Zhang X, Jiang K, Feng C, Liu P, Zhang L, Kong J, et al. Spinning and processing continuous yarns from 4-Inch wafer scale super-aligned carbon nanotube arrays. Adv Mater 2006 18:1505-1510 ("X Zhang 2006"); Zhang X, Li Q, Tu L, Li Y, Coulter J Y, Zheng L, et al. Strong carbon-nanotube fibers spun from long carbon-nanotube arrays. Small 2007 3:244-248 ("X Zhang 2007"); Li Q, Li Y, Zhang X, Chikkannanavar S B, Zhao Y, Dangelewicz A M, et al. Structure-dependent electrical properties of carbon nanotube fibers. Adv Mater 2007 19:3358-3363 ("Li 2007"); Liu K, Sun Y, Chen L, Feng C, Feng X, Jiang K, et al. Controlled growth of super-aligned carbon nanotube arrays for spinning continuous unidirectional sheets with tunable physical properties. Nano Lett 2008 8:700-705 ("Liu 2008")]. In particular, many applications have been demonstrated that are only possible because of the unique properties of CNTs [Baughman R H, Zakhidov A A, de Heer W A. Carbon nanotubes—the route toward applications. Science 2002 297:787-792 ("Baughman 2002")]. These potential applications are widespread and include transparent electrodes, flexible displays and composite materials [Baughman 2002; Zhang M, Fang S, Zakhidov A A, Lee S B, Aliev A E, Willaims C D, et al. Strong, transparent, multifunctional, carbon nanotube sheets. Science 2005 309:1215-1219 ("M Zhang 2005"); Ulbricht R. Polymeric solar cells with oriented and strong transparent carbon nanotube anode. Phys Stat Sol B 2006 243:3528-3532; Gruner G. Carbon nanotube films for transparent and plastic electronics. J Mater Chem 2006 16:3533-3539; Kaempgen M, Duesberg G S, Roth S. Transparent carbon nanotube coatings. Appl Surf Sci 2005 252:425-429; Cheng Q, Wang J, Jiang K, Li Q, Fan S. Fabrication and properties of aligned multi-walled carbon nanotube-reinforced epoxy composites. J Mater Res 2008 23:2975-2983].

Applicant believes much less research effort has centered on the critical growth factors that determine whether or not the MWCNTs in a forest can be pulled or spun. These factors remain somewhat obscure to date because only a few research groups [Jiang 2002; M Zhang 2004; X Zhang 2006; X Zhang 2007] have actively investigated the protocols to grow "spin-capable" MWCNTs over the past half decade. While those groups have used different growth conditions (catalysts, gases and temperatures) the data and understanding still need improvement. For example: while it is well known that MWCNTs will grow on Fe or $Al_2O_3$/Fe using ethylene or acetylene as a carbon source and argon, helium, and/or hydrogen as the carrier gas, the most important factors for growing spin-capable forests are not well known. These still need to be investigated further. Some reports [Jiang 2002; X Zhang 2006; Li 2007; Liu 2008, Li Q, Zhang X, DePaula R F, Zheng L, Zhao Y, Stan L, et al. Sustained growth of ultralong carbon nanotube arrays for fiber spinning Adv Mater 2006 18:3160-3163] suggest that the spinning capabilities of MWCNT forests result when the CNTs in the forest become "super-aligned" arrays. The idea is that the CNTs must be very well aligned parallel to one another and in addition have a high density in the forest.

Further study also indicates that super-aligned CNTs are generally formed when there is a high CNT nucleation density (or high density of catalyst nanoparticle sites) [Liu 2008; Nessim G D, Hart A J, Kim J S, Acquaviva D, Oh J, Morgan C D, et al. Tuning of vertically-aligned carbon nanotube diameter and areal density through catalyst pre-treatment. Nano Lett 2008 8:3587-3593, 15; Futaba D N, Hata K, Namai T, Yamada T, Mizuno K, Hayamizu Y, et al. 84% catalyst activity of water-assisted growth of single walled carbon nanotube forest characterization by a statistical and macroscopic approach. J Phys Chem B 2006 110:8035-8038]. As a consequence, there have been some significant efforts to increase the nucleation density by controlling both the size and size distribution of Fe catalyst nanoparticles through various methods. These methods have included gas-assisted pretreatment methods [Cantoro M, Hofmann S, Pisana S, Ducati C, Parvez A, Ferrari A C, et al. Effects of pre-treatment and plasma enhancement on chemical vapor deposition of carbon nanotubes from ultra-thin catalyst films. Diamond Relat Mater 2006 15:1029-1035; Zhang G, Mann D, Zhang L, Javey A, Li Y, Yenilmez E, et al. Ultra-high-yield growth of vertical single-walled carbon nanotubes: hidden roles of hydrogen and oxygen. Proc Natl Acad Sci USA 2005 102:16141-16145; Pisana S, Cantoro M, Parvez A, Hofmann S, Ferrari A C, Robertson J. The role of precursor gases on the surface restructuring of catalyst films during carbon nanotube growth. Physica E 2007 37:1-5] the use of various catalysts [Wang Y, Luo Z, Li B, Ho P S, Yao Z, Shi L, et al. Comparison study of catalyst nanoparticle formation and carbon nanotube growth: Support effect. J Appl Phys 2007 101:124310 ("Wang 2007"); Hofmann S, Cantoro M, Kleinsorge B, Casiraghi C, Parvez A, Robertson J, et al. Effects of catalyst film thickness on plasma-enhanced carbon nanotube growth. J Appl Phys 2005 98:034308], and the optimization of the catalyst film thickness [Chakrabarti S, Kume H, Pan L, Nagasaka T, Nakayama Y. Number of walls controlled synthesis of millimeter-long vertically aligned brushlike carbon nanotubes. J Phys Chem C 2007 111:1929-1934; Patole S P, Alegaonkar P S, Shin H C, Yoo J B. Alignment and wall control of ultra long carbon nanotubes in water assisted chemical vapour deposition. J Phys D: Appl Phys 2008 41:155311].

It is therefore important to study how the nucleation density is affected by controlling the size and size distribution of Fe catalyst particles and optimizing gas flow rates used in the growth of CNTs. This information is valuable in determining optimal conditions for developing super-aligned arrays of CNTs as well as improving the ability to pull CNTs out from CNT forests. Understanding the mechanism by which super-aligned arrays and high nucleation density can be achieved is critical for controlling and stabilizing the growth process for the spinning CNTs as well as providing a bigger opportunity ranging from academic research to commercial applications of the CNT sheets and yarns.

SUMMARY OF THE INVENTION

The present invention is a new process for growing spin-capable multi-walled nanotube forests in a repeatable fashion.

In the present invention, Applicant has identified roles that the Fe catalyst film and carrier gas play in setting the alignment, the nucleation density, the CNT diameter, and the "spinning capability" of MWCNT forests. Applicant has also shown that a sheet resistance measurement is a method of measuring the iron catalyst film thickness and can be used to predict whether the catalyst film will be suitable for growing a forest that is spin-capable.

It has been found that growing spin-capable multi-walled carbon nanotube (MWCNT) forests in a repeatable fashion can be realized by starting with both the proper Fe nanoparticle size and density which strongly depend on the sheet resistance of the catalyst film, annealing time, and gas conditions. A measurement of the sheet resistance of Fe catalyst film can allow one to reliably predict the growth of spin-capable forests.

In general, in one aspect, the invention features a method to measure the suitability of a catalyst film for growing spinable carbon nanotube (CNT) forest that includes:

An Fe catalyst film having a sheet resistance in the range of about 10 k$\Omega$/square [~3 nm] to about 1 M$\Omega$/square [~9 nm] is deposited on a thermal-oxidized silicon substrate, and the conductivity, sheet resistance, resistivity of said film is measured. Then the catalyst-incorporated substrate is put on a heater block in a chemical vapor deposition (CVD) chamber, the heater block is heated up to a temperature (780° C.) for the growth of CNT forest under a gas mixture of hydrogen (100 sccm) and helium (20 slm) as a carrier, and the substrate is held in the CVD chamber at the temperature for the growth of CNT forest during 0~30 minutes under the carrier gases. A gas mixture consisting of acetylene (700 sccm) as a CNT-forming precursor and the carrier gases is supplied during 1~30 minutes for the growth of the spin-capable CNT forest on the substrate such that the CNT forest are very well aligned in a direction perpendicular to said substrate. A bundle of CNTs is pulled out from the CNT forest, forming CNT sheets or yarns comprised of the CNT bundles which are entangled end to end, in which the CNTs are mostly oriented parallel to each other along the drawing direction.

The physical, mechanical and electrical properties of MWCNT yarns and sheets as well as their various applications including electrodes, flexible displays and composite materials have been studied because of the unique properties of CNTs including long ballistic conduction. As-formed sheets or yarns pulled out from the forest can be applied to the electrodes for solar cells, LEDs, fuel cells, and lithium batteries by incorporating the sheets or yarns into the device.

In general, in another aspect, the invention features a method for forming a hole conducting layer with CNTs in a photovoltaic cell including:

An electron-collecting electrode having aluminum deposited on a substrate, photoactive layer, which is made of a conjugated polymer, preferably a polythiophene derivative, as an electron donor and a functionalized fullerene derivatives, including PCBM as an electron acceptor, is coated onto the electron-collecting electrode, a hole conducting layer, which is laid a hole conducting material such as PEDOT, ITO and p-type transparent metal oxides over CNT sheets (or yarns) and on the contrary, is formed on the photoactive layer, and finally a hole-collecting electrode is formed on the hole conducting layer.

Compared with conventional methods in fabrication of solar cell, the present invention is contrary to the conventional methods in the manufacturing sequence. This leads to an easier preparation of large-area flexible solar cells because the CNT sheets can be continuously pulled from the forest and put on a sub-layer. Furthermore, the sheets or yarns can be electro-deposited with metal oxide, forming CNT sheets or yarns encapsulated by metal oxides comprised of coaxial metal oxide/CNT sheets or yarns. The coaxial sheets or yarns can be incorporated into the hole conducting layer or photoactive layer in solar cells, and also employed as an electrode of fuel cells and lithium batteries.

In general, in one aspect, the invention features a method that includes depositing a catalyst film on a substrate to form a catalyst-incorporated substrate. The catalyst film has a sheet resistance in the range of about 10 k$\Omega$/square to about 1 M$\Omega$/square. The method further includes measuring the conductivity, sheet resistance, and resistivity of the catalyst film. The method further includes growing a CNT forest on the catalyst-incorporated substrate. The method further includes pulling out a bundle of CNTs from said CNT forest. The method further includes forming a CNT sheet or yarn.

Implementations of the invention can include one or more of the following features:

The step of measuring can include using a four-point probe.

The step of measuring can include using an eddy current probe.

The catalyst film can include iron. The sheet resistance of the catalyst film can be in the range of about 10 k$\Omega$/square to about 1 M$\Omega$/square.

The substrate can include an oxidized material of silicon, a metal, a metal oxide, glass, or a combination thereof.

The catalyst film can include an iron deposited on the substrate by an electron-beam evaporation process, a sputtering process, or a chemical vapor deposition process.

The bundle of CNTs can include multi-walled CNTs.

The step of growing the CNT forest can include putting the catalyst-incorporated substrate on a heater block in a chemical vapor deposition (CVD) chamber. The step of growing the CNT forest can further include heating the CVD chamber up to a temperature for the growth of CNT forest. The step of growing the CNT forest can further include holding the substrate in the CVD chamber at the temperature for the growth of CNT forest. The step of growing the CNT forest can further include providing a gas mixture consisting of CNT-forming precursors and carrier gases. The step of growing the CNT forest can further include growing the CNT forest on the substrate such that the CNT forest are substantially aligned in a direction perpendicular to the substrate.

The hold temperature of the heater block in the CVD chamber can be between room temperature and the temperature for the growth of CNT forest.

The temperature for the growth of the CNT forest can be between about 650° C. and about 850° C.

The heating rate up to the temperature for the growth of CNT forest can be between about 10° C./minute and about 1000° C./minute.

The substrate that is heated up to the temperature for the growth of CNT forest can stay less than 30 minutes in carrier gases.

Before growing the CNT forest, carrier gases can be supplied into the CVD chamber.

The CNT-forming precursor can include acetylene. The carrier gases can include hydrogen and an inert gas.

The inert gas can be helium, nitrogen, or argon.

The flow rate of the acetylene can be between about 200 sccm and about 1000 sccm. The flow rate of the hydrogen can be between about 50 sccm and about 1000 sccm. The flow rate of the inert gas can be between about 1 slm and 30 slm.

The CNTs of the bundle of CNTs can include multi-walled CNTs that are entangled end to end. The multi-walled CNTs can be substantially parallel to each other along the drawing direction.

In general, in another aspect, the invention features a method of forming a hole conducting layer in a photovoltaic cell that includes forming a first electrode. The method further includes forming an electron donor/acceptor composite layer. The method further includes forming a hole conducting layer stacked with a hole conducting material over CNT sheets or yarns. The method further includes forming a second electrode on the contrary.

Implementations of the invention can include one or more of the following features:

The hole conducting material can be poly(3,4-ethylenedioxythiophene)-poly(styrenesulfonate), indium tin oxide (ITO) or a p-type transparent metal oxide.

The p-type transparent metal oxide can have a work function of over 4.5 eV.

The p-type transparent metal oxide can be iron oxide, nickel oxide, tin oxide, vanadium oxide, zinc oxide, or a combination.

The CNT bundles in the CNT sheet or yarn can be substantially aligned in the same direction or cross each other perpendicularly.

The hole conducting layer can be a triple-layer in which the CNT sheets or yarns is laid between the hole conducting materials.

In general, in another aspect, the invention features a method of incorporating a hole conducting material into an electron donor/acceptor composite layer in a photovoltaic cell. The method includes forming a first donor/acceptor composite. The method further includes forming a hole conducting layer that includes CNT sheets. The CNTs are encapsulated by metal oxides that include metal oxide/CNT sheet composites. The method further includes forming a second donor/acceptor composite.

Implementations of the invention can include one or more of the following features:

The metal oxide can be a p-type transparent metal oxide with work function of over 4.5 eV.

The p-type transparent metal oxide can be iron oxide, nickel oxide, tin oxide, vanadium oxide or zinc oxide.

The metal oxide can be a transition metal oxide.

The metal oxide can be coated onto the CNTs by a sputtering process, an electro-deposition process, a chemical vapor deposition (CVD) process, or a combination thereof.

The CNTs can be encapsulated by metal oxides by a process that includes coating a metal onto the CNTs. The process that includes coating a metal onto the CNT can be a sputtering process, an electro-deposition process, a CVD process, or a combination thereof. The step of oxidizing the metal can use oxidants.

The oxidants can be oxygen, ozone, hydrogen peroxide, or nitric acid.

In general, in another aspect, the invention features a method of manufacturing an anode for fuel cells and lithium batteries. The method includes pulling out a bundle of CNTs from said CNT forest. The method further includes forming CNT sheets. The method further includes forming metal oxide/CNT sheet composites that include CNT sheets. The CNTs are encapsulated by metal oxides.

Implementations of the invention can include one or more of the following features:

The metal oxide can include a transition metal oxide.

The transition metal oxide can be manganese oxide, nickel oxide, cobalt oxide or iron oxide.

The metal oxide can be coated onto the CNTs by a sputtering process, an electro-deposition process, a chemical vapor deposition (CVD) process, or a combination thereof.

The CNTs can be encapsulated by metal oxides by a process that includes coating a metal onto the CNTs. The process that includes coating a metal onto the CNT can be a sputtering process, an electro-deposition process, a CVD process, or a combination thereof. The step of oxidizing the metal can use oxidants.

The oxidants can be oxygen, ozone, hydrogen peroxide, or nitric acid.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 1A shows $R_s$ measurements of various Fe films. The thickness listed is obtained from the quartz-crystal sensor during deposition. FIG. 1B shows a wafer map of the sheet resistance on the 5 nm thick Fe film [k$\Omega$/sq]. Each chip is approximately 1×0.7 cm$^2$.

FIG. 2A is a histogram showing the length of pulled CNT sheets vs. $R_s$ of the Fe catalyst films. Each bar represents the spinning length when a CNT sheet is pulled out of the forest. (The bar 201 denotes the spinning length when the sheet was pulled at the first trial, bar 202 denotes the second, bar 203 denotes the third, and bar 204 denotes the fourth.) The x-axis scale has both the $R_s$ (upper) and quartz crystal monitor thickness (lower). FIG. 2B is a picture showing a 1 m long sheet 205.

FIG. 2C is a plot of sheet resistance versus Fe film thickness by AFM for as-deposited films.

FIG. 7A is a plot for single layer MWCNT sheets from forests grown on various Fe films. FIG. 7B is a plot for multi-sheets from the Fe catalyst film of 162 kΩ/sq.

FIG. 21A is a top view of a one-dimensional structure. FIG. 21B is a top view of a two-dimensional structure. FIG. 21C is a side view of the two-dimensional structure of FIG. 21B.

DETAILED DESCRIPTION

The present invention is a new process for growing spin-capable multi-walled nanotube forests in a repeatable fashion.

While the making and/or using of various embodiments of the present invention are discussed below, it should be appreciated that the present invention provides many applicable inventive concepts that may be embodied in a variety of specific contexts. The specific embodiments discussed herein are merely illustrative of specific ways to make and/or use the invention and are not intended to delimit the scope of the invention.

Materials and Preparation of Samples

CNTs were grown from iron films, which were deposited on Si substrates with an oxidized layer of thickness 400 nm by electron-beam evaporation. The thickness of the Fe thin film was varied in the range of 3~7 nm and was monitored by a quartz crystal sensor fixed inside the e-beam evaporation chamber. MWCNT growth was performed in a quartz and stainless steel cylindrical CVD chamber at atmospheric pressure using flows of $C_2H_2$ (acetylene) and He gas either with or without $H_2$ gas. The iron films were introduced into the CVD chamber and ramped to the set point temperature of 780° C. at a ramping rate of 50° C./min while flowing He (20 slm) and $H_2$ (100 sccm). The growth of CNTs was carried out at the same temperature and pressure by adding acetylene gas (700 sccm) to the flow for 5 min. The acetylene gas flow was turned off and the sample was cooled to below 100° C. with the He gas flow continuing. The CNT sheets were spun from CNT forests with a rod rotating once and drawing at ~1 m/min.

When investigating the surface morphology and size of iron particles, the iron films were introduced into the same CVD chamber and ramped to the set point temperature of 780° C. while flowing He (20 slm) with or without $H_2$ (100 sccm), and then allowed to cool below 100° C.

Figure 11A:
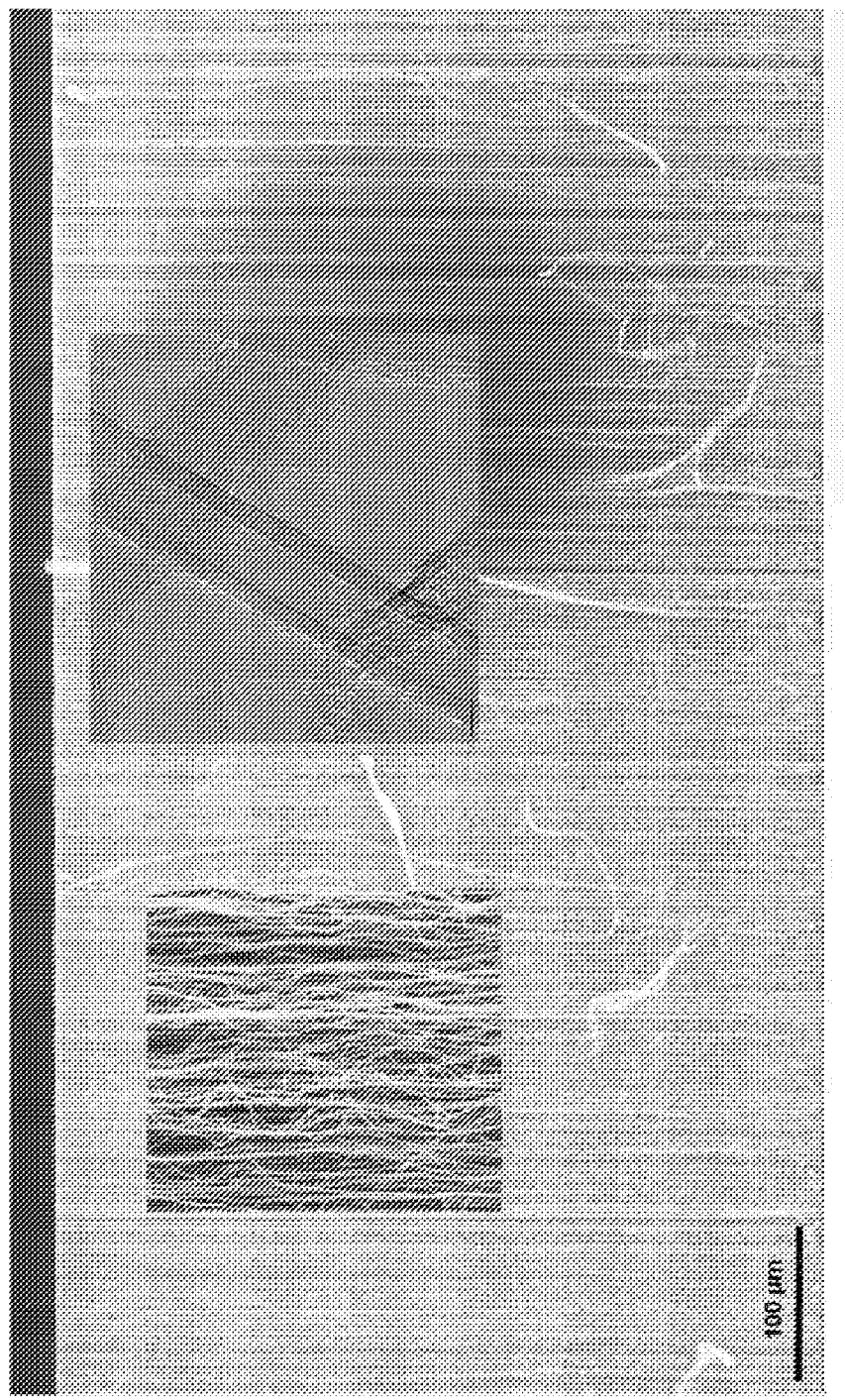
FIG. 11A are TEM images of multi-walled carbon nanotubes grown on an iron film.

FIG. 11A are TEM images of multi-walled carbon nanotubes grown on an iron film. The growth height is 420 μm during the 5 minute growth period. The growth rate was 1.4 μm/sec. The MWCNT area density was $1.1 \times 10^{11}$ tubes per square centimeter.

Figure 11B:
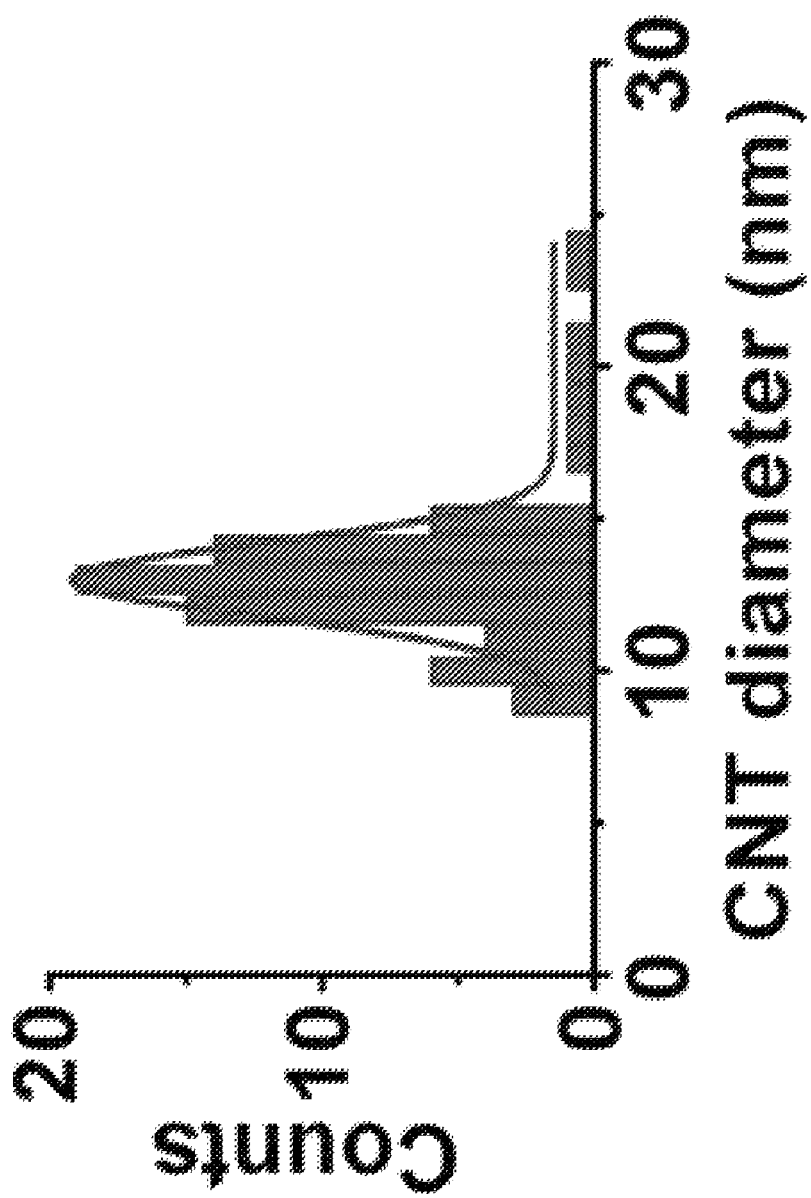
FIG. 11B is a histogram of the average diameter and the standard deviation of the MWCNTs in this film.
Figure 11C:
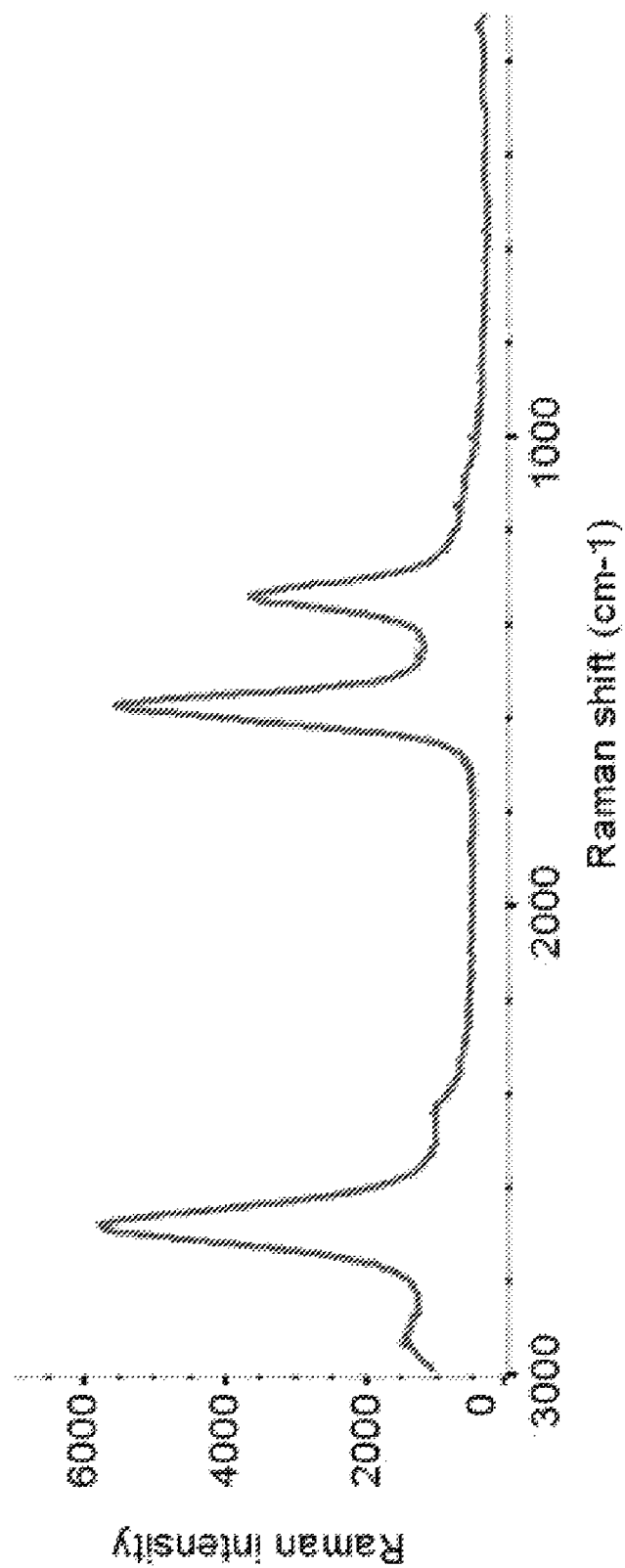
FIG. 11C is a plot of Raman intensity versus Raman shift for this film.

FIG. 11B is a histogram of the average diameter (13.0 nm) and the standard deviation (1.3 nm) of the MWCNTs in this film. FIG. 11C is a plot of Raman intensity versus Raman shift for this film ($I_G/I_D$=1.76).

Measurements

Scanning electron microscopy (SEM) and transmission electron microscopy (TEM) images were taken using a Zeiss Supra-40 and a FEI Tecnai-G2 instruments, respectively. The TEM specimens were prepared by dispersing the CNTs in methanol and placing a few drops onto TEM copper micro grids. Raman spectroscopy was performed using a Nicolet Almega XR dispersive Raman spectrometer with 532-nm excitation wavelength. Atomic force microscopy was carried out using a Veeco Dimension 3100. The sheet resistance of as-deposited iron films was measured using an ALESSI 4-point probe. The areal density of CNTs was calculated by directly counting the holes resulting from pulling out CNTs from the substrate.

Electrical measurements of the CNT sheets pulled from forests were conducted using the 4-point probe method at room temperature. The MWCNT sheets pulled from ~400 um tall CNT forests were transferred onto glass substrates. Four copper tape electrodes were attached for a 4-point probe measurement. The sheets tested here were between 4 and 10 mm in width and between 8 and 14 mm in length. The sheet resistance of CNT sheets is defined as RW/L (R=measured resistance, W=sheet width, and L=sheet length).

The Growth of Spin-Capable MWCNTs

Figure 1A:
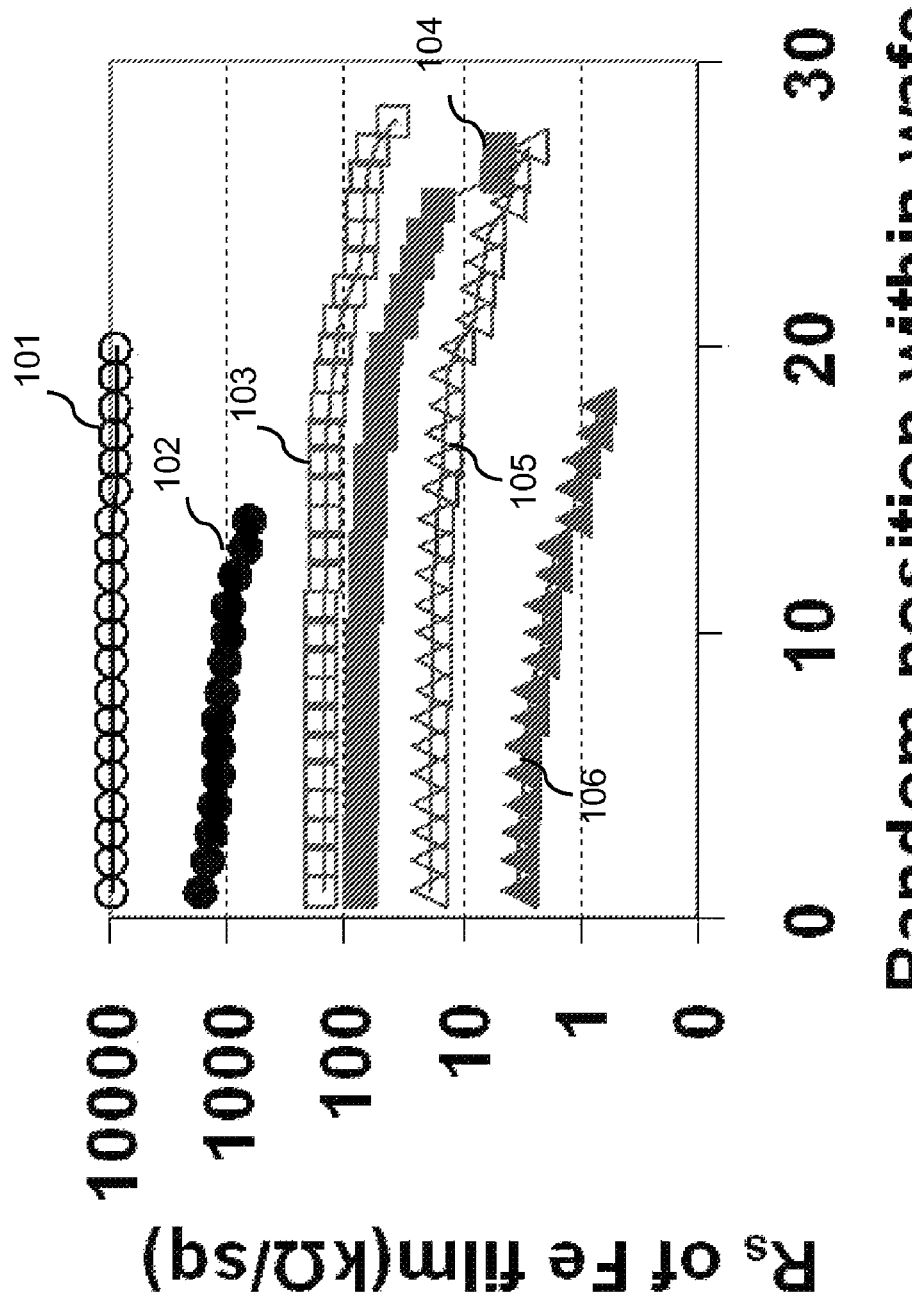
FIGS. 1A-1B show the sheet resistance of Fe films.
Figures 1, 4A:
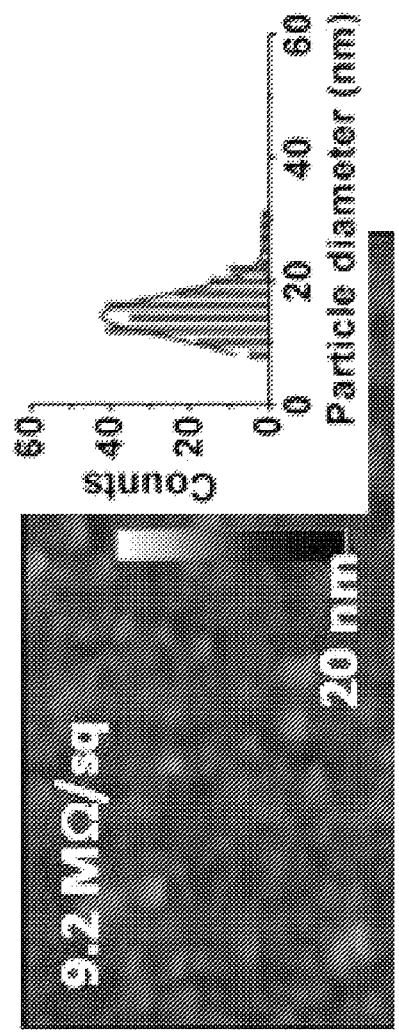
FIGS. 4A-4G are AFM (*-1) and SEM (*-2) images showing the surface morphology of annealed Fe films with sheet resistance. The scale bar is the same in AFM and SEM images, respectively. Histograms of the Fe nanoparticle size distributions as a function of $R_s$ are also shown in FIGS. 4A-4G.
Figures 2, 4A:
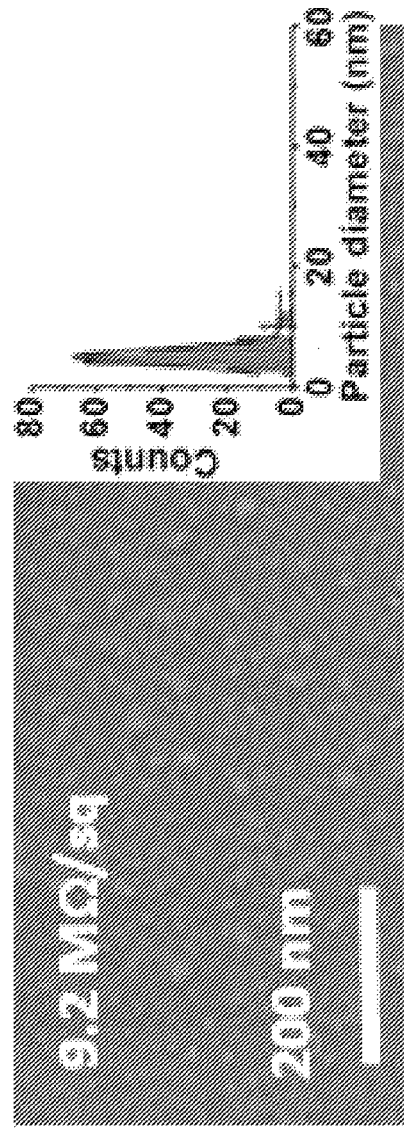
Figures 1, 4B:
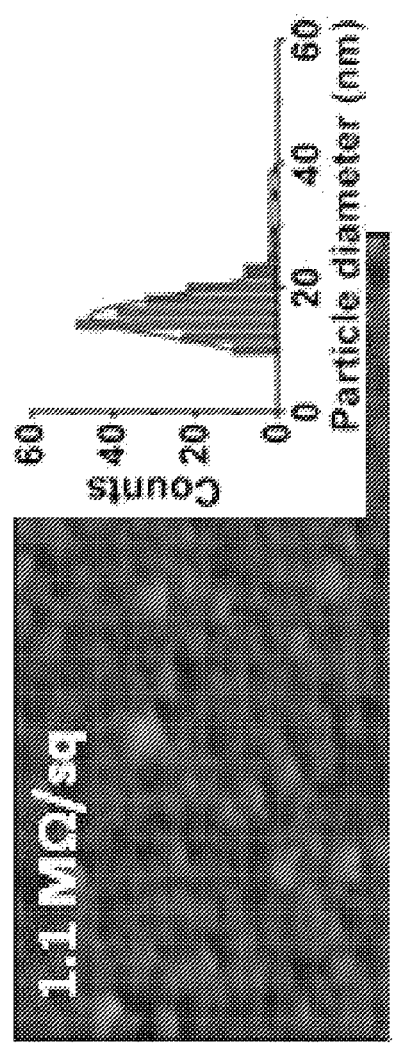
Figures 2, 4B:
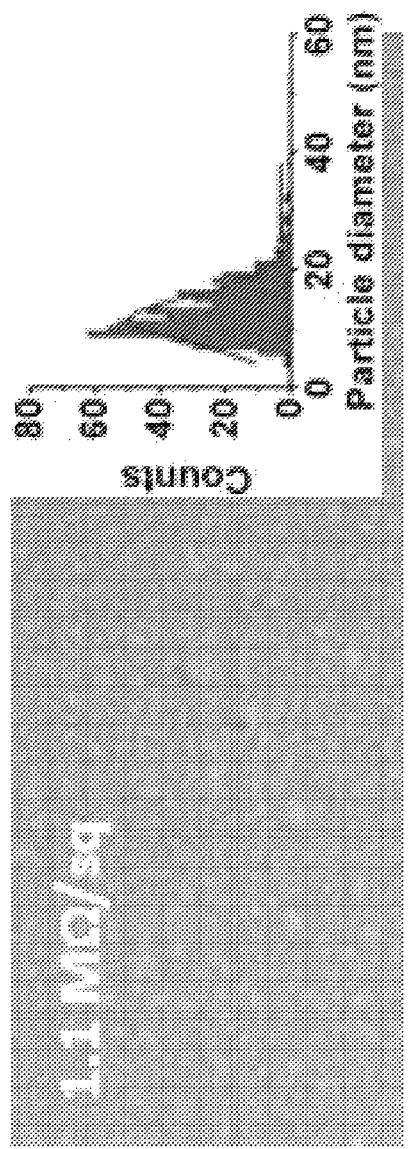
Figures 1, 4C:
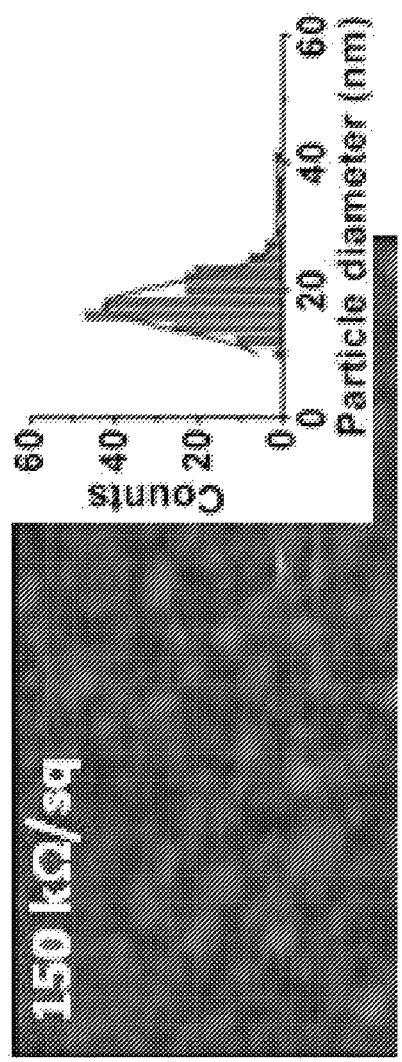
Figures 2, 4C:
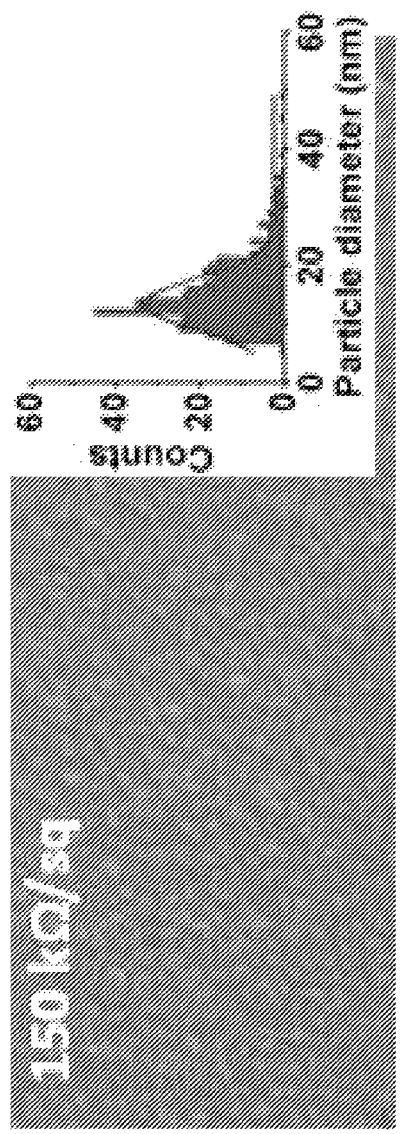
Figures 1, 4D:
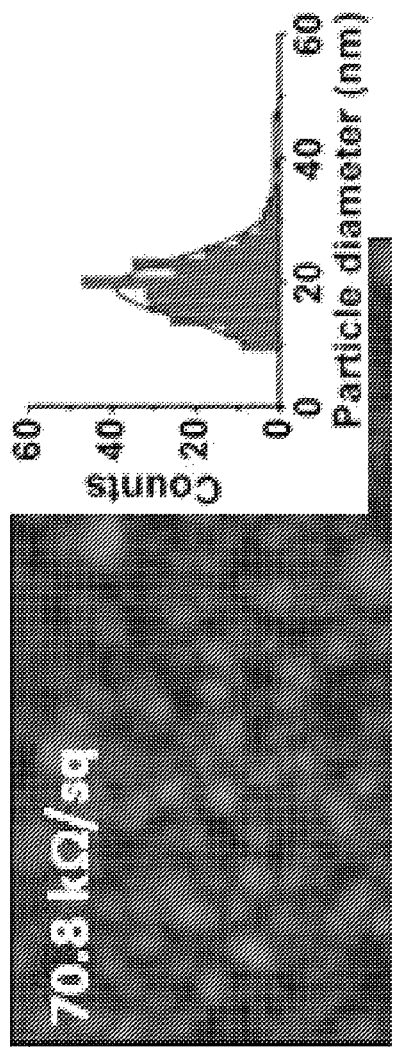
Figures 2, 4D:
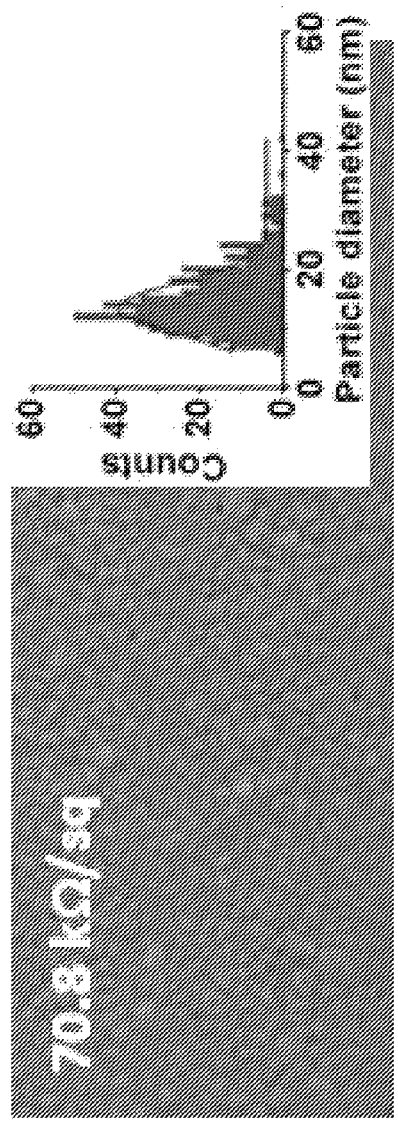
Figures 1, 4E:
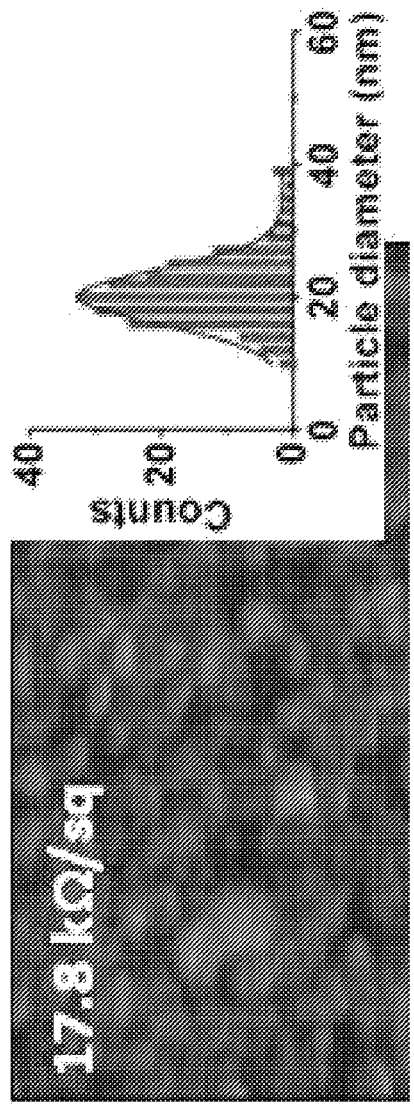
Figures 2, 4E:
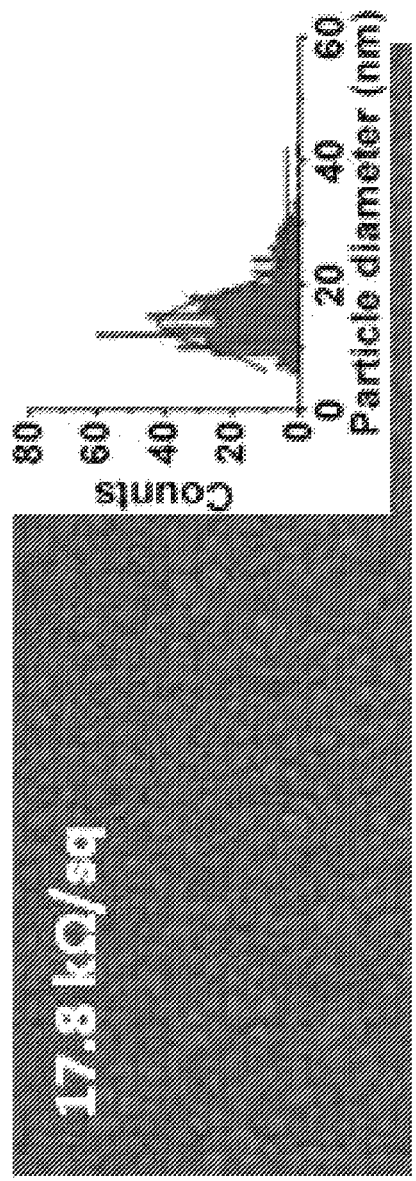
Figures 1, 4F:
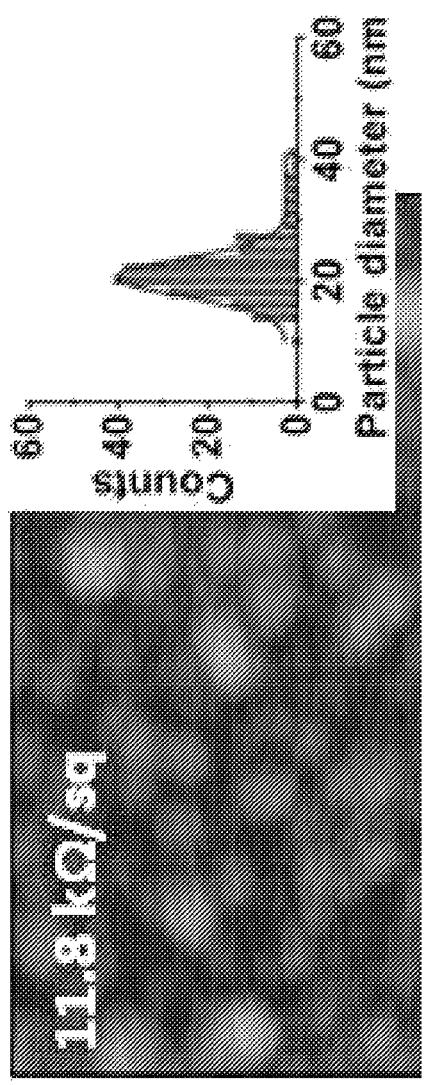
Figures 2, 4F:
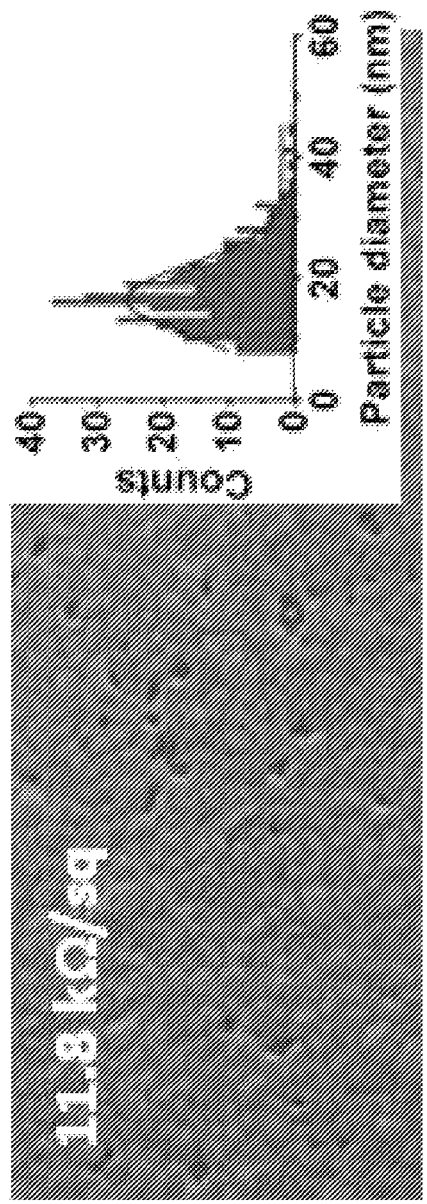
Figures 1, 4G:
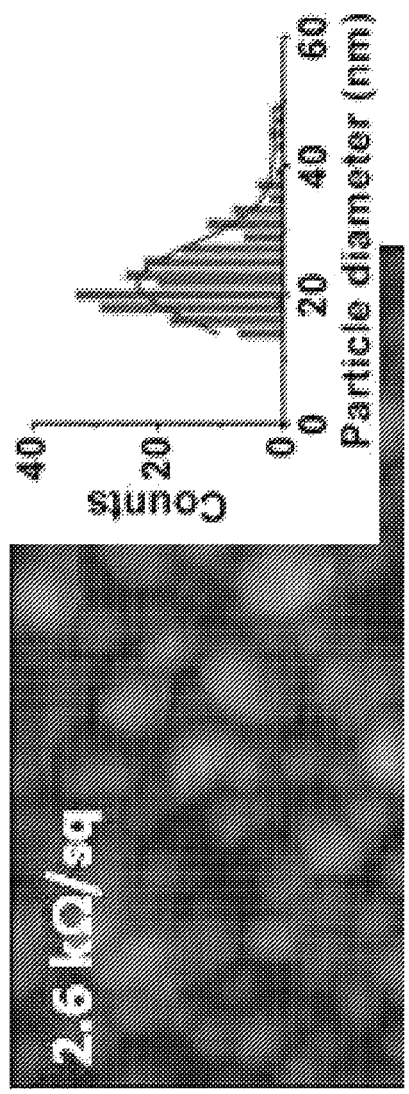
Figures 2, 4G:
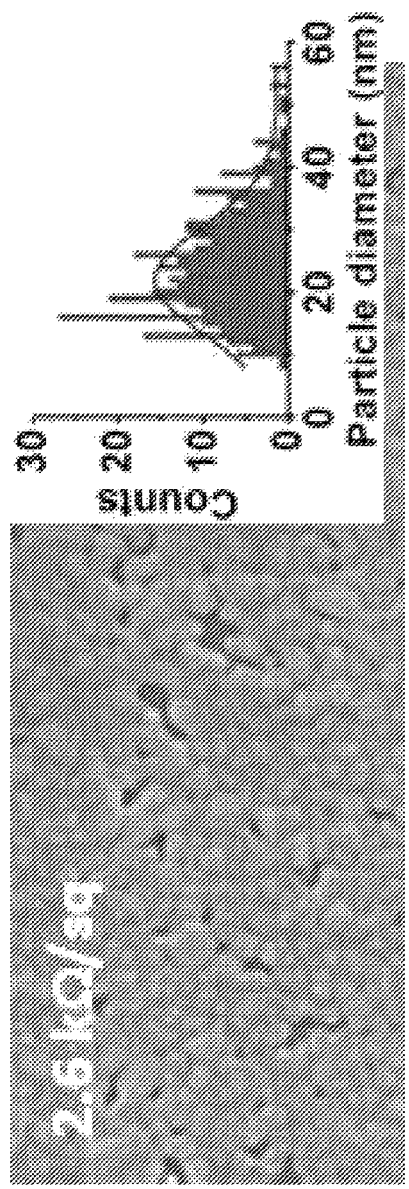
Figure 5A:
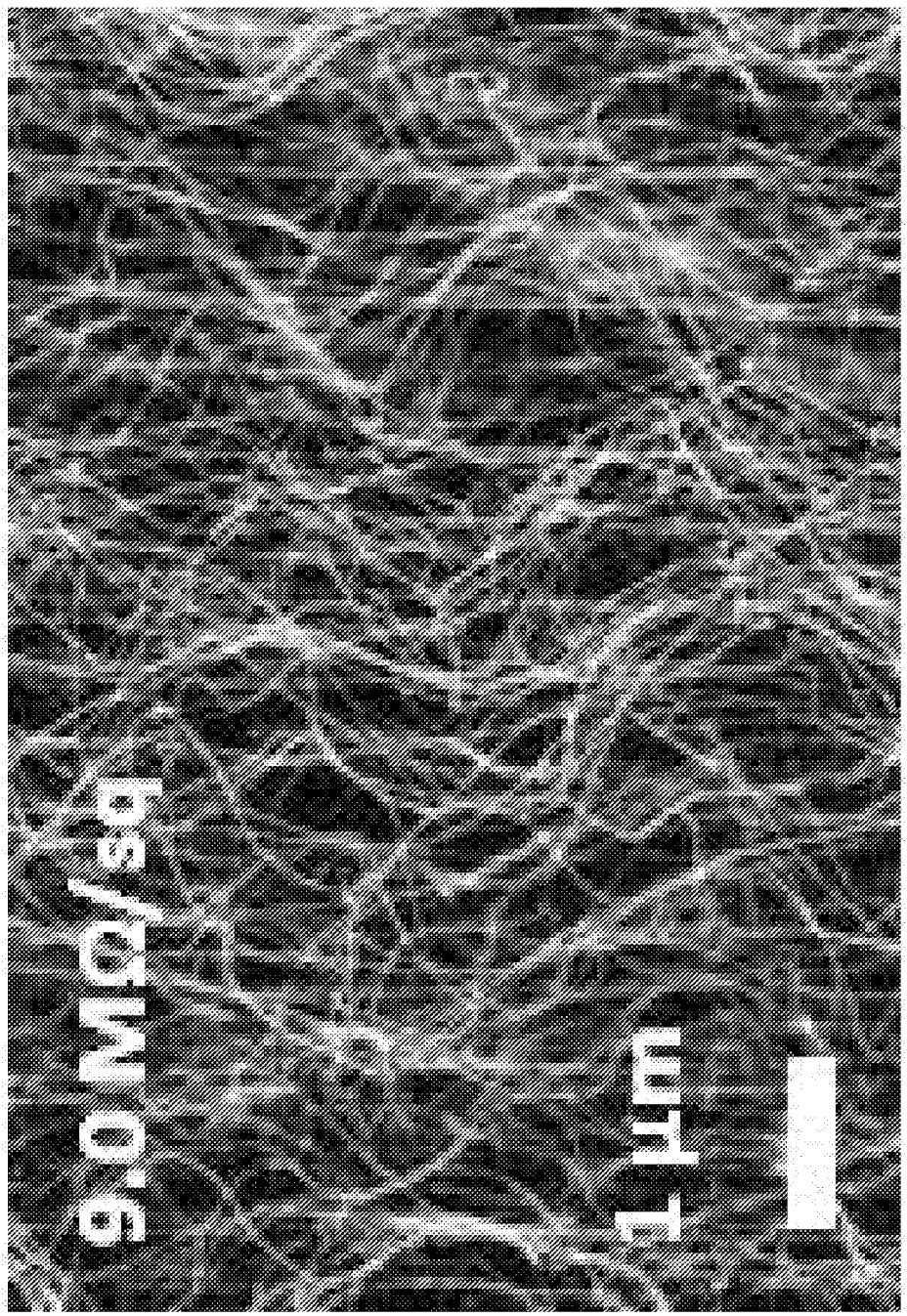
FIGS. 5A-5E are SEM images of CNTs grown on chips with various Fe films under He gas.
Figure 5B:
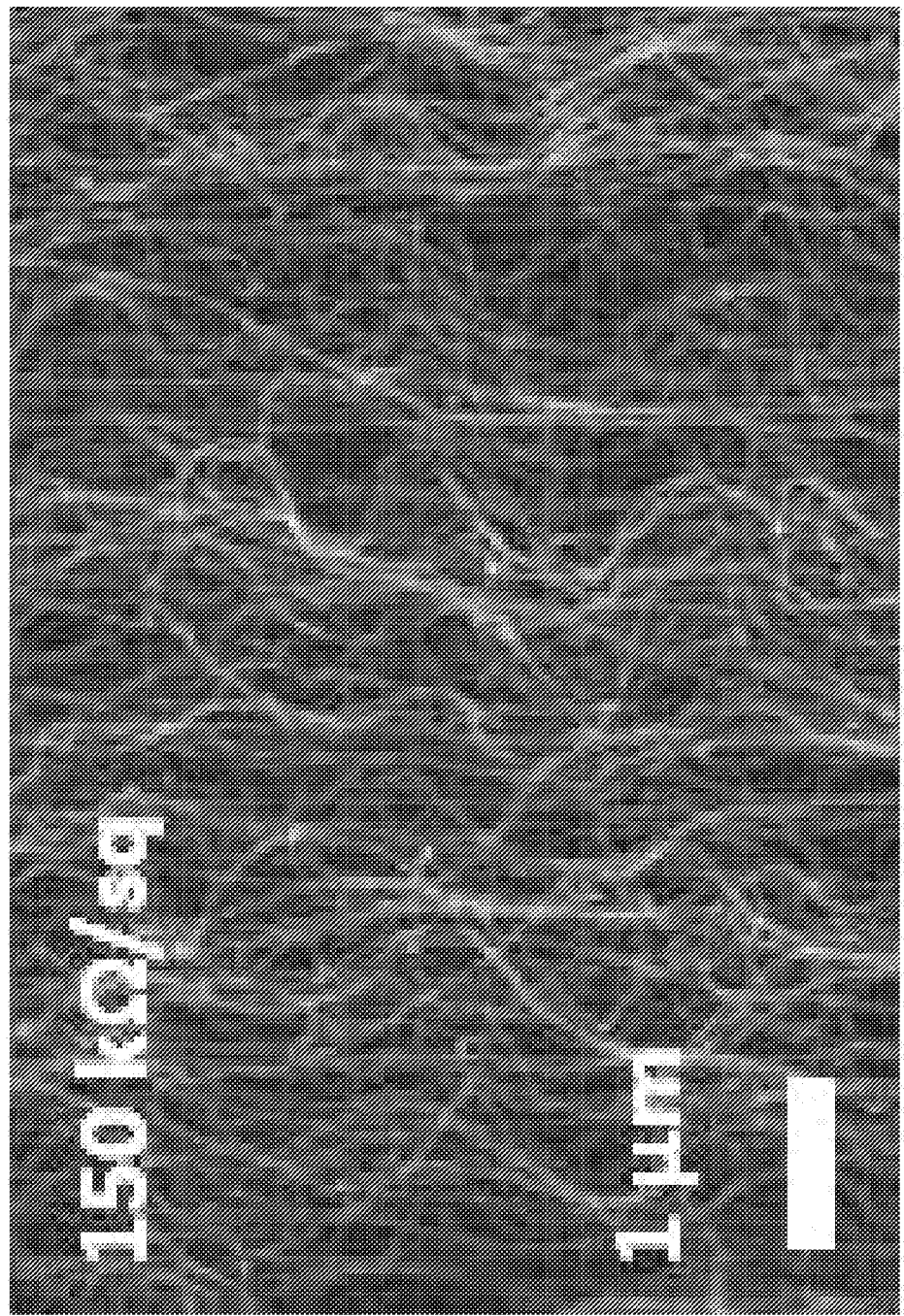
Figure 5C:
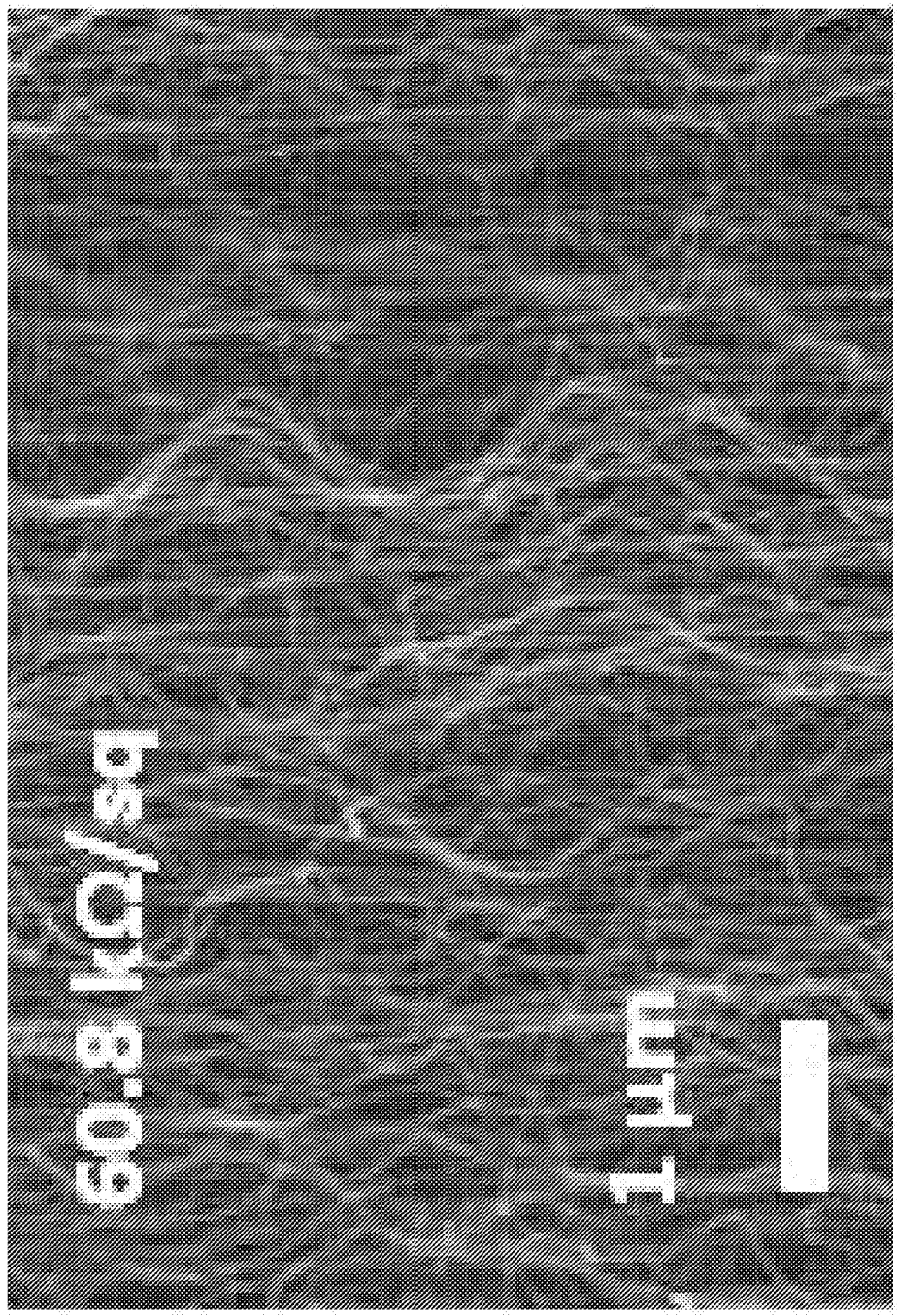
Figure 5D:
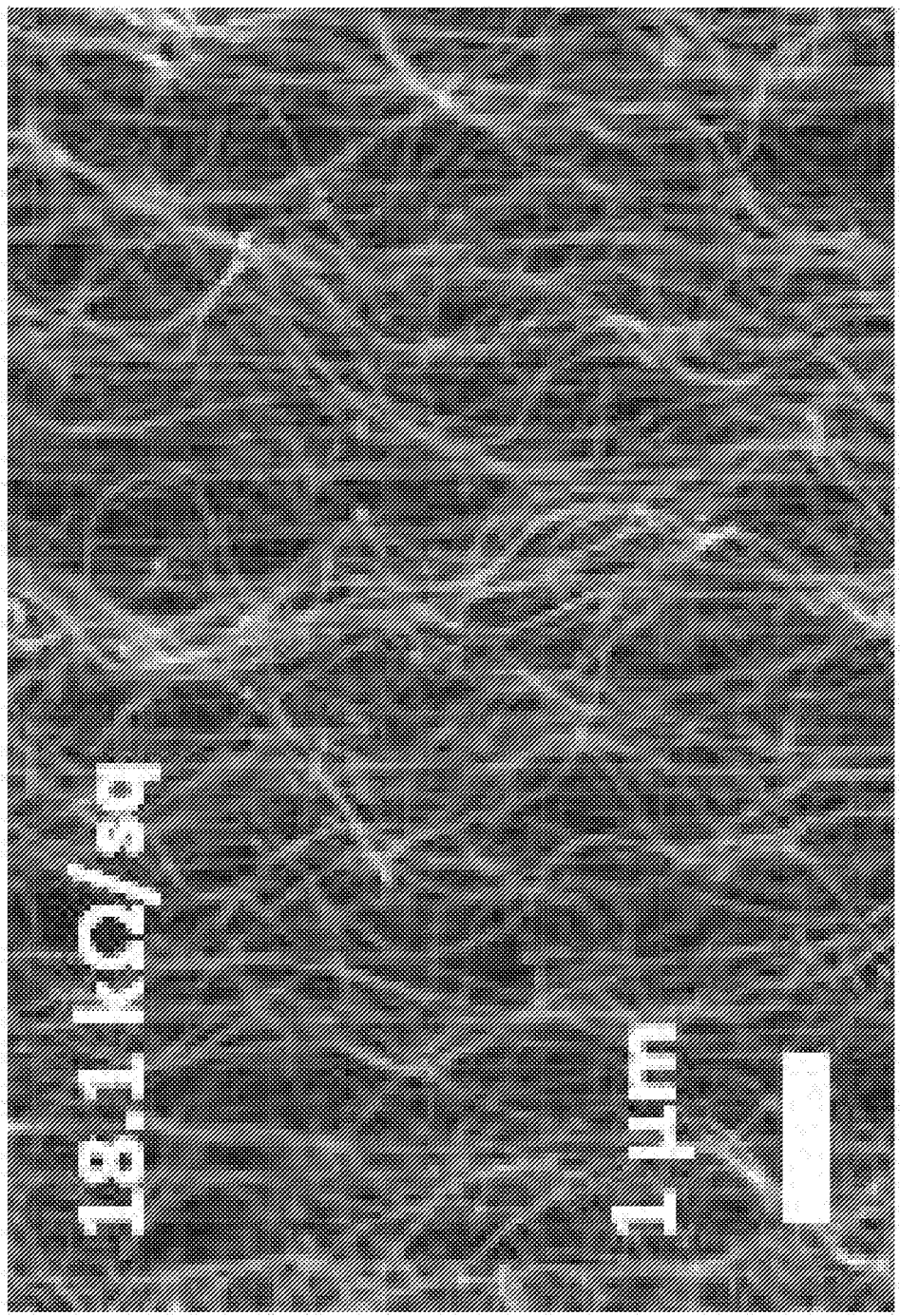
Figure 5E:
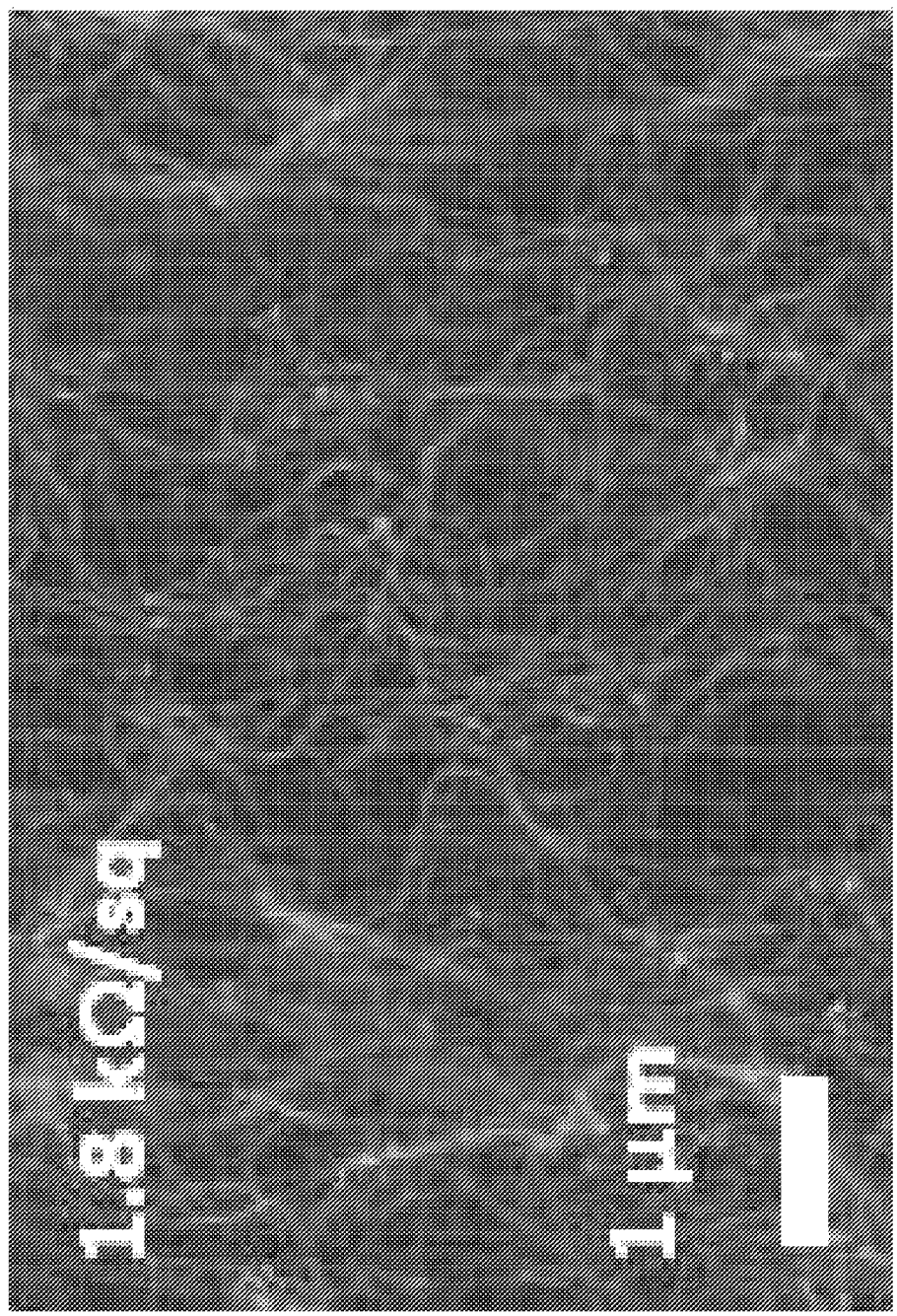
Figure 5F:
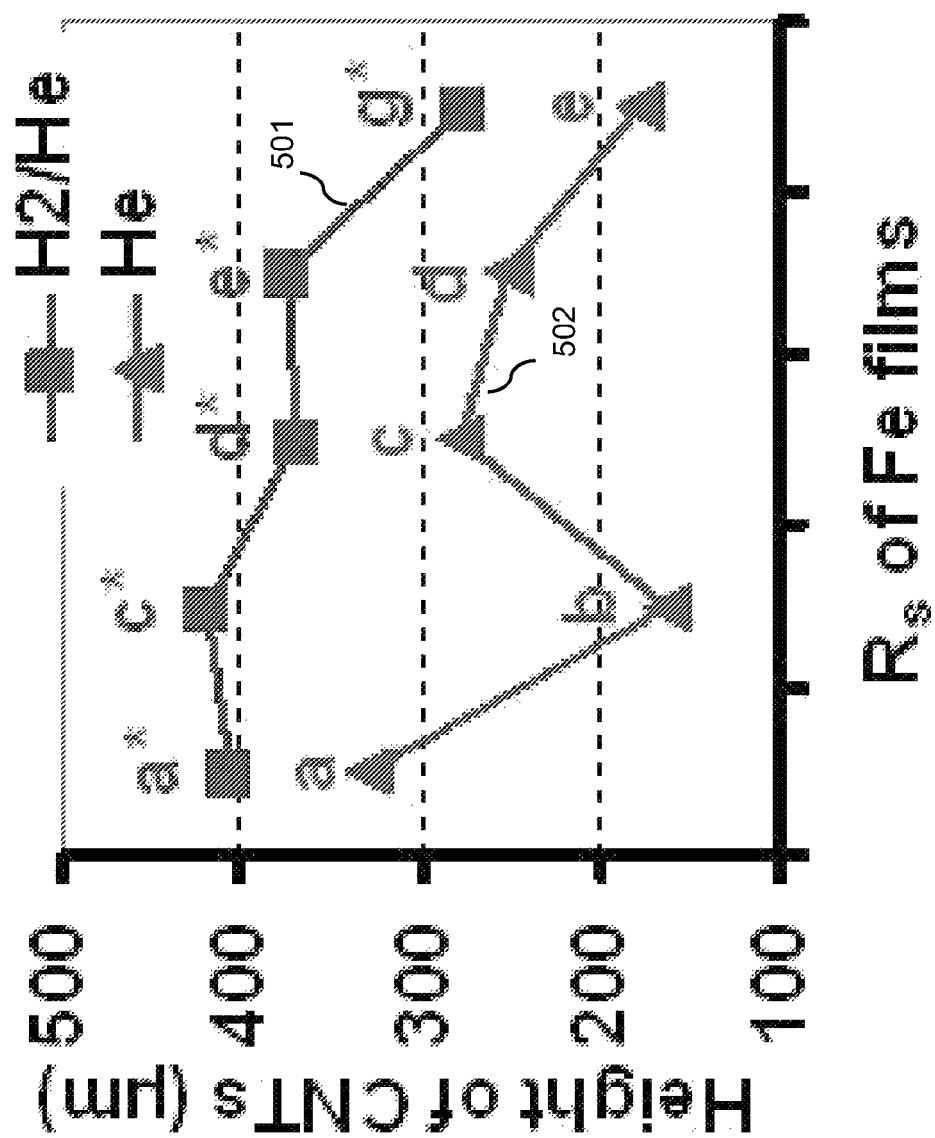
FIG. 5F is a plot showing the height (μm) of CNT forests grown on chips during 5 minutes under $H_2$/He (curve 501) and He gas (curve 502), respectively. This corresponds to the height of CNT forests grown under $H_2$/He gas in FIG. 3H.

To understand the impact of the Fe film thickness on the size and size distribution of Fe nanoparticles which are ultimately connected to the morphology, diameter and forest height of CNTs, the thickness of the Fe film must be measured. The Fe film thickness measured using a Quartz-crystal sensor fixed inside the e-beam evaporation chamber is not generally consistent enough due to both poor within-wafer uniformity and relatively large wafer-to-wafer variations. FIG. 1 demonstrates this. FIG. 1A shows how the Fe film's sheet resistance ($R_s$) is not uniform across the wafer with each curve representing the length of the pulled sheet (curves 101, 102, 103, 104, 105, and 106 are 3 nm, 3 nm, 4 nm, 5 nm, 6 nm, and 7 nm, respectively). Since the Fe film is deposited on a $SiO_2$ insulator, the sheet resistance will directly depend upon the thickness and continuity (conductivity) of the Fe film. The difference in $R_s$ in different regions of the wafer clearly indicates important changes in the Fe film across the wafer.

The difference is primarily related to the Fe film thickness. There can also be a substantial difference between wafers having the same nominal film thickness (as indicated by the quartz-crystal sensor). For example, two wafers with nominally 3 nm Fe films (by the quartz-crystal sensor) have widely disparate $R_s$ (~1 MΩ/sq and ~9 MΩ/sq, as shown in curves 102 and 101, respectively).

Figure 1B:
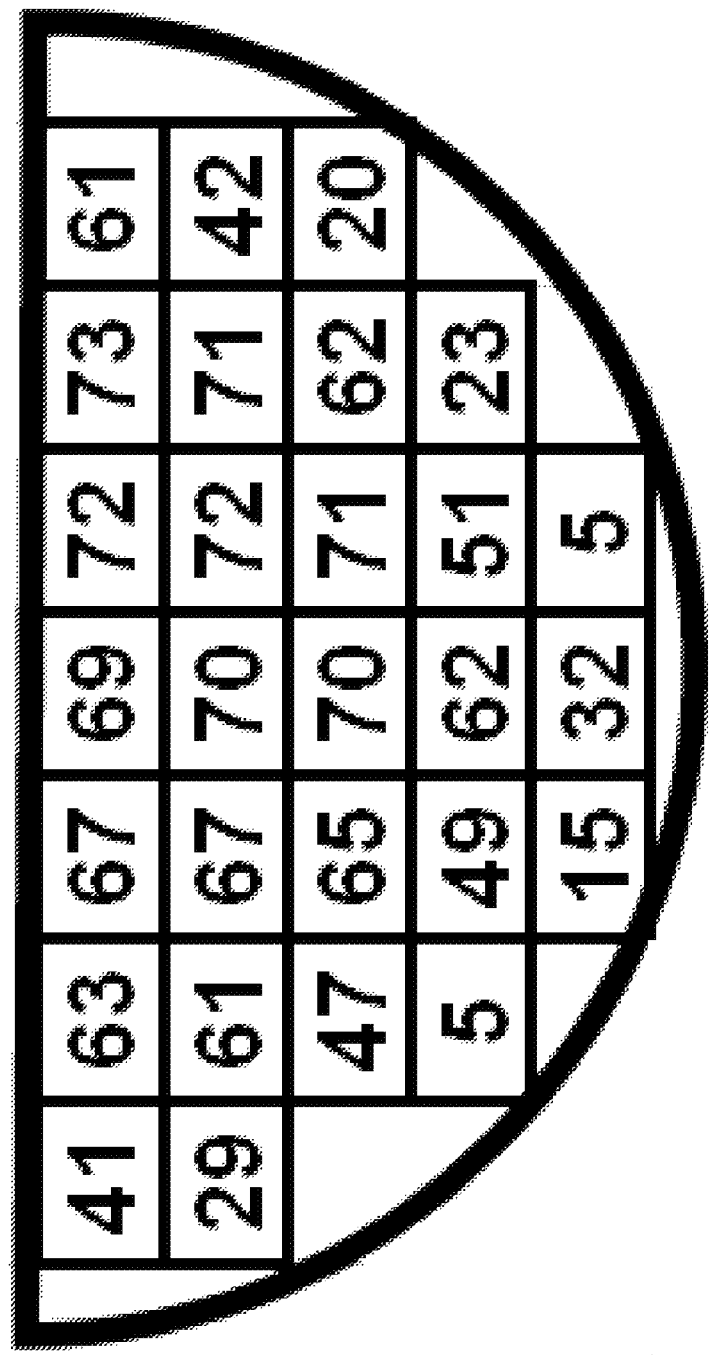

To address this, the wafers with as-deposited Fe film were sectioned into small chips (~1.0×0.7 $cm^2$) as shown in FIG. 1B. The $R_s$ of each chip was approximately constant and could easily be measured using a four-point probe. Then the film thickness was measured by atomic force microscopy (AFM) so that the $R_s$ of each chip could be correlated with the AFM thickness.

Figure 2A:
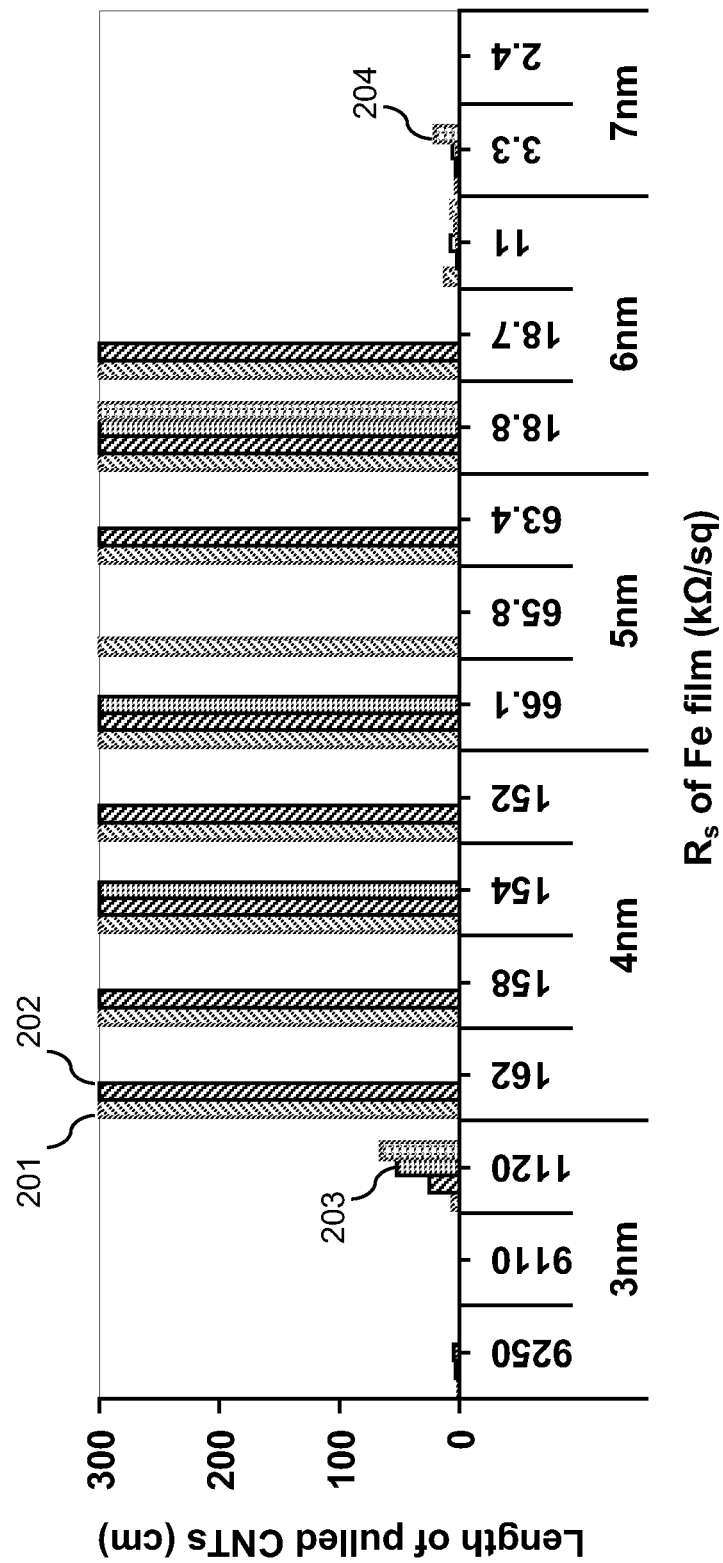
FIGS. 2A-2C show the relationship between the spinning length of CNTs and $R_s$ of Fe catalyst films.
Figure 2B:
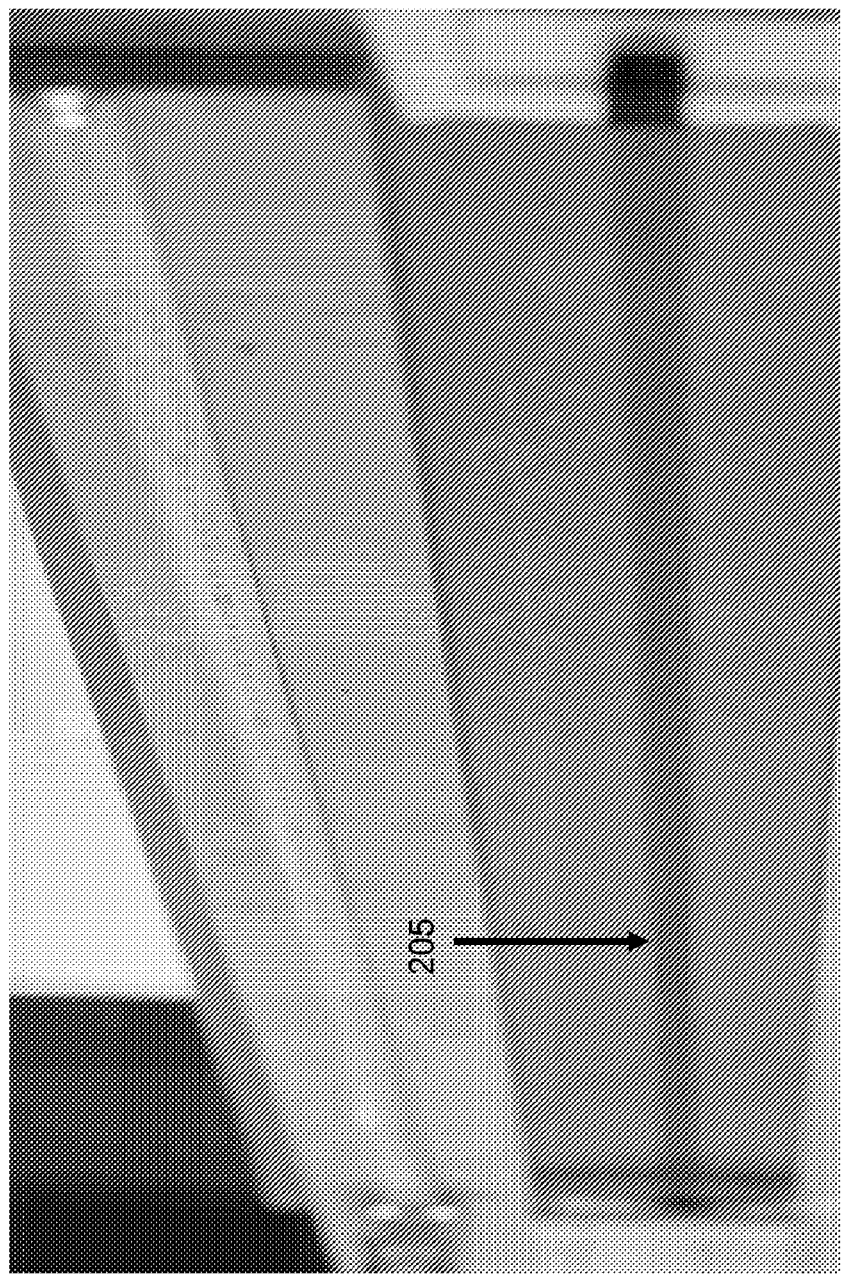
Figure 2C:
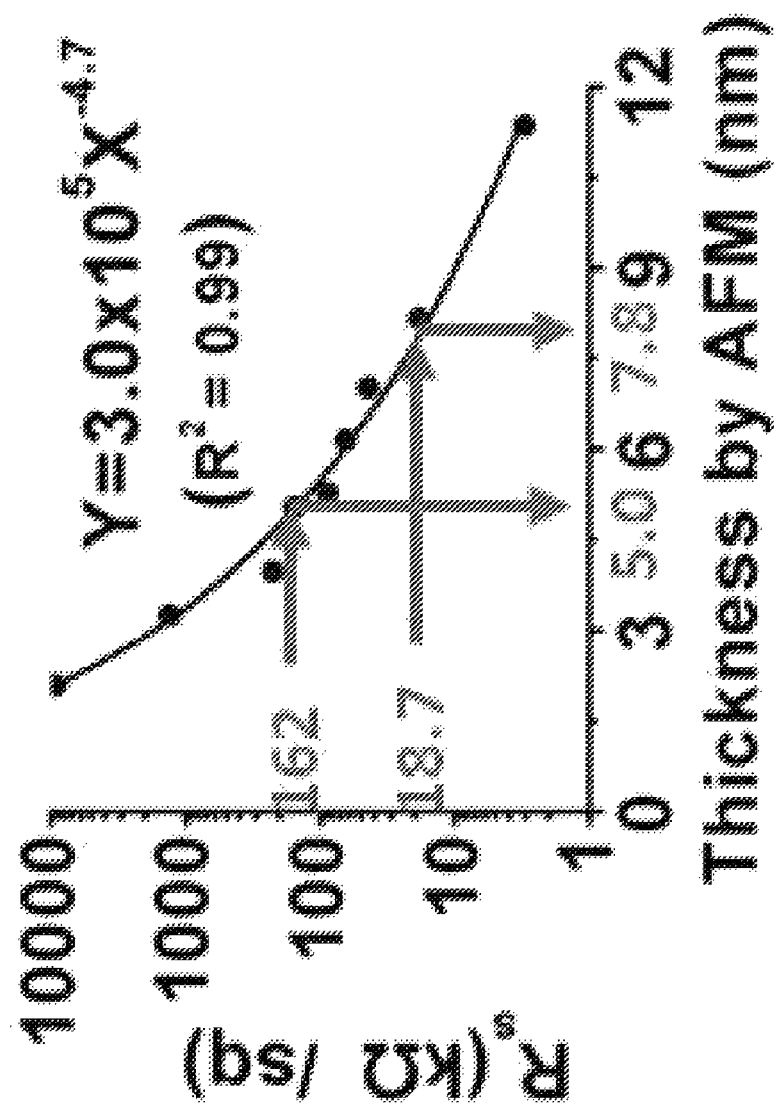

The plot is shown in FIG. 2C and the correlation found there is:

$$R_s(kΩ/sq)=3.0\times10^5\times Thickness\,(nm)^{(-4.7)} \tag{1}$$

Sheet resistance measurements provide a control to use for the growth process and appear to have excellent correlation with catalyst thickness as well as the spinning capability of the resulting MWCNT forest. Using this kind of measurement can enable better comparison studies of the role of the catalyst film thickness on CNTs quality as well, since a small difference in the Fe film thickness can induce large differences in $R_s$ as well as spinning capability.

By sectioning the wafer into chips, CNTs on a catalyst film have been grown having a well defined $R_s$ and as a consequence, a well defined catalyst thickness. While the value of $R_s$ on each chip was approximately constant, the range of $R_s$ for different chips was varied from ~9 MΩ/sq to ~2 kΩ/sq. A set of conditions were utilized to grow the films so that the only variation during these experiments occurred in the catalyst film thickness. Those forest growth conditions were flow rates of $H_2/He/C_2H_2$=100/20,000/700 sccm at a chip temperature of 780° C. As shown in FIGS. 2A-2C, all of the MWCNT forests grown using Fe films having an $R_s$ between 162 and 18.7 kΩ/sq were spin-capable. CNT sheets longer than 3 m could be readily pulled out from these forests. ("Longer than 3 m" means either the sheets were stopped being pulled after it passed 3 m length or that the sheet was pulled out of the forest until virtually all of the MWCNTs in the forest were consumed.)

The Fe film thickness corresponding to the $R_s$ range of 162~18.7 kΩ/sq was 4 ~6 nm by quartz crystal monitor. However the thickness was 5.0~7.8 nm when estimated from the fitting curve between $R_s$ and the AFM thickness in FIG. 2C. This showed that the thickness range of the as-deposited Fe film was narrow (~3 nm) for the growth of the spin-capable MWCNT forests.

Figure 12A:
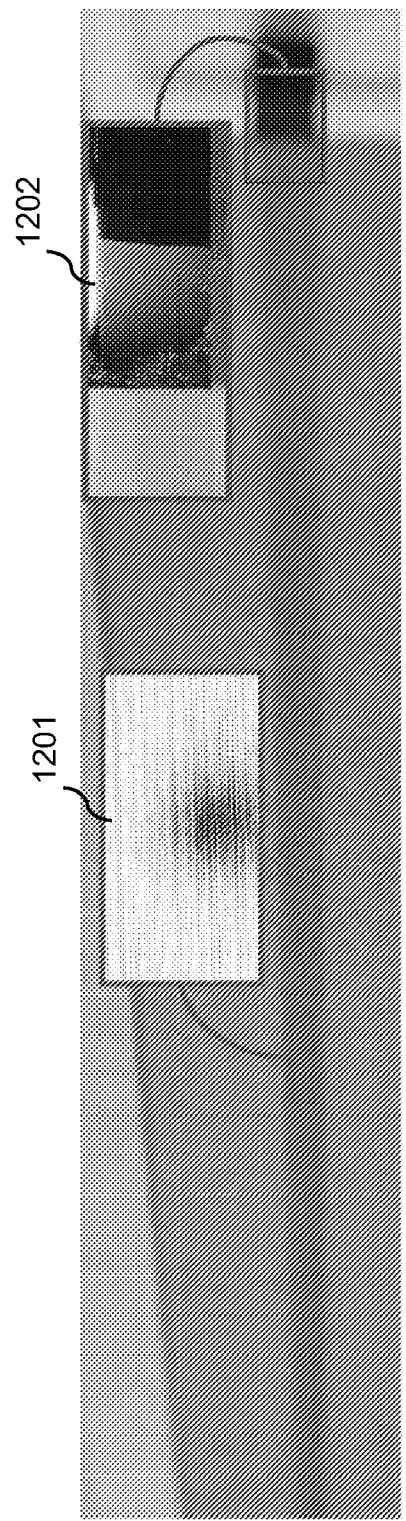
FIG. 12A shows a sheet 1201 pulled from a multi-walled carbon nanotube forest 1202 (such as shown in FIG. 11A.
Figure 12B:
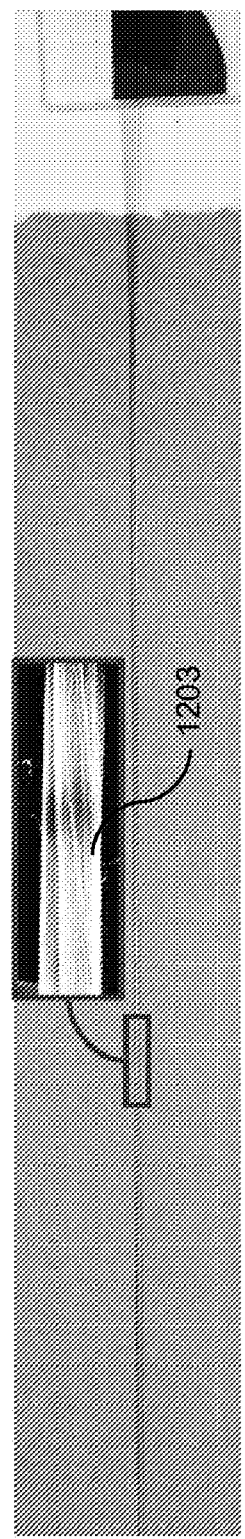
FIG. 12B shows a yarn 1203 pulled from a multi-walled carbon nanotube forest.

FIG. 12A shows a sheet 1201 pulled from a multi-walled carbon nanotube forest 1202 (such as shown in FIG. 11A). The sheet is over 3 m long. FIG. 12B shows a yarn 1203 pulled from a multi-walled carbon nanotube forest. The yarn has a diameter of 300 nm.

The height of the CNT forests decreased from ~420 μm to ~275 μm as the $R_s$ of the Fe film decreased from 150 kΩ/sq to 2.4 kΩ/sq. Given the 5 minute growth period, these forest heights correspond to −1.4 μm/sec to −0.9 μm/sec growth rates, respectively. (FIG. 3H). It has been suggested in previous reports [Wang 2007; Zhao B, Futaba D N, Yasuda S, Akoshima M, Yamada T, Hata, K. Exploring advantages of diverse carbon nanotube forests with tailored structures synthesized by supergrowth from engineered catalysts. Acs Nano 2009 3:108-114] that the growth rate decreases with increasing catalyst nanoparticle size, and this trend is also observed in our results provided the nanoparticle size increases with increasing thickness of the as-deposited Fe film as expected.

The height of the forests grown on the chip with the largest $R_s$ (9.6 MΩ/sq) is a little less than that for 150 kΩ/sq. As shown in FIGS. 3A-3G, the CNTs grown on the 9.6 MΩ/sq Fe film are more curled than those on the 150 kΩ/sq Fe film. The forest grown on the 9.6 MΩ/sq Fe film has a CNT areal density of ~1.4×$10^{10}$, while that on the 150 kΩ/sq Fe film has the areal density of ~2.8×$10^{10}$. When the CNT areal density is low, the CNT forests are generally curled or wavy because neighboring CNTs are not close enough to have strong Van der Waals interactions between CNTs. As a result, the overall height of the curled CNT forest grown on the 9.6 MΩ/sq Fe film can be less than that of the well aligned forest grown on the 150 kΩ/sq Fe film, even if the CNT length of the former can be longer than that of latter.

Figure 3A:
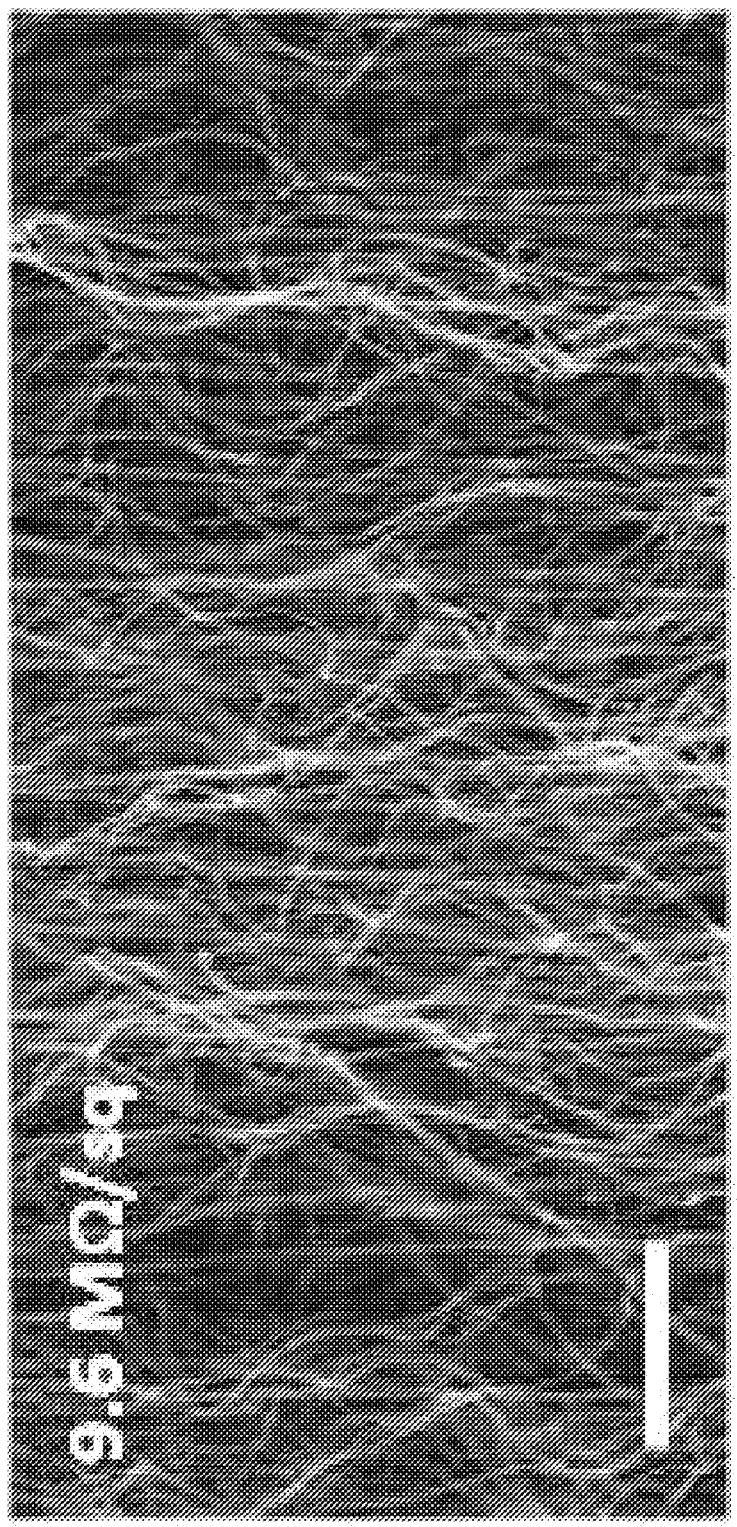
FIGS. 3A-3G are SEM images of CNTs grown on chips with various Fe films.
Figure 3B:
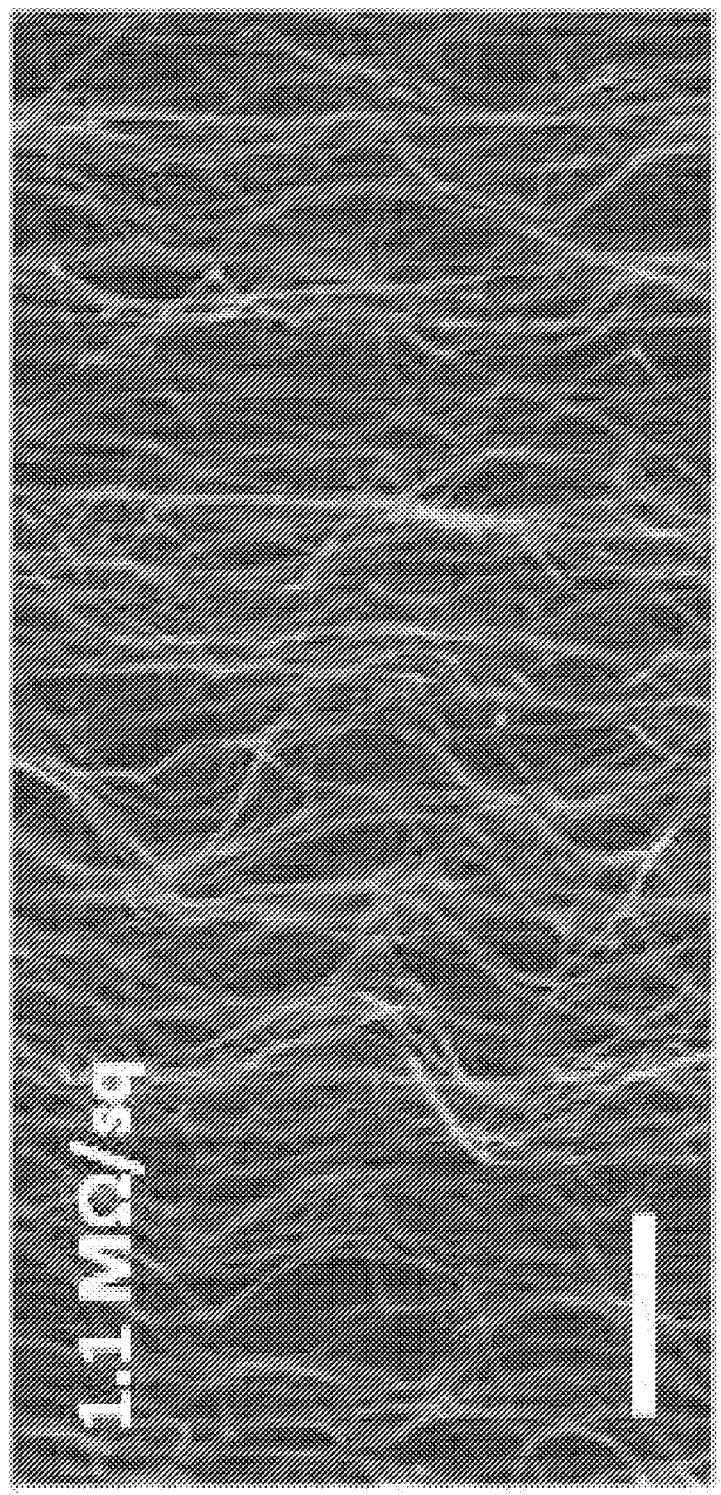
Figure 3C:
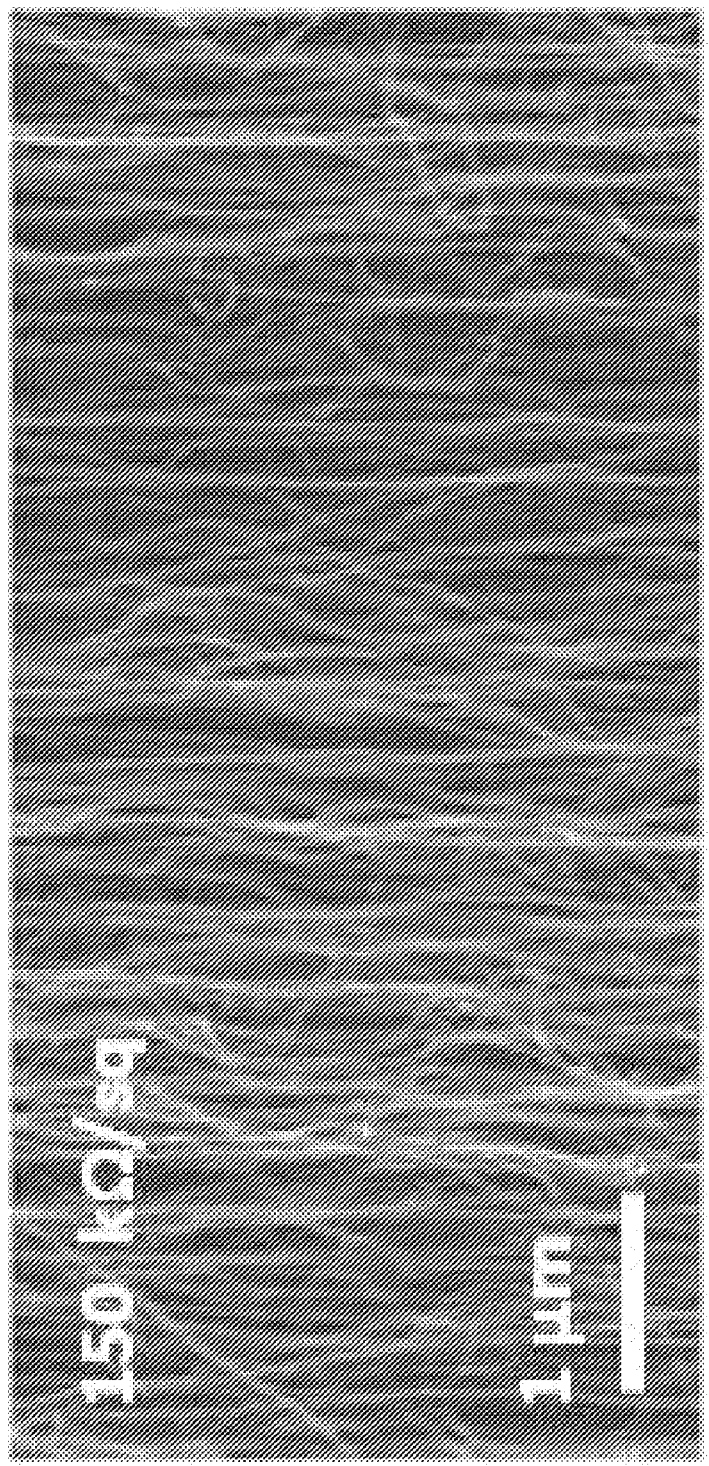
Figure 3D:
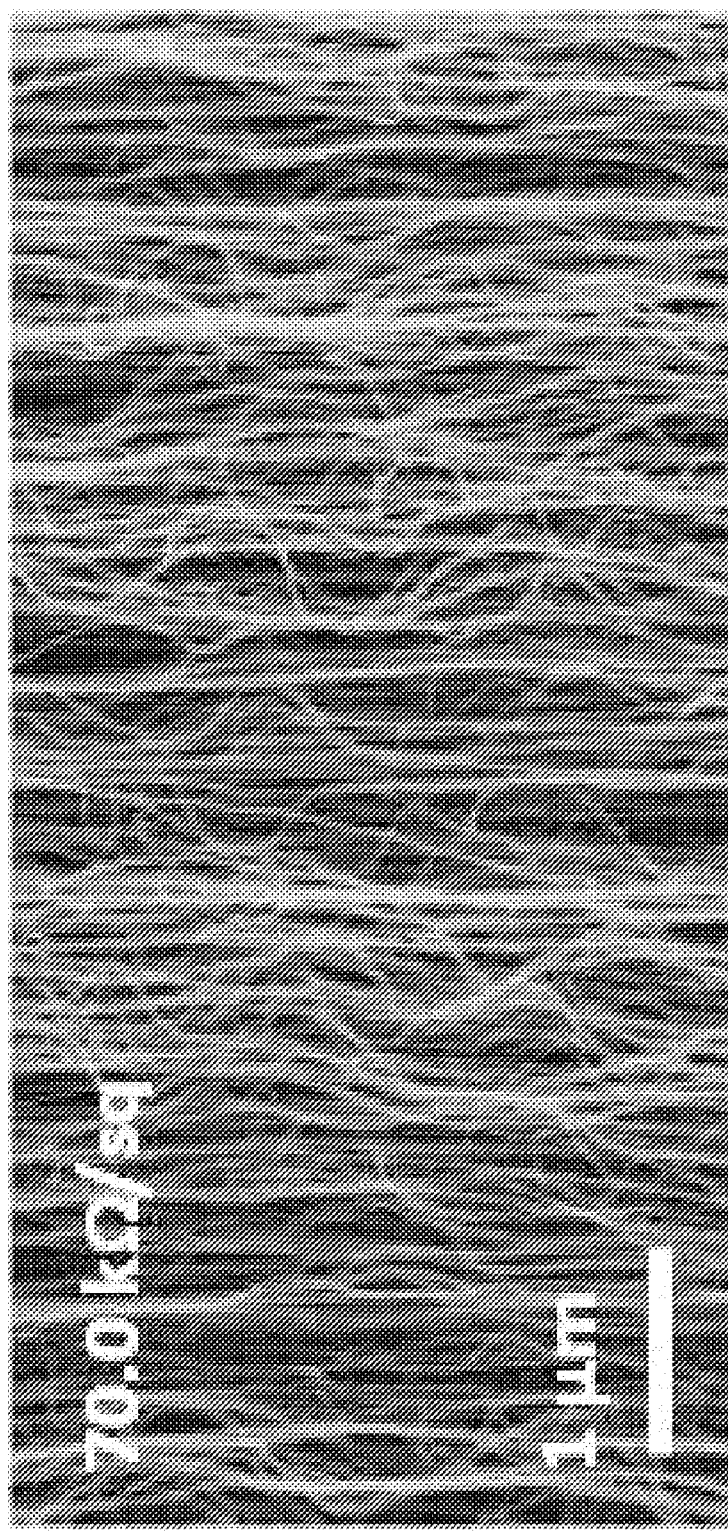
Figure 3E:
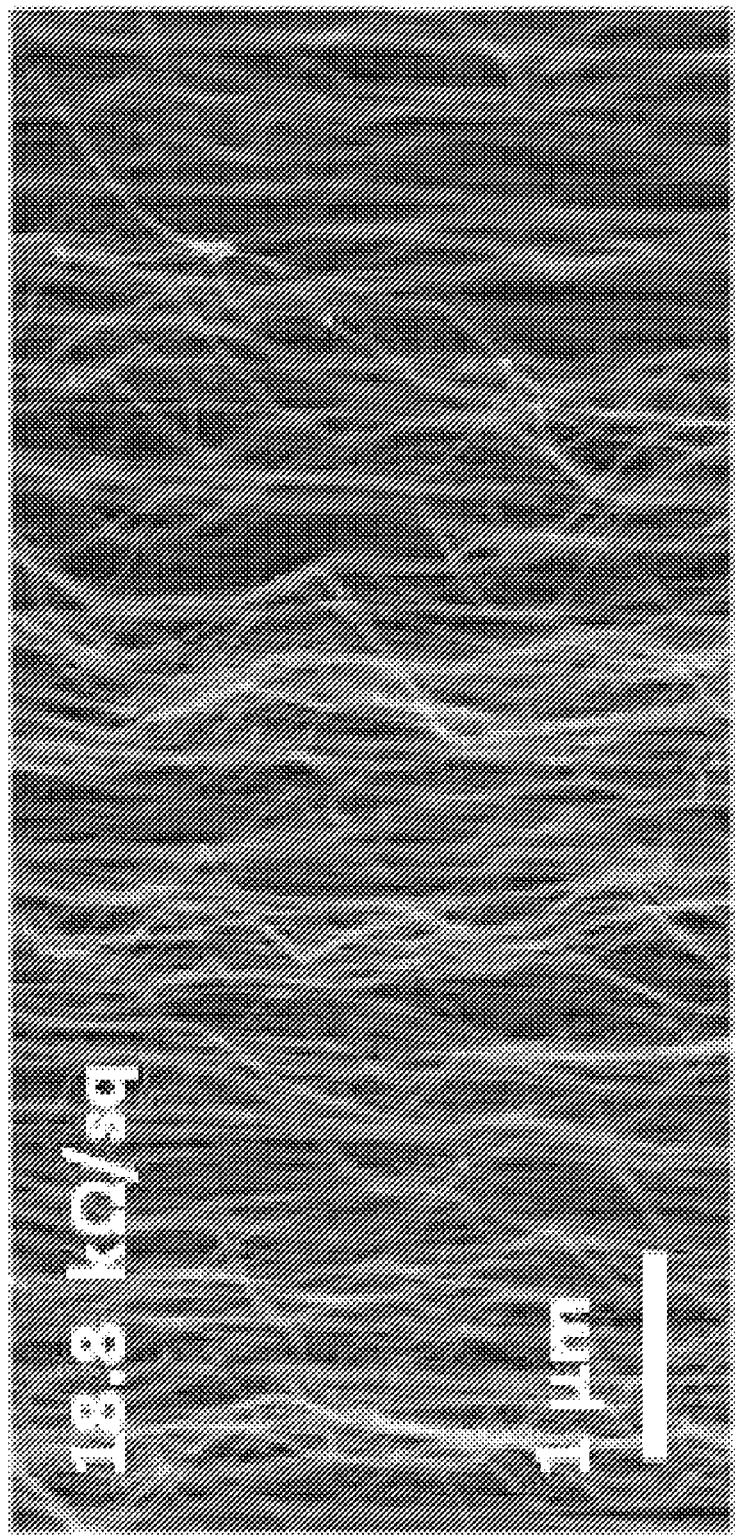
Figure 3F:
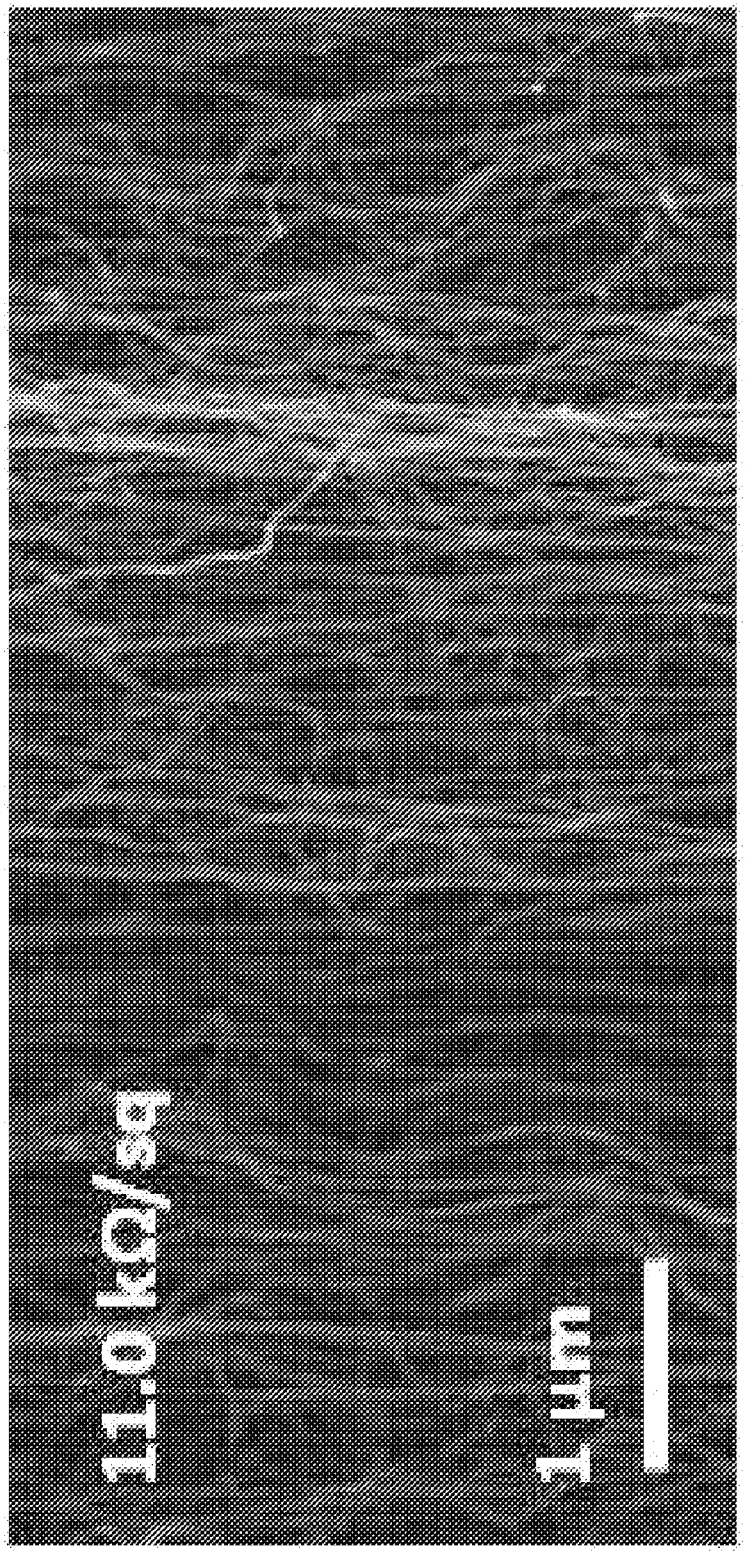
Figure 3G:
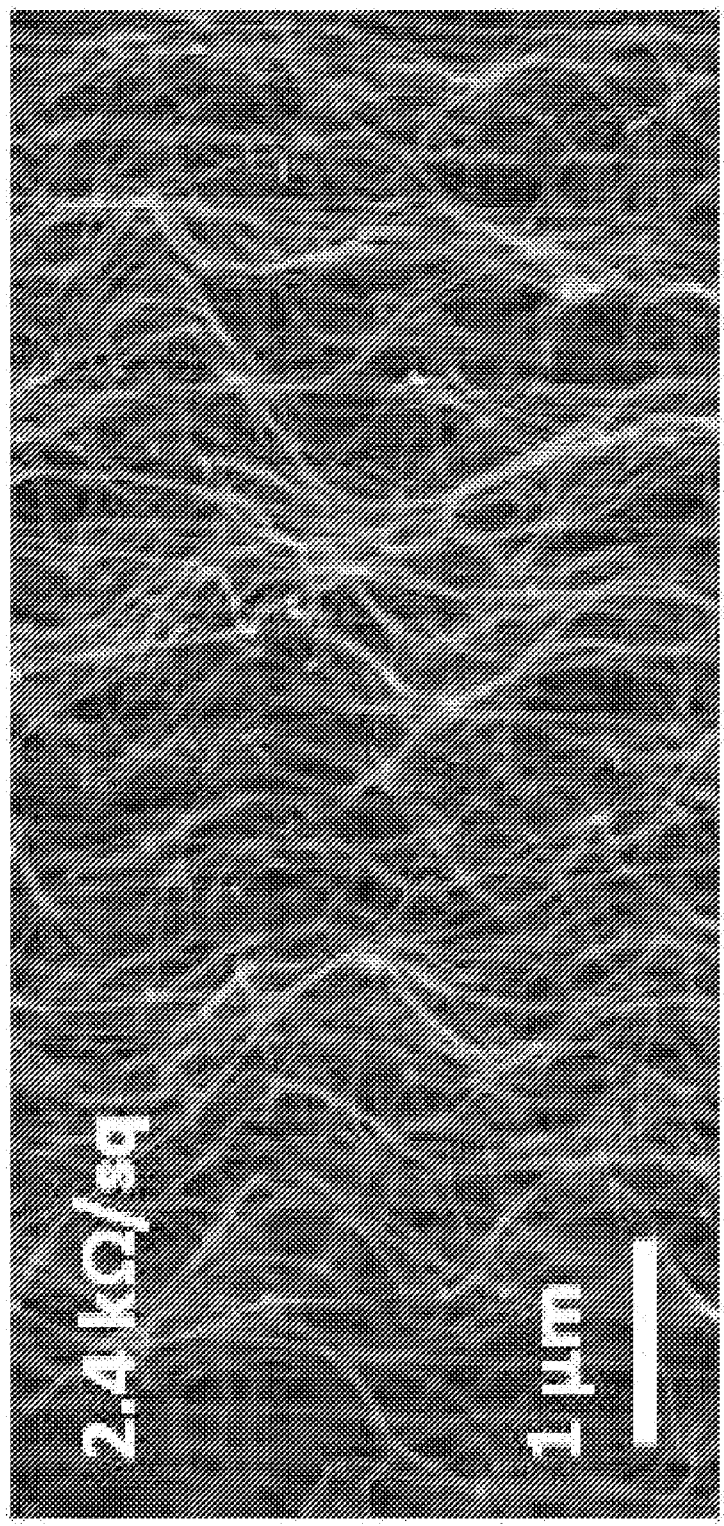
Figure 3H:
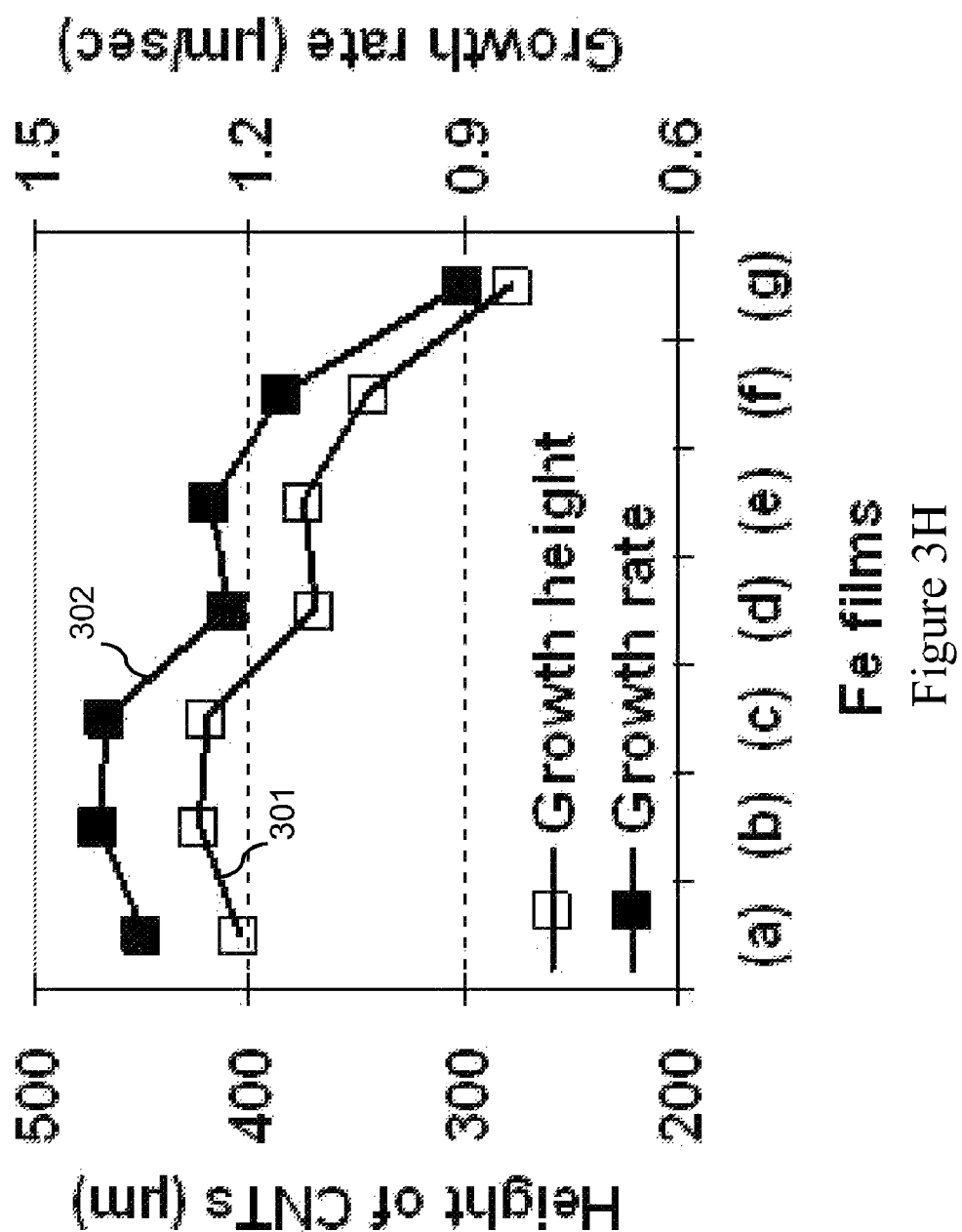
FIG. 3H is a plot showing the height rate (curve 301) and growth rate (curve 302) of CNT forests grown during 5 minutes under the optimized condition.

FIGS. 3A-3G has scanning electron microscope (SEM) images of the MWCNTs in seven forests grown on catalyst films of various $R_s$. FIGS. 3C-3E show the CNTs forest morphology for spin-capable forests while FIGS. 3A-3B and FIGS. 3F-3G show the CNTs forest morphology for those that can not produce sheets or yarns. The spin-capable forests have CNTs that are well aligned or even "super-aligned" parallel to one another. The others have CNTs that appear more curled or wavy. In particular, the CNTs grown on chips with the largest $R_s$ of 9.6 MΩ/sq or the lowest $R_s$ of 2.4 kΩ/sq appear the most curled. The ability to pull out CNTs is thought to result from forces related to the alignment of the CNTs. This alignment is strongly dependent on sheet resistance (and the thickness) of the as-deposited Fe film.

To examine the dependence of the average CNT diameter on the sheet resistance of as-deposited Fe film, the CNT diameter and its distribution were investigated by transmission electron microscopy (TEM). Regardless of the sheet resistance of the Fe films, all of the CNTs were MWCNTs (see FIGS. 9A-9G), which is consistent with the Raman spectra of the CNTs (not shown here). Histograms of the average diameters and standard deviation with Gaussian fitting are shown in FIGS. 9A-9G and summarized in Table 1. The tube diameter increases slightly with decreasing $R_s$. The average diameter of the CNTs is slightly smaller than the size of the Fe nanoparticles for each film thickness. (This will be discussed further below.) It was also observed that there are between 5 and 15 walls for each of the CNTs. This did not show any significant dependence on $R_s$.

The areal density of CNTs on the chips were compared in order to more fully understand how it is related to: the spinning capability of the forests, the alignment of the CNTs in the forest and the sheet resistance of the as-deposited Fe films.

TABLE 1

Average CNT diameters (and standard deviation) and distance between CNTs.

| Fe Films | CNT diameter | Areal density[a] | Area per CNT | Distance between CNTs[b] |
|---|---|---|---|---|
| 9.6 MΩ/sq | 11.0 ± 2.5 nm | ~1.4 × 10$^{10}$ | ~85 nm × 85 nm | ~74 nm |
| 1.1 MΩ/sq | 12.4 ± 2.9 nm | ~1.9 × 10$^{10}$ | ~73 nm × 73 nm | ~60 nm |
| 150 kΩ/sq | 12.5 ± 1.3 nm | ~2.8 × 10$^{10}$ | ~60 nm × 60 nm | ~47 nm |
| 70.0 kΩ/sq | 13.0 ± 2.4 nm | ~2.3 × 10$^{10}$ | ~66 nm × 66 nm | ~53 nm |
| 18.8 kΩ/sq | 12.7 ± 1.6 nm | ~1.7 × 10$^{10}$ | ~77 nm × 77 nm | ~64 nm |
| 11.0 kΩ/sq | 13.1 ± 2.0 nm | ~1.2 × 10$^{10}$ | ~91 nm × 91 nm | ~78 nm |
| 2.4 kΩ/sq | 14.0 ± 1.9 nm | ~8.7 × 10$^{9}$ | ~107 nm × 107 nm | ~93 nm |

[a]The average CNT areal density [tubes/cm$^2$].
[b]The average distance between CNTs means the average distance between the outer walls in MWCNT.

Spin-capable forests resulting from catalyst films with $R_s$ between 150 and 18.8 kΩ/sq had high areal density of CNTs. Table 1 showed that the density was greater than ~2×10$^{10}$ tubes/cm$^2$. This indicates that the large areal density promoted alignment of the CNTs, perhaps through Van der Waals interactions between growing CNTs. The areal density increased from ~1.4×10$^{10}$ to ~2.8×10$^{10}$ tubes/cm$^2$ as $R_s$ decreased from 9.6 MΩ/sq to 150 kΩ/sq. It peaked at 150 kΩ/sq, and then decreased again from ~2.8×10$^{10}$ to ~8.7×10$^9$ tubes/cm$^2$ as $R_s$ decreased from 150 kΩ/sq to 2.4 kΩ/sq. The trend in the areal density may indicate two competing factors. When $R_s$ is small, the relatively thick Fe film formed very big Fe nanoparticles that are not suitable for MWCNTs growth. When $R_s$ was large, (relatively thin Fe films) the areal density decreases because thin Fe films did not generate enough Fe nanoparticles suitable for MWCNTs growth. Many of the nanoparticles produced were too small to grow MWCNTs.

The average distance between CNTs can be estimated using the CNT diameter and the areal density. This average distance was about 47~64 nm for spin-capable forests ($R_s$ between 150~18.8 kΩ/sq) and was shorter than for non-spin-capable forests. This combination of high areal density and large diameter CNTs promotes spin-capable forests and implies that such forests have stronger Van der Waals interactions between CNTs.

To confirm the root cause of these results Fe particle size was examined. This was done by annealing Fe films having $R_s$ of 9.2 MΩ/sq, 1.1 MΩ/sq, 150, 70.8, 17.8, 11.8 and 2.6 kΩ/sq. The anneal step was performed without the introduction of $C_2H_2$. FIGS. 4A-4G has AFM (*-1) and SEM (*-2) images showing the surface morphology of the annealed Fe films with sheet resistance. Histograms of the Fe nanoparticle size distributions as a function of $R_s$ are also shown in FIGS. 4A-4G and summarized in Table 2.

The Fe nanoparticle size measured by AFM gradually increased from 14.3 nm to 21.9 nm as the $R_s$ of the Fe film decreased from 9.2 MΩ/sq to 2.6 kΩ/sq. The morphology of the annealed Fe films was also measured by SEM because there are restrictions to the lateral extent of the AFM measurements and as a consequence some variations existed between measurement areas. Individual Fe particles were observed as shown in FIGS. 4A-4G, but the SEM could not distinguish nanoparticles with diameters below ~2 nm.

TABLE 2

Average Fe particle diameter (and standard deviation) of annealed Fe film.[a]

| Fe Films | Particle diameter (AFM) | Particle diameter (SEM) |
|---|---|---|
| 9.2 MΩ/sq | 14.3 ± 3.4 nm | 4.9 ± 1.4 nm |
| 1.1 MΩ/sq | 15.3 ± 3.1 nm | 11.4 ± 3.9 nm |
| 150 kΩ/sq | 17.5 ± 3.6 nm | 13.3 ± 4.3 nm |

TABLE 2-continued

Average Fe particle diameter (and standard deviation) of annealed Fe film.[a]

| Fe Films | Particle diameter (AFM) | Particle diameter (SEM) |
|---|---|---|
| 70.8 kΩ/sq | 19.1 ± 4.8 nm | 13.3 ± 4.3 nm |
| 17.8 kΩ/sq | 20.0 ± 4.1 nm | 13.9 ± 4.1 nm |
| 11.8 kΩ/sq | 20.5 ± 3.2 nm | 16.4 ± 5.8 nm |
| 2.6 kΩ/sq | 21.9 ± 5.9 nm | 21.9 ± 8.5 nm |

[a]Data obtained on ~500 × 500 nm$^2$ in AFM or on ~500 × 700 nm$^2$ in SEM.

Even so, considering the CNT diameters observed in TEM and the minimum particle size necessary for the growth of MWCNTs, one can consider that nanoparticles below ~2 nm in diameter can be neglected. The nanoparticle size measured by SEM is similar to that by AFM with the lone exception occurring for the 9.2 MΩ/sq film. Both measurement techniques indicated that the Fe particle size increased as the sheet resistance of Fe film decreased. In addition, the nanoparticle size measured using the SEM approximately corresponded to the diameters of CNTs measured using the TEM. In addition, the Fe particles forming on the 9.2 kΩ/sq film were small and sparse like isolated islands in SEM images. This is consistent with a forest that did not have sufficient nucleation sites for the growth of MWCNTs, and led to the low areal density as well as the curled CNT morphology.

The Fe nanoparticles in the 2.6 kΩ/sq film appeared relatively large, which is also consistent with a forest having fewer nucleation sites for the growth of MWCNTs as mentioned above. This agrees with the previous result that the presence of a large number of big particles decreased the density of carbon nanotubes resulting in worse alignment [Liu H, Cheng G, Zhao Y, Zheng R, Liang C, Zhao F, et al. Controlled growth of Fe catalyst film for synthesis of vertically aligned carbon nanotubes by glancing angle deposition. Surf Coat Technol 2006 201, 938-942]. As a result, both the proper particle size, around 15 nm in SEM image, and a sufficient density of Fe nanoparticles are required to have the high areal density of MWCNTs required for super-aligned and consequently spin-capable CNT arrays. Applicant believes that certain factors of nanoparticle formation have deep impacts on the nature of the Fe catalyst film because the spinning capability of the MWCNT forests strongly depends on the size distribution and the density of the Fe catalyst.

Besides Fe film thickness, other keys to achieving sufficient areal density and optimally sized Fe nanoparticles are believed to exist. In general, $H_2$ gas has been used to reduce Fe oxide into Fe metal to function as an effective catalyst for the growth of CNTs. The difference of the process with and without $H_2$ gas using Fe particle density and CNTs morphology as endpoints was tested to study the role of $H_2$ in the formation of Fe particles. CNTs were first grown under He gas without introduction of $H_2$ gas on chips with $R_s$ of 9.0 MΩ/sq, 150, 60.8, 18.1, and 1.8 kΩ/sq. As shown in FIGS. 3A-3H and FIGS. 5A-5F, it was found that the CNTs in the resulting forests are more curled and shorter than forests grown using a $H_2$/He gas mixture.

Figure 6A:
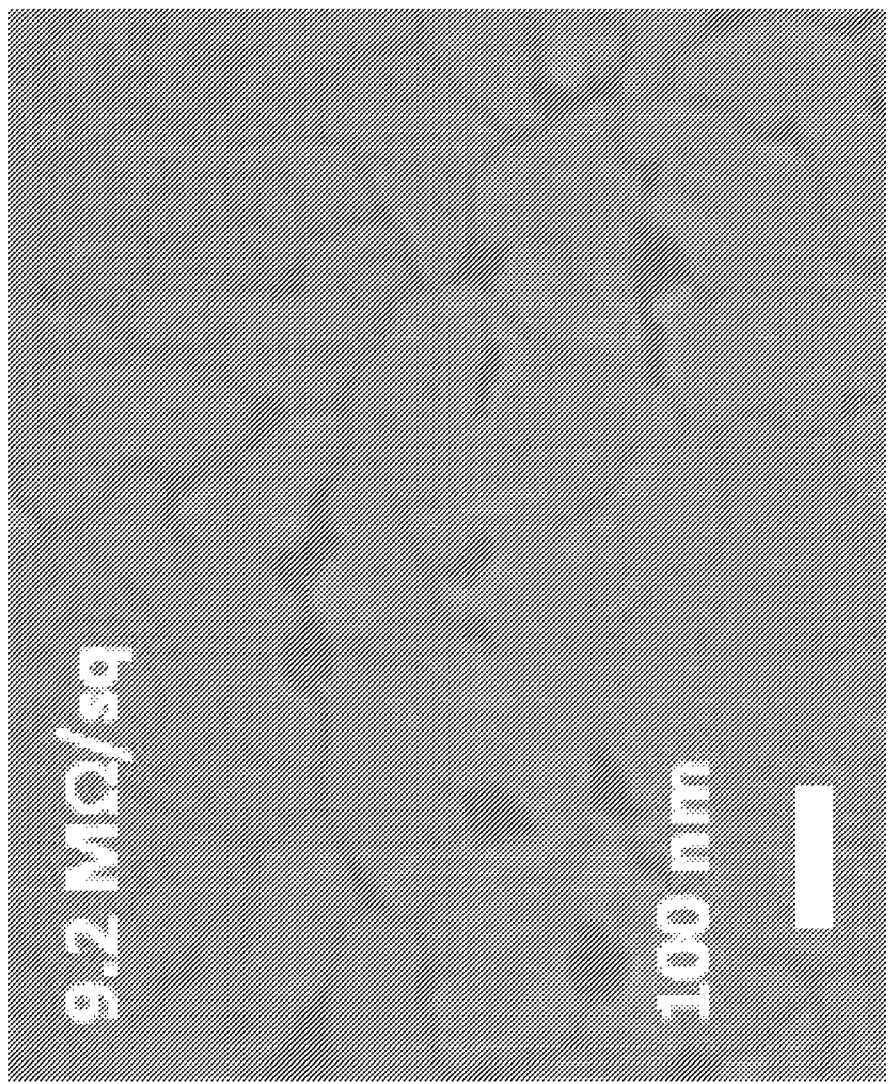
FIGS. 6A-6C are SEM images showing the surface morphology of annealed Fe films under He gas.
Figure 6B:
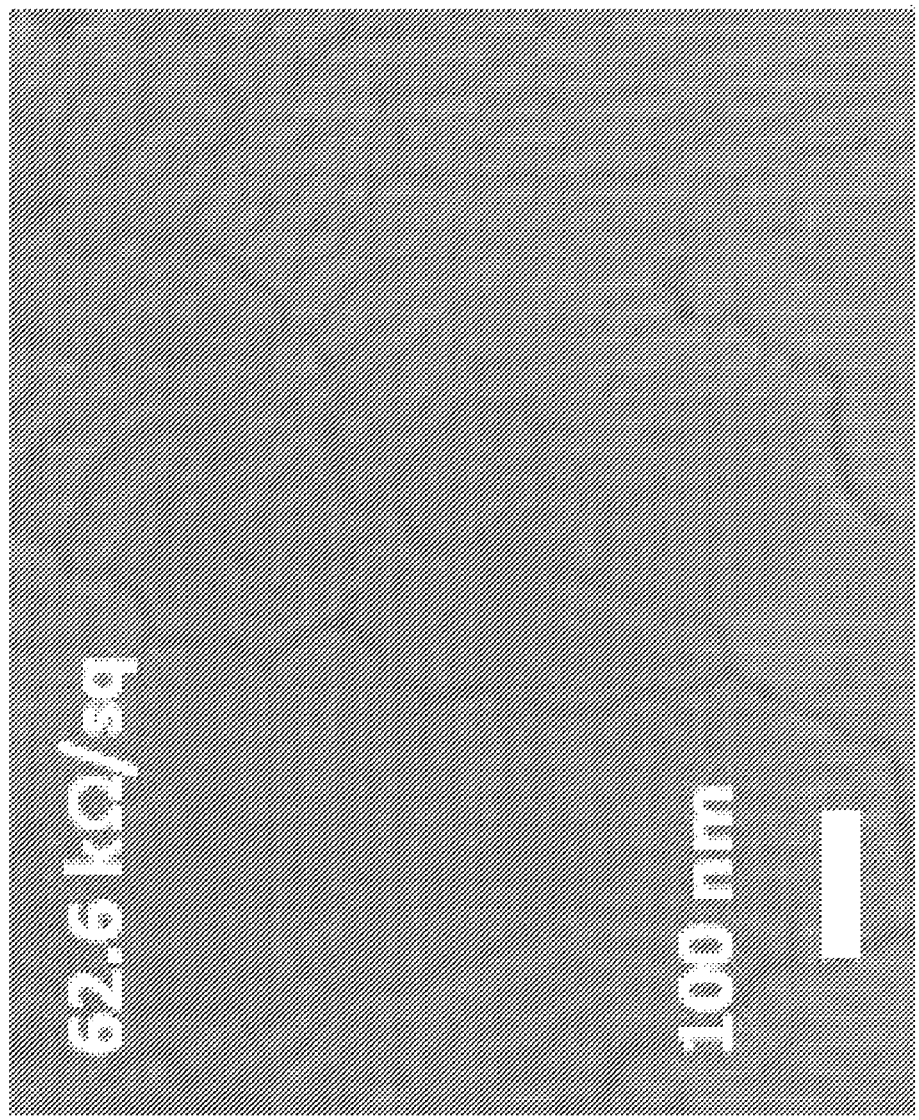
Figure 6C:
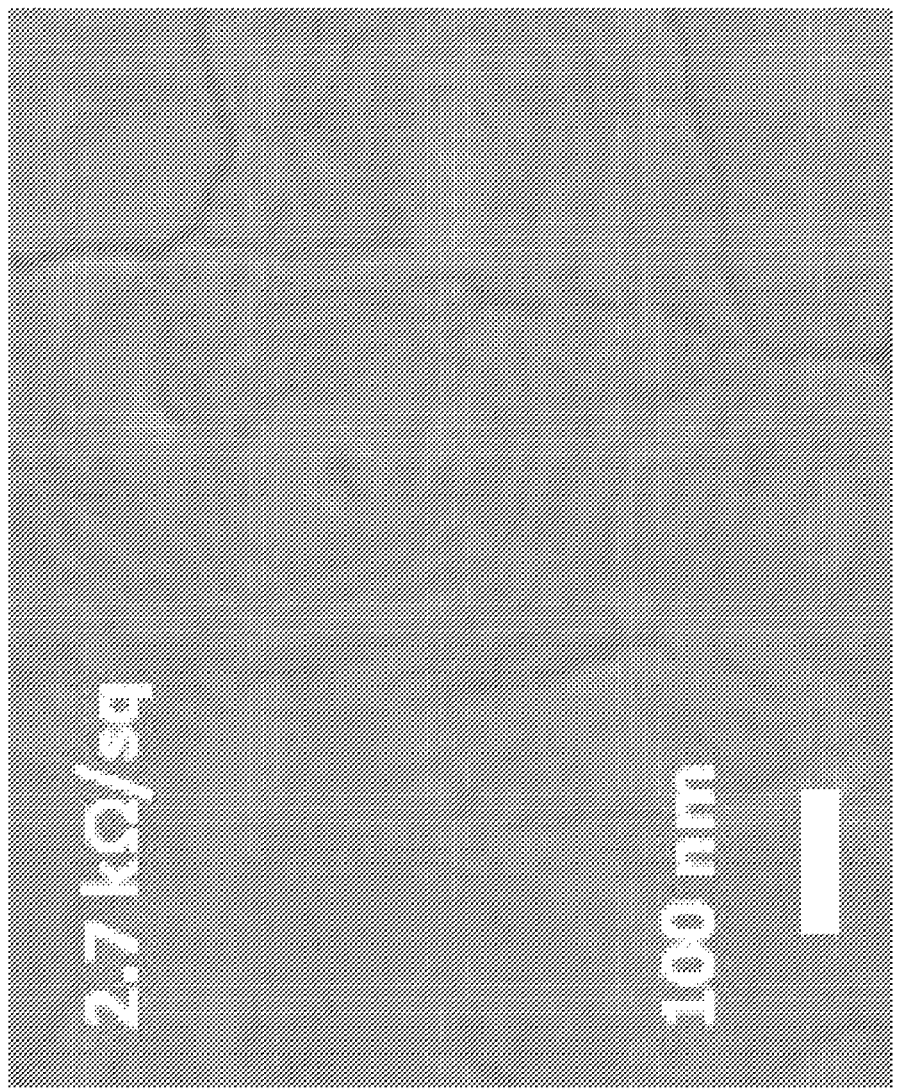

To investigate this phenomenon, chips having $R_s$ of 9.2 MΩ/sq, 62.6, and 2.7 kΩ/sq were annealed using the same CNTs growth conditions without the introduction of $C_2H_2$ and $H_2$. As shown in FIGS. 6A-6C, the Fe films annealed under He gas did not readily form nanoparticles, but instead form plate-like films in the SEM images.

Such more-or-less contiguous films were not expected to be able to form the proper nucleation sites for the growth of MWCNTs or have a sufficient density of Fe nanoparticles unless they could be broken up in subsequent processing steps. This is consistent with the growth results shown above. These plate-like films apparently form when the Fe film was annealed in an inert gas ambient (He). Since the addition of $H_2$ to the anneal gas promoted the formation of Fe nanoparticles, this suggests that iron oxide in or on the as-deposited Fe film must be active in preventing Fe nanoparticle formation during the thermal anneal.

It is believed, then, that $Fe_xO_y$ must help to maintain the continuity of the Fe film or at least to prevent the isolation of individual nanoparticles. Thus, reduction of iron oxide appears to have an important impact on the production of Fe nanoparticles. On the other hand, hydrogen helped prevent the agglomeration of as-formed Fe nanoparticles such as Ostwald ripening, which helps keep them small. Both models revealed that $H_2$ gas likely played a key role in generating the appropriate dimension Fe nanoparticles. This is significant to the growth of dense as well as controlled diameter MWCNTs. Given that CNTs growth did occur without $H_2$ in the anneal step, it appeared that $C_2H_2$ can also reduce iron oxide to some degree and assist in the formation of nanoparticles just before the initial nucleation step of the CNTs growth [Nishimura K, Okazaki N, Pan L, Nakayama Y. In situ study of iron catalysts for carbon nanotube growth using x-ray diffraction analysis. Jpn J Appl Phys 2004 43:L471-L474].

It is believed that $C_2H_2$ gas before the initial nucleation step did not generate Fe nanoparticles as well as $H_2$ gas. This was why $H_2$ gas can be generated from acetylene decomposed at Fe catalyst surface and the generated $H_2$ gas can reduce iron oxide [Perez-Cabero M, Taboada J B, Guerrero-Ruiz A, Overweg A R, Rodriguez-Ramos I. The role of alpha-iron and cementite phases in the growing mechanism of carbon nanotubes: a $^{57}$Fe Mossbauer spectroscopy study. Phys Chem Chem Phys 2006 8:1230-1235]. Such phenomenon can be investigated utilizing a mechanistic study.

Electrical and Optical Properties of CNT Sheets

Figure 7A:
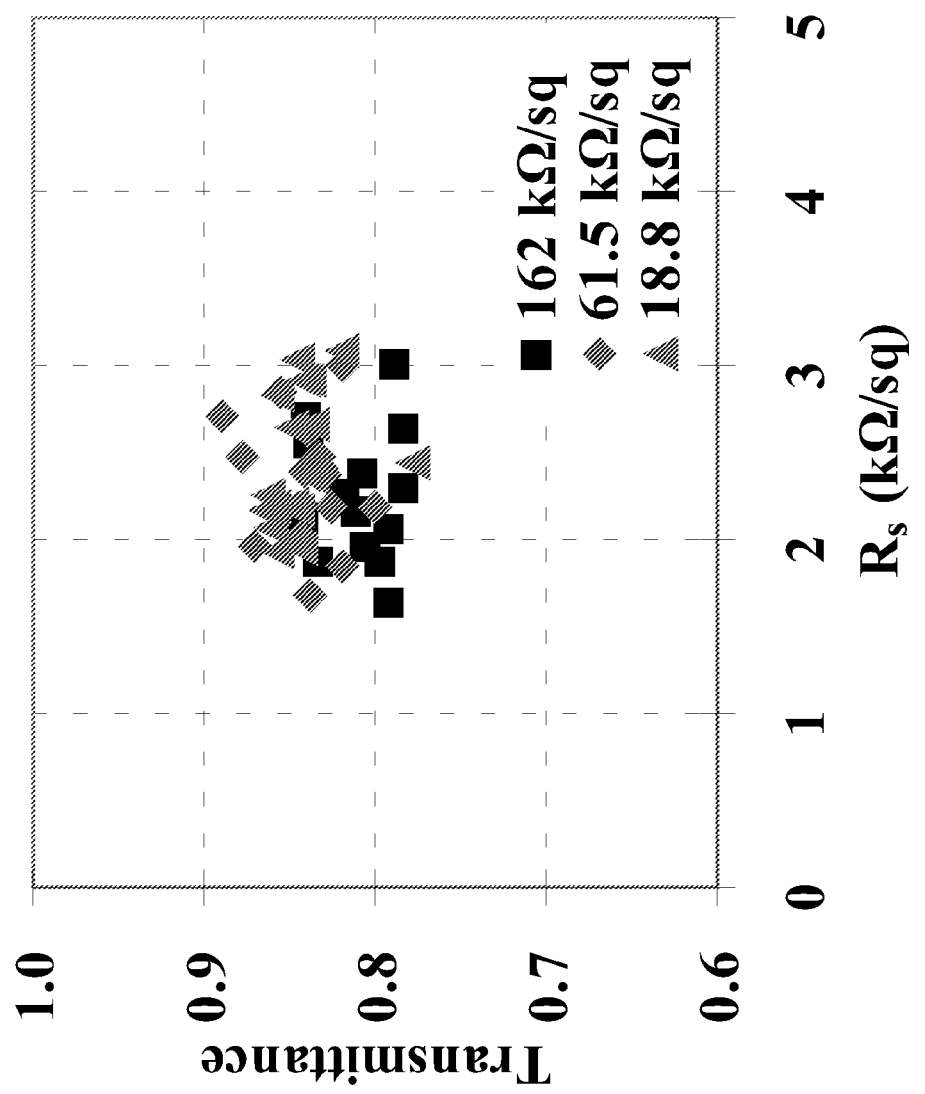
FIGS. 7A-7B show the optical transmittance at 550 nm of MWCNT sheets as a function of the electrical sheet resistance of the MWCNT sheet.
Figure 7B:
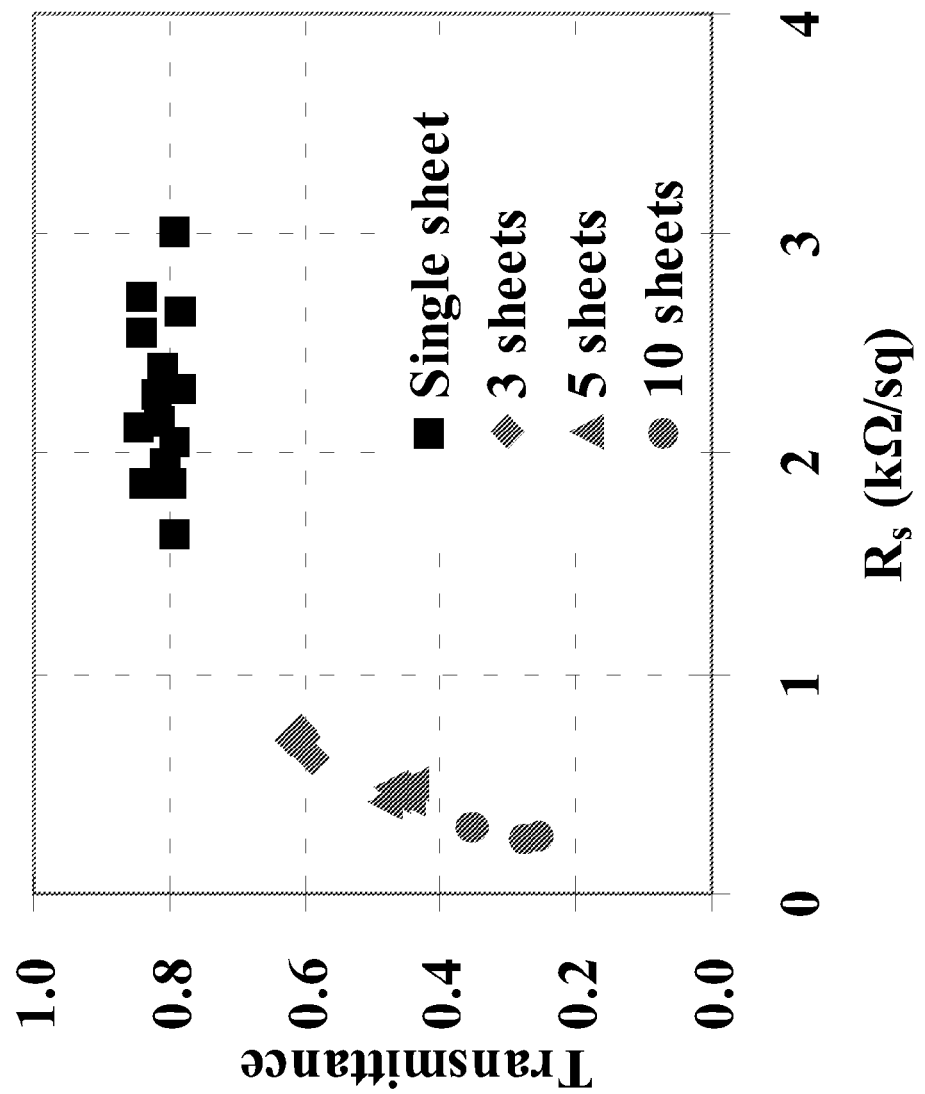
Figure 8A:
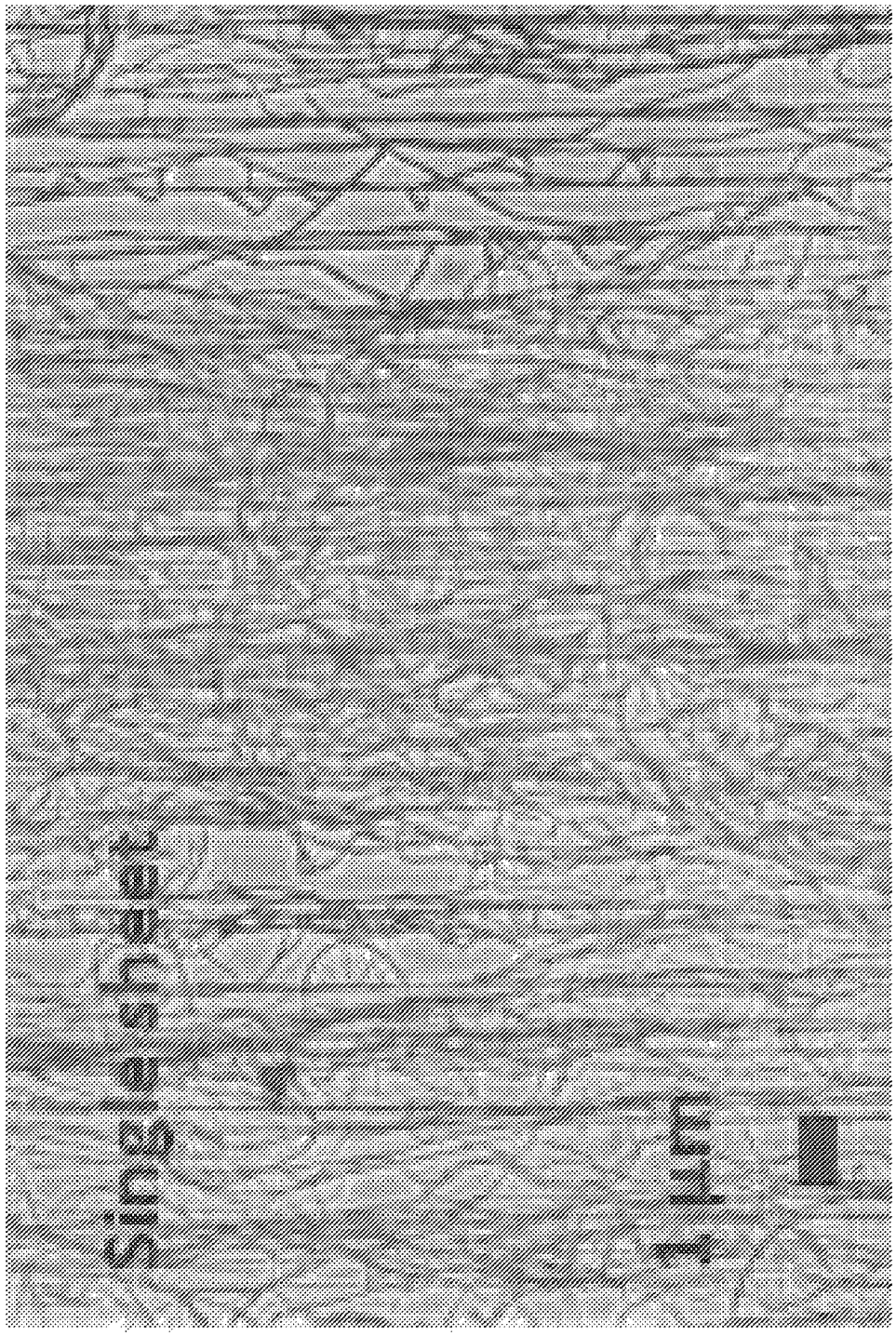
FIGS. 8A-8D are SEM images showing the morphology of MWCNT multi-sheets. These SEM images were obtained from CNT sheets on respective electrodes.
Figure 8B:
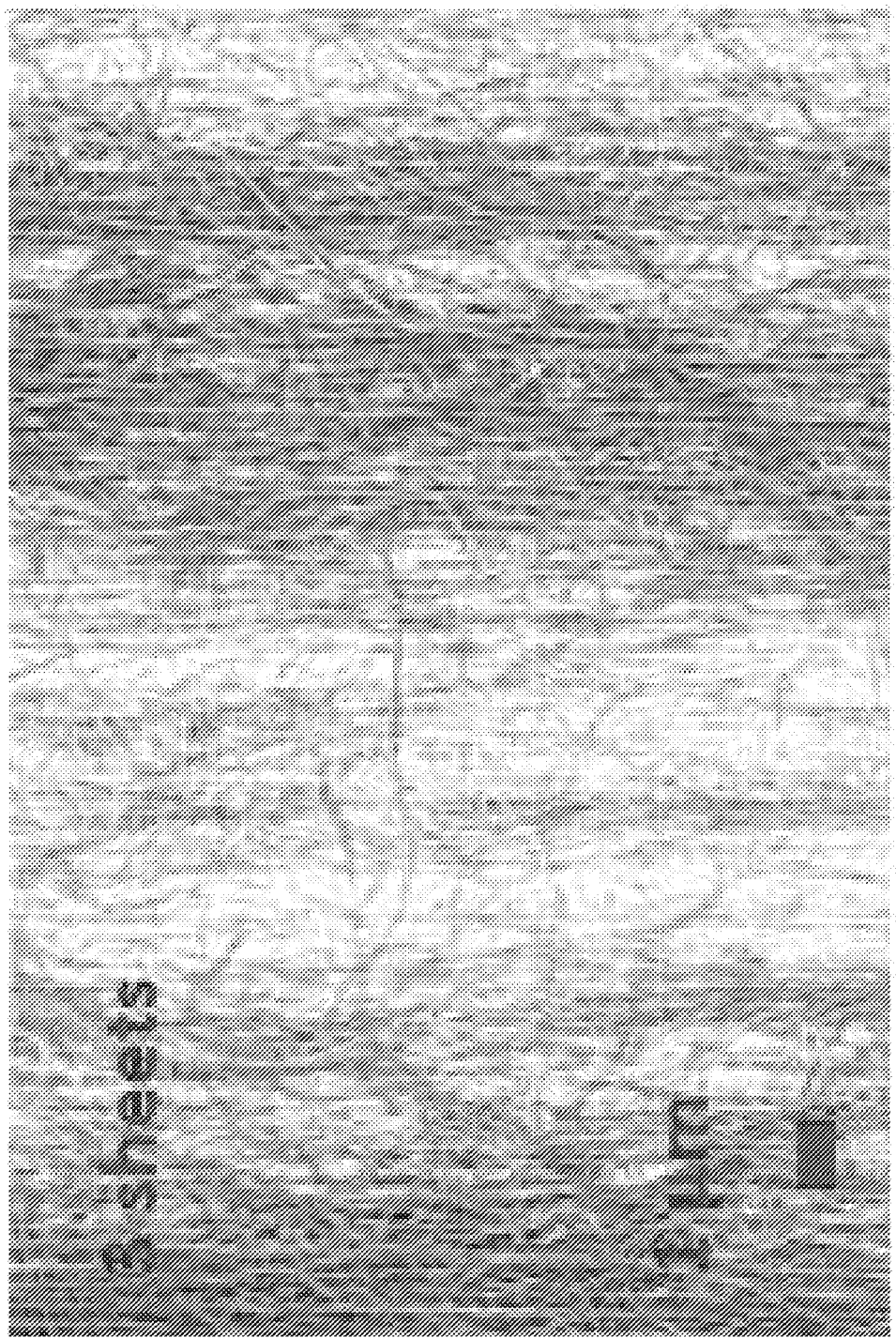
Figure 8C:
Figure 8D:
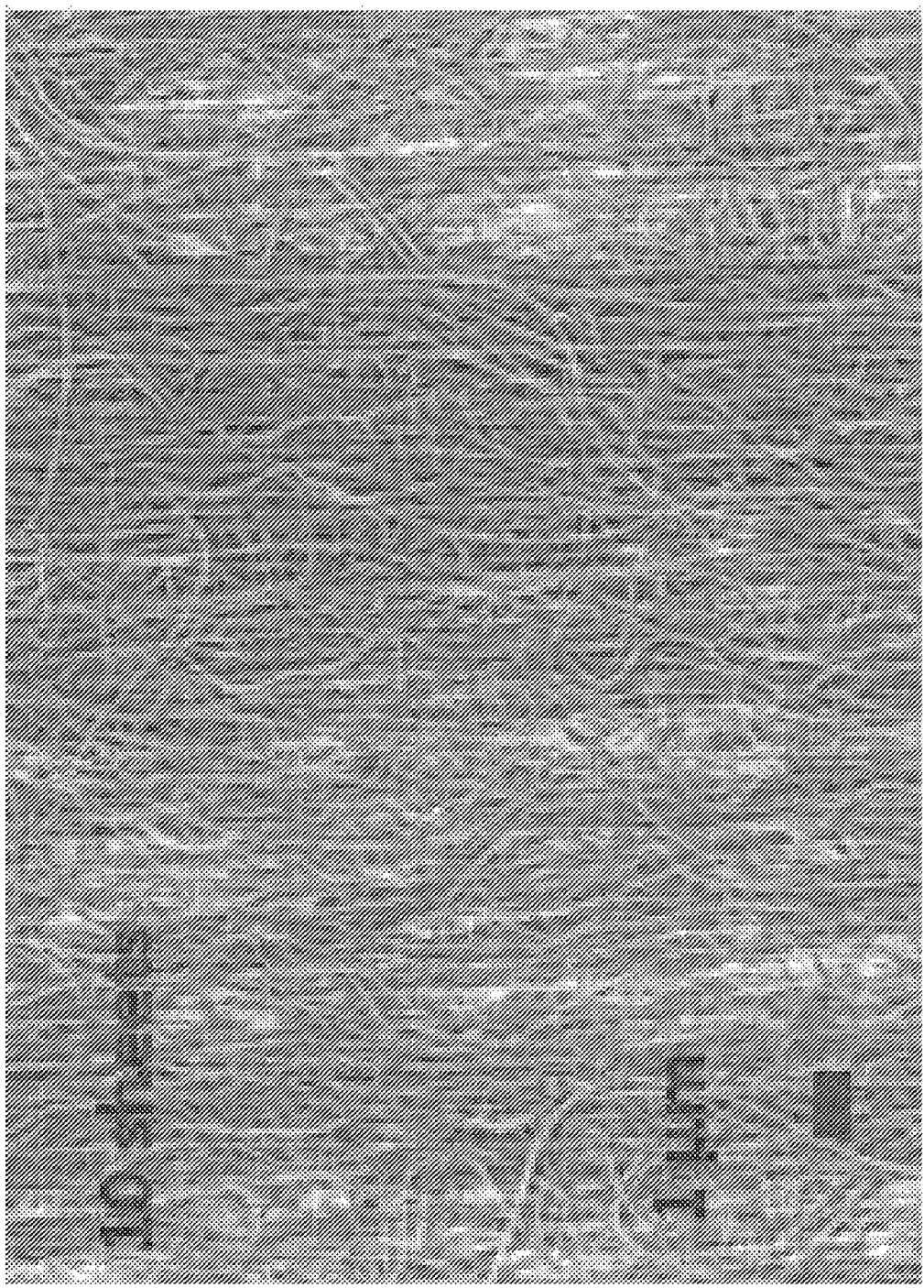
Figure 9A:
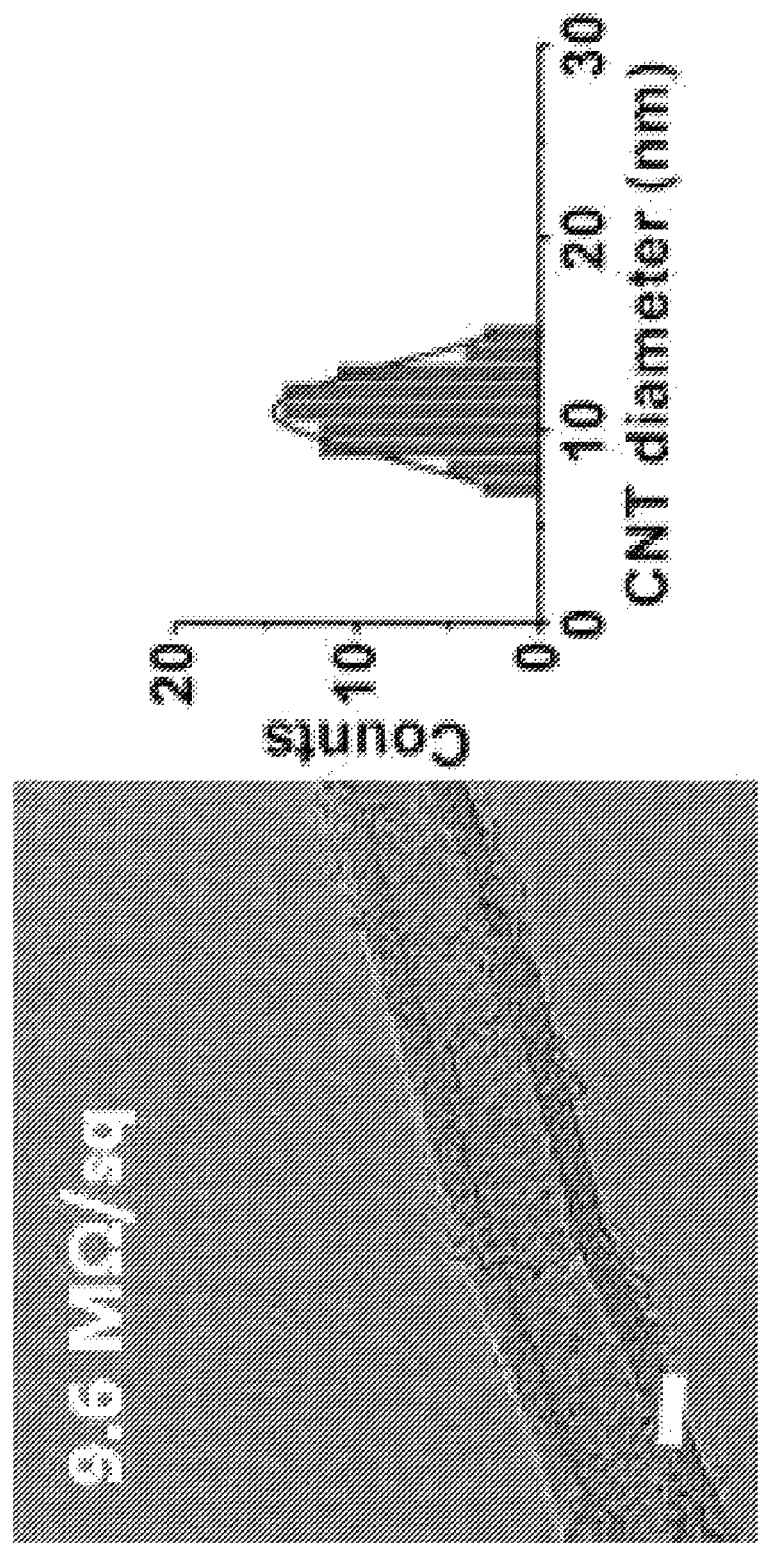
FIGS. 9A-9G are TEM images and histograms of the average diameters (and the standard deviation) of CNTs associated with various $R_s$ with Gaussian fitting (solid lines).
Figure 9B:
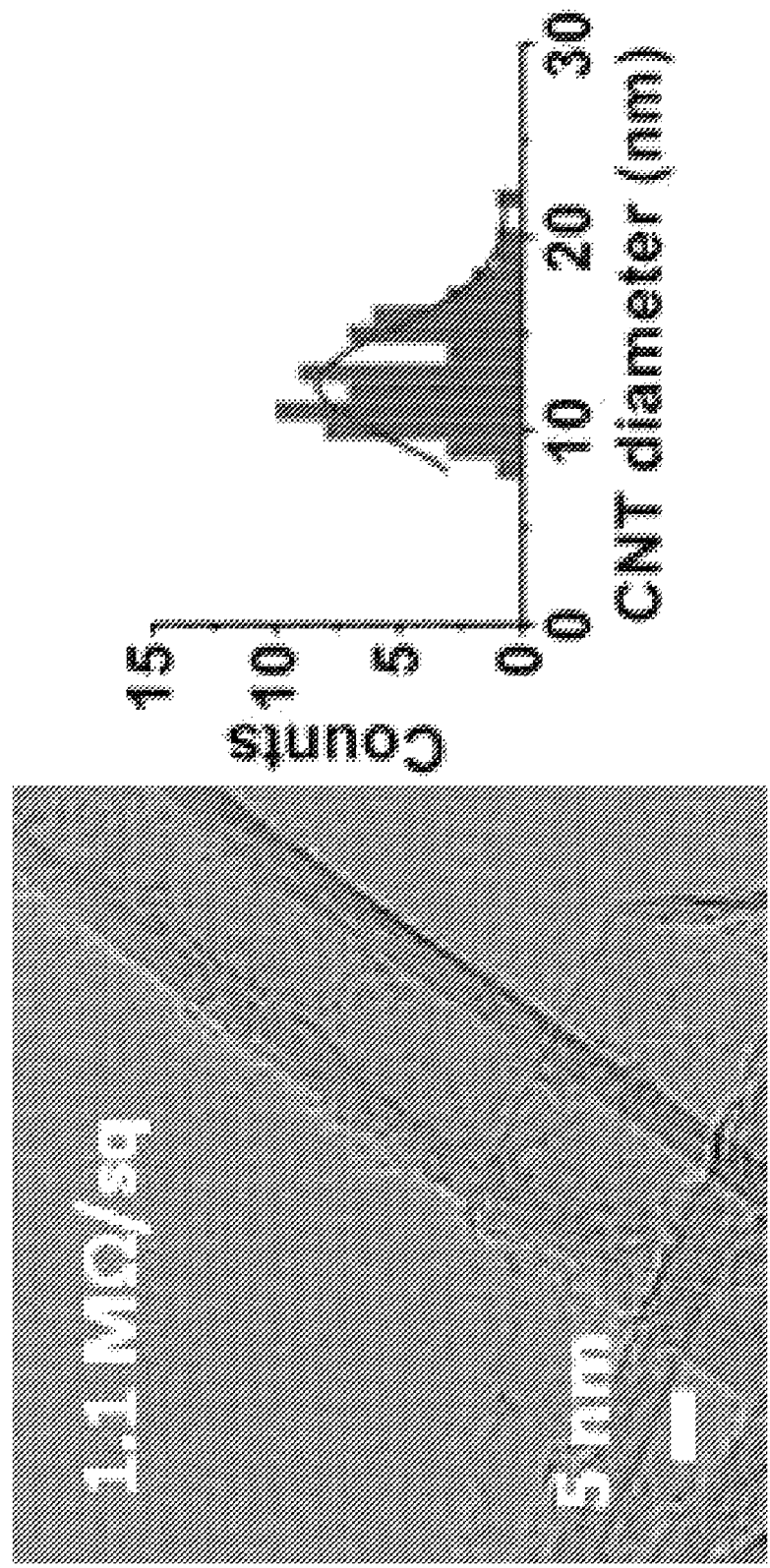
Figure 9C:
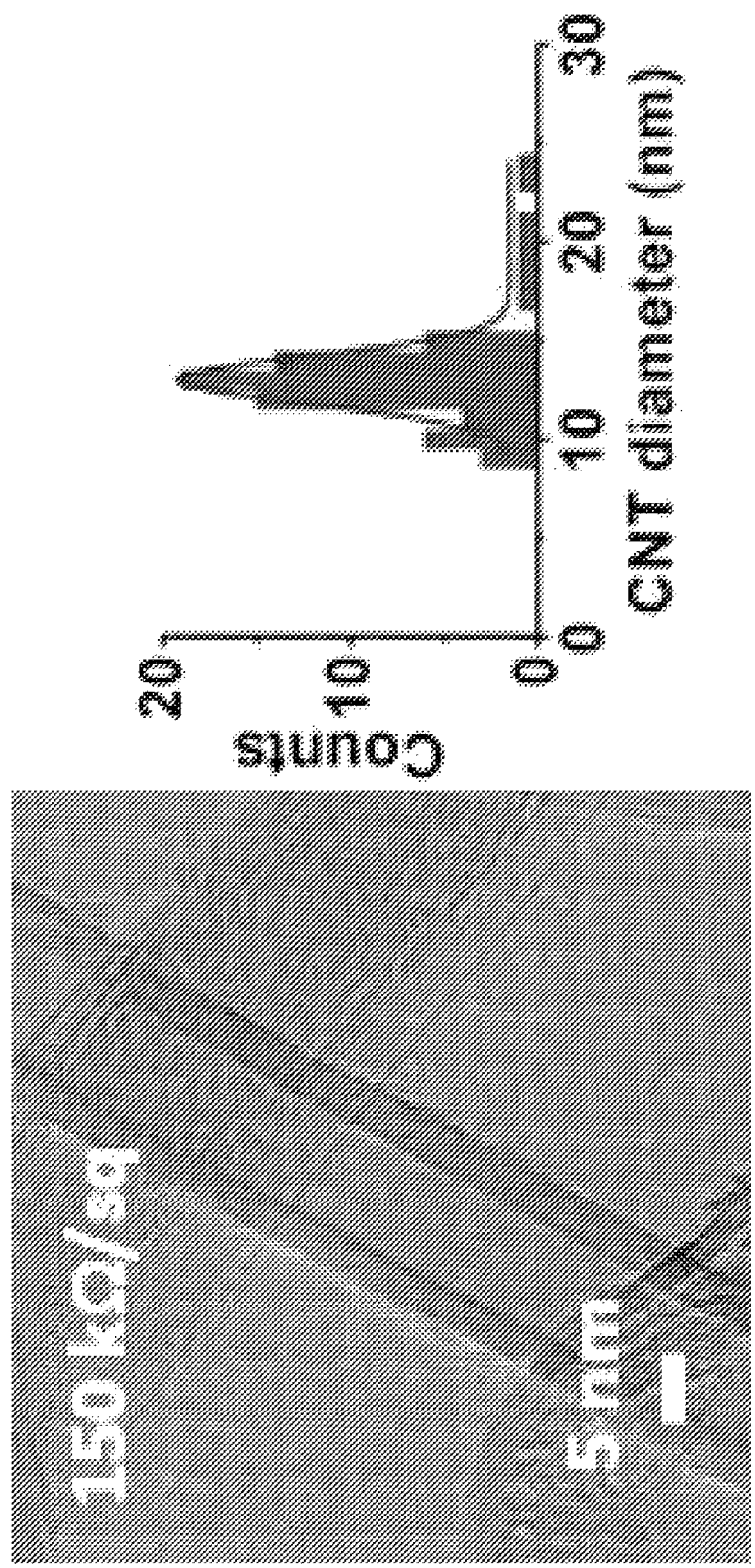
Figure 9D:
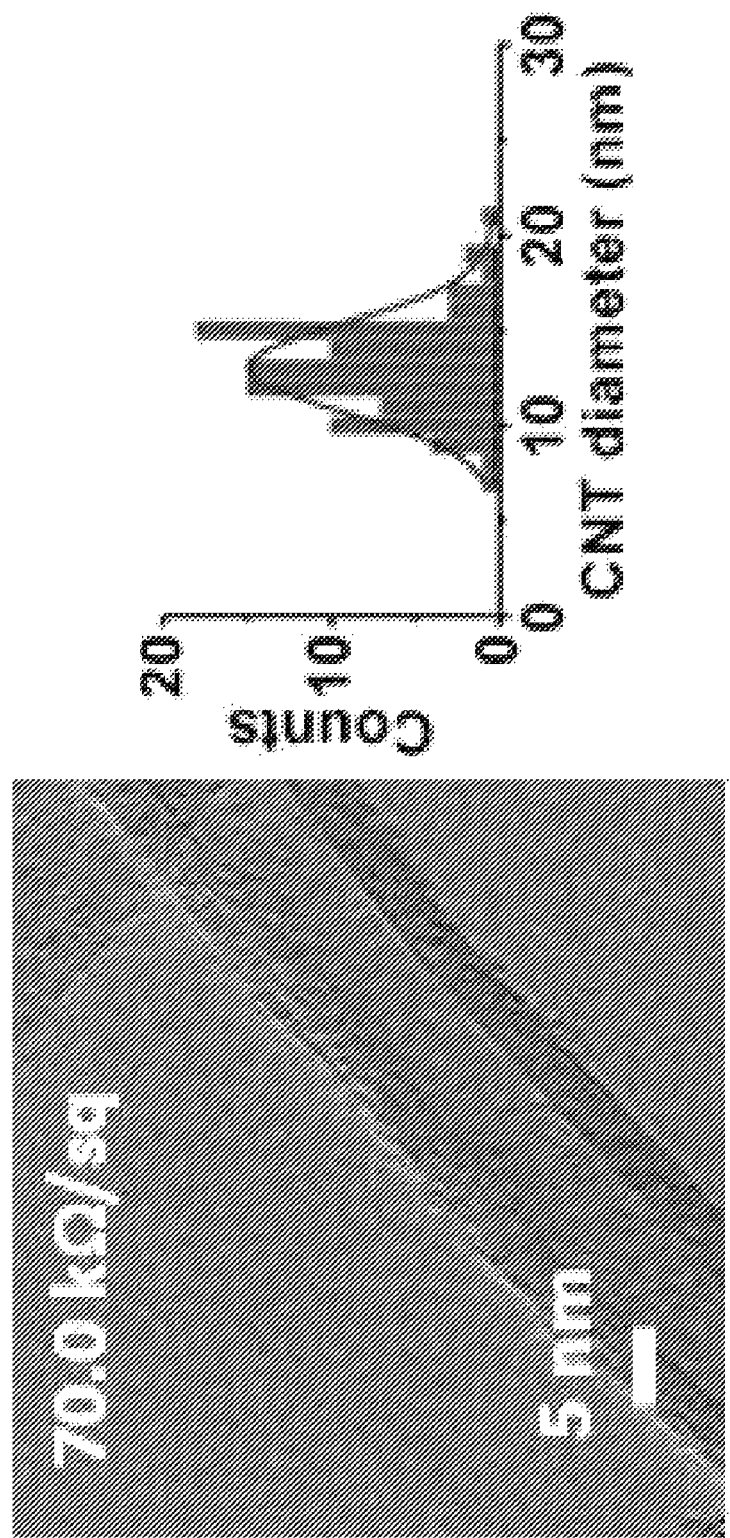
Figure 9E:
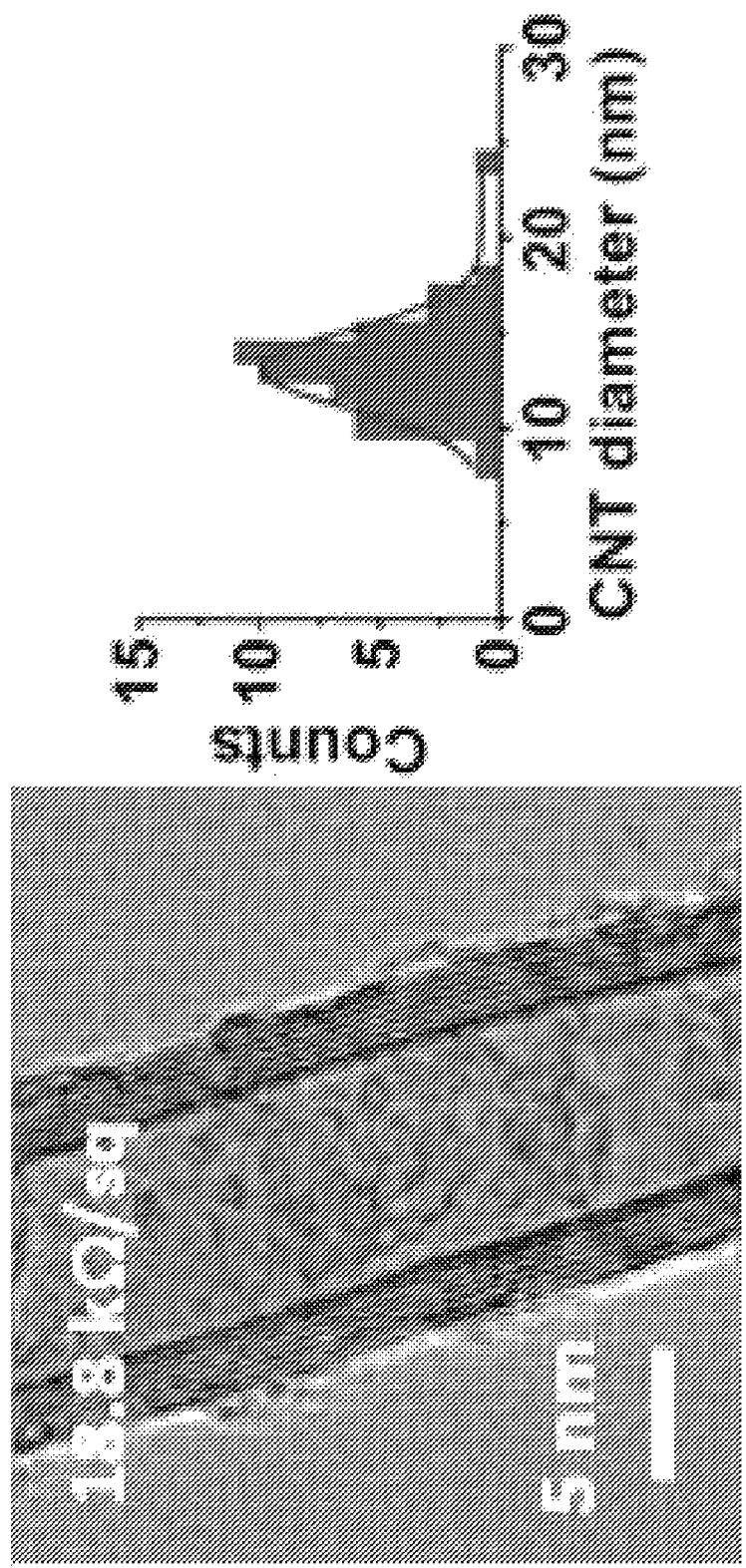
Figure 9F:
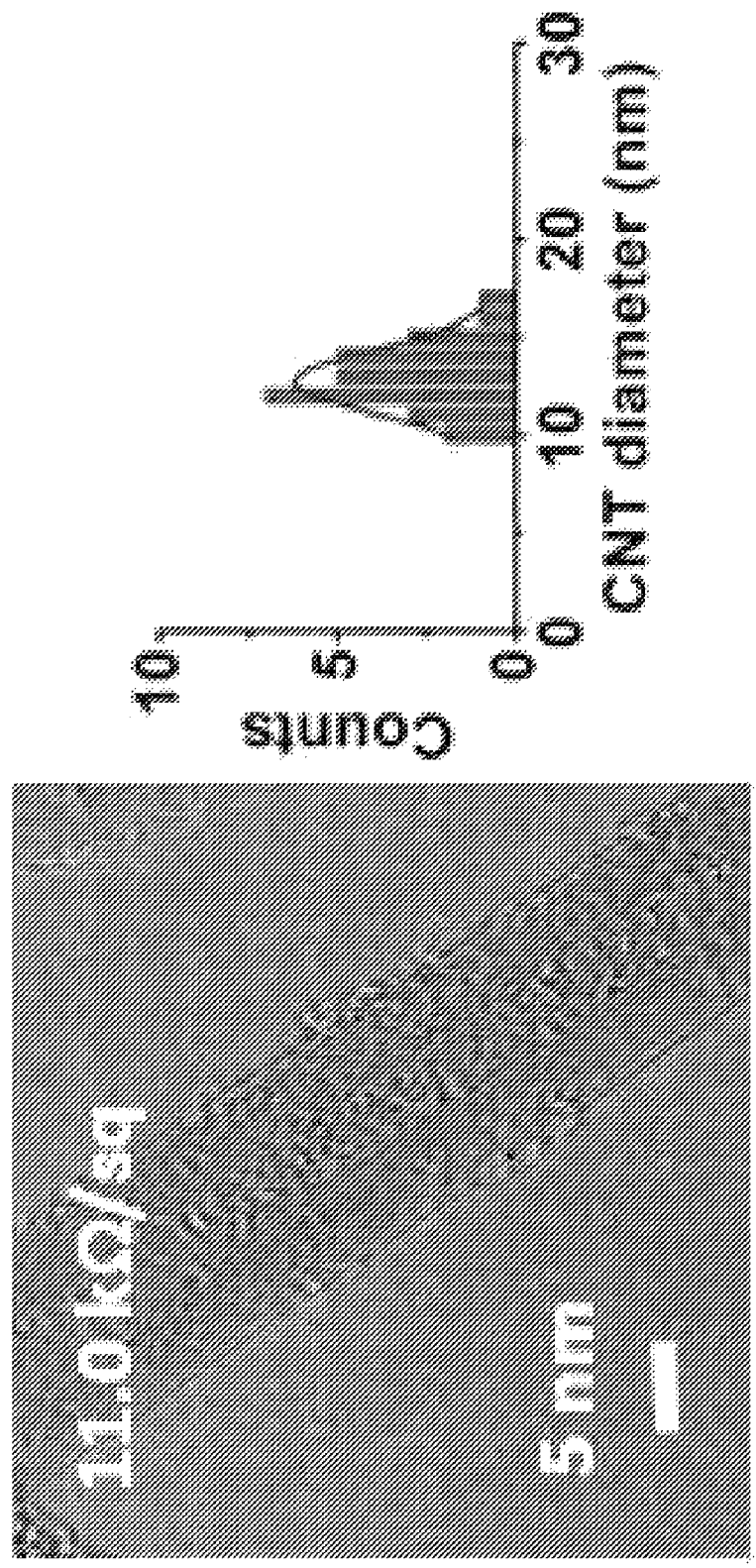
Figure 9G:
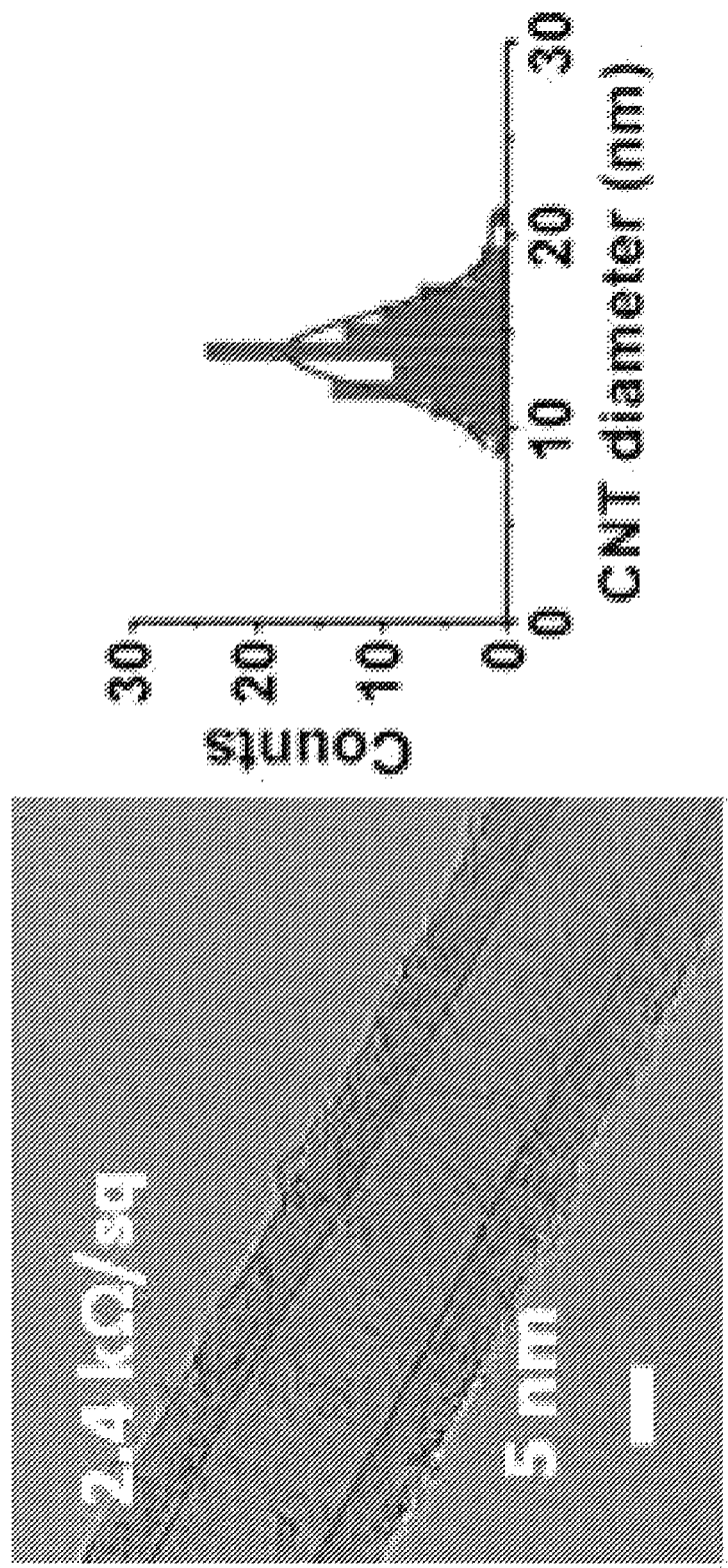
Figure 10A:
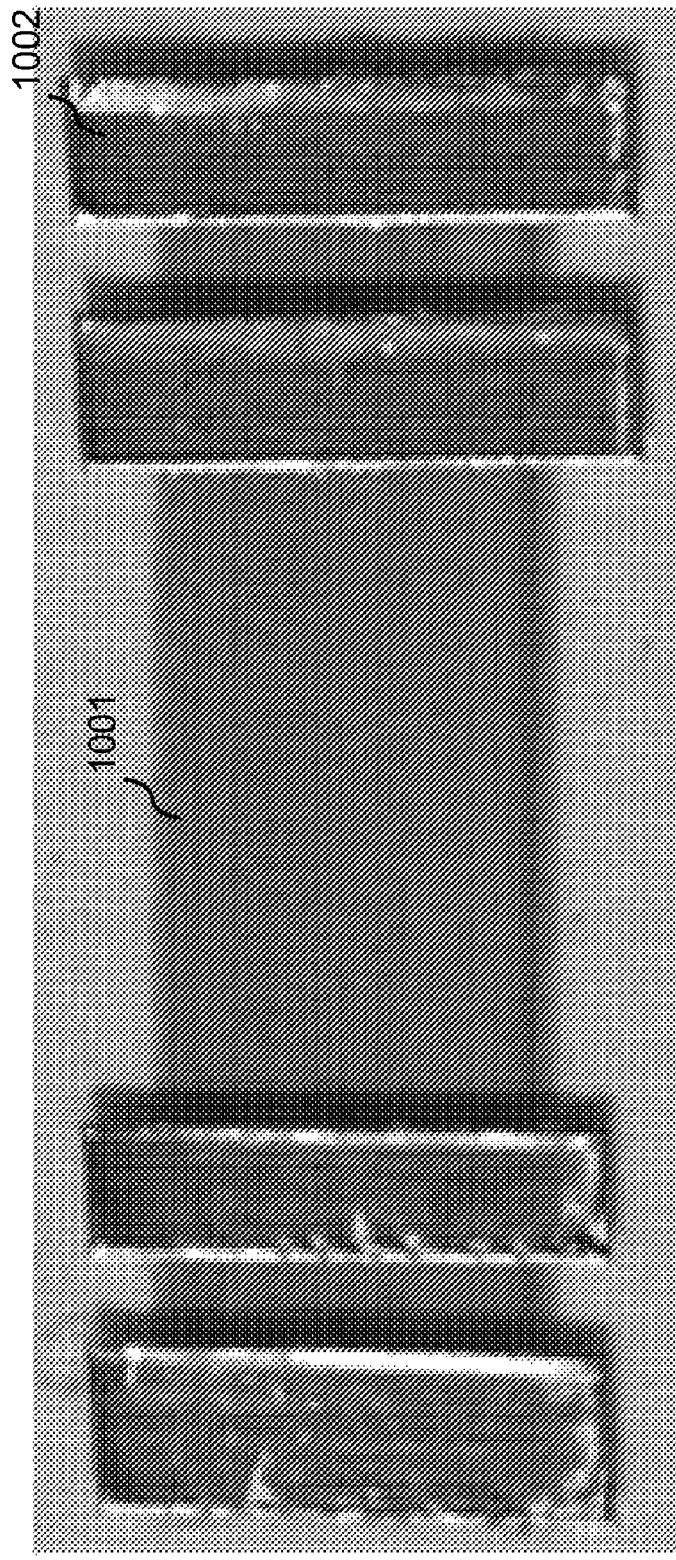
FIG. 10A is MWCNT sheets 1001 transferred onto glass substrates (with copper tape 1002) for a 4-point probe measurement.
Figure 10B:
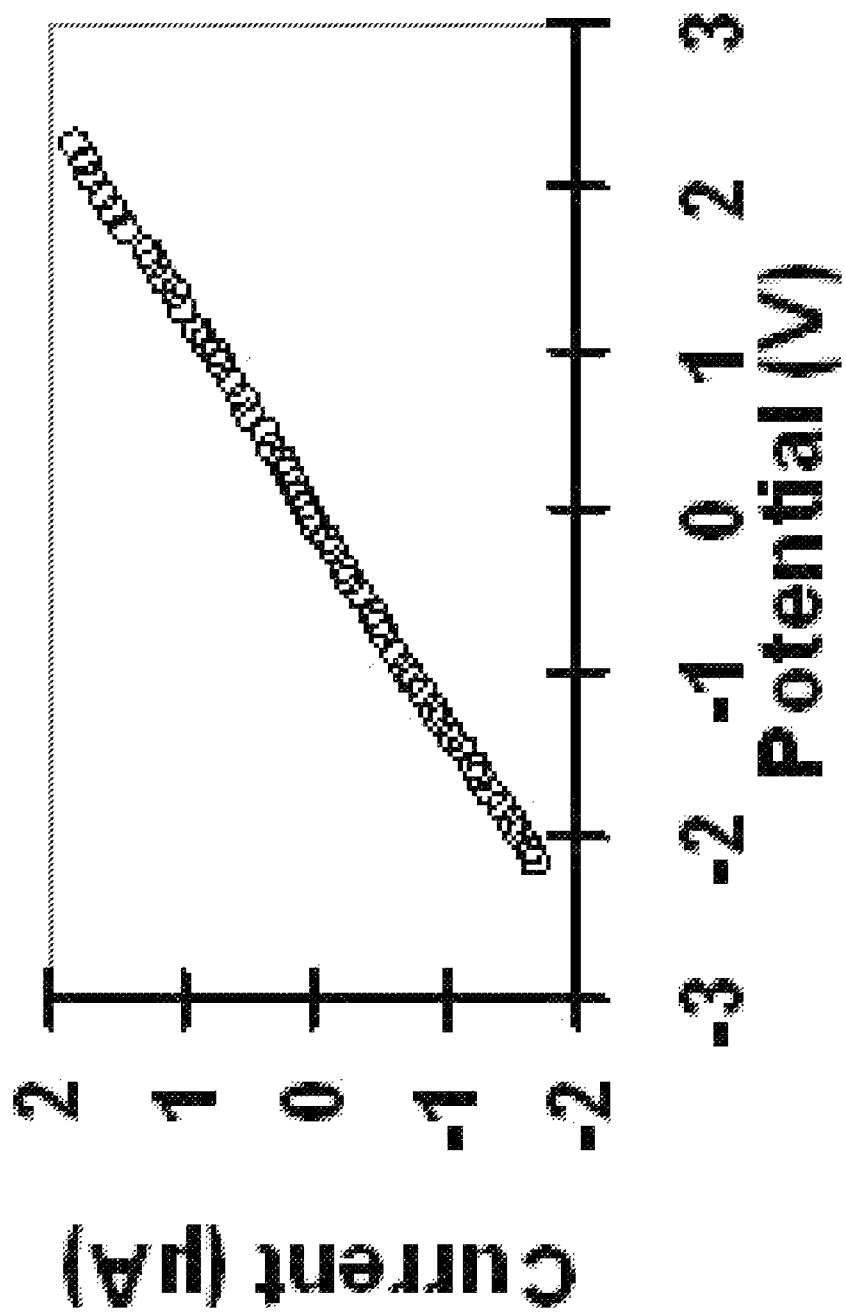
FIG. 10B is an I-V curve measured by 4-point probe.

The electrical and optical properties of CNT sheets obtained from Fe films were compared with $R_s$ of 160, 62.0 and 19.0 kΩ/sq in order to investigate their feasibility for applications such as transparent electrodes, flexible displays, and composites. The sheets tested were between 4 and 10 mm wide and between 8 and 14 mm long. Ethanol drops were added onto the CNT sheets on top of a glass substrate after the sheets were pulled to make them adhere tightly. Subsequently, four copper tape electrodes were attached in order to perform a 4-point probe measurement (see FIGS. 10A-10B). FIGS. 7A-7B show the outcome of these experiments.

The transmittance of the CNT sheet was plotted versus the sheet resistance of the same CNT sheet in FIG. 7A. It can be seen that the sheet resistance of a single CNT sheet did not vary much. The resistance of a single sheet did not show a definite dependence on the $R_s$ of the Fe film (the different color data-markers) but all seemed to range between 1.5~3.0 kΩ/sq. Such phenomenon was not predicted. The CNT diameter in the sheets was in the range of 12.5~13.0 nm, and the forest heights were all in the range of 420 ~375 nm. These were small differences even though the $R_s$ of the Fe film can vary by much more. As a consequence, the variation in the sheet resistances could reasonably be small too. In addition, the variations which occur between different sheet samples from the same forest were significant. Therefore, any correlation between the $R_s$ of the sheets and the $R_s$ of the Fe film would be difficult to see. The optical transmittance at 550 nm wavelength was in the range 0.78 to 0.89.

This transmittance is larger by ~15%, and the sheet resistance is four times larger than what has been reported in the literature [Liu 2008; M Zhang 2005]. The difference most likely resulted from a difference in the density of pulled CNTs in each sheet rather than any difference in the CNT characteristics.

If instead of using a single sheet, (stacks) multiple sheets are overlaid, then the resistance and transmittance of the multi-sheet decreased. Multi-sheets were prepared from MWCNT forests grown from an $R_s$=160 kΩ/sq Fe film by overlaying either 3, 5 or 10 single sheets. The resulting resistance and transmittance (at 550 nm) of the multi-sheets are shown in FIG. 7B. It can be seen that both the transmittance and resistance decreased as the number of overlaid sheets increased, but in a nonlinear fashion. In addition, the multi-sheets were found to be more consistent in both resistance and transmittance. The large variation in the resistance of a single sheet averaged out in a multi-sheet quickly.

Figure 16A:
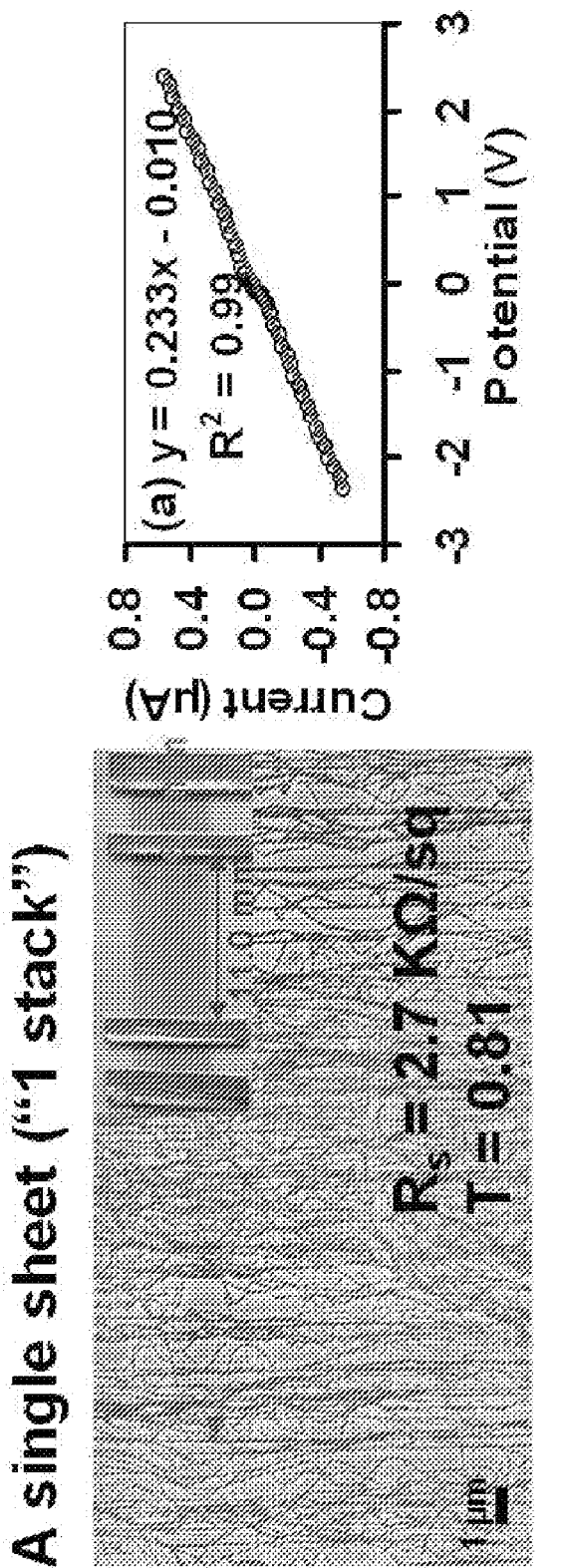
FIGS. 16A-16D are MWCNT sheets (1, 3, 5, and 10, respectively) transferred onto glass substrates with the corresponding I-V curve measured by 4-point probe.
Figure 16B:
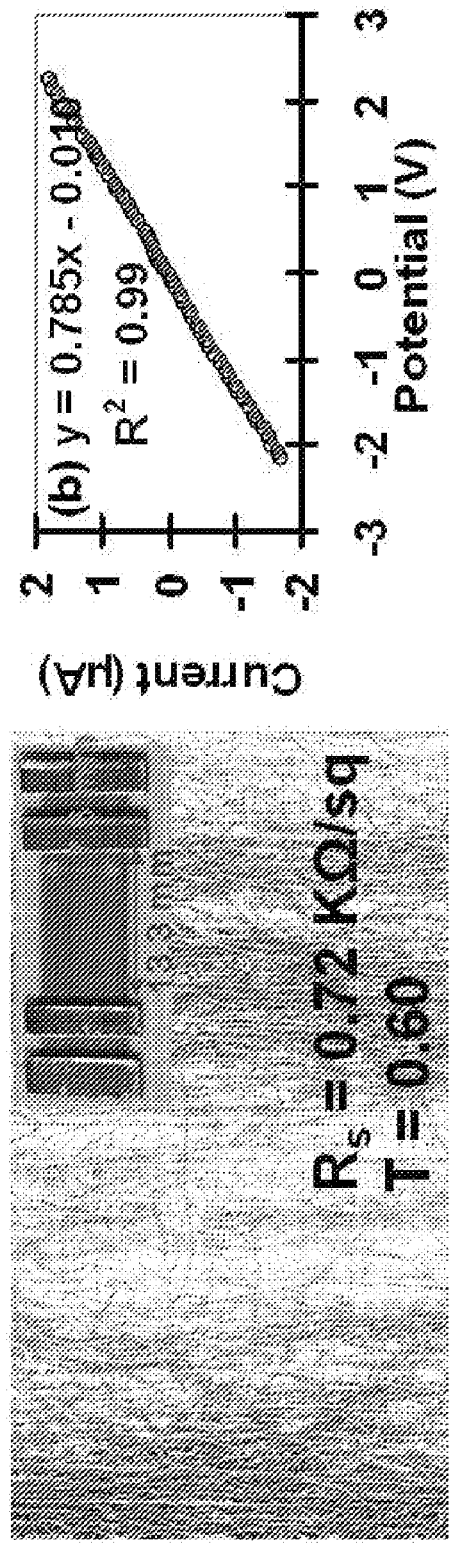
Figure 16C:
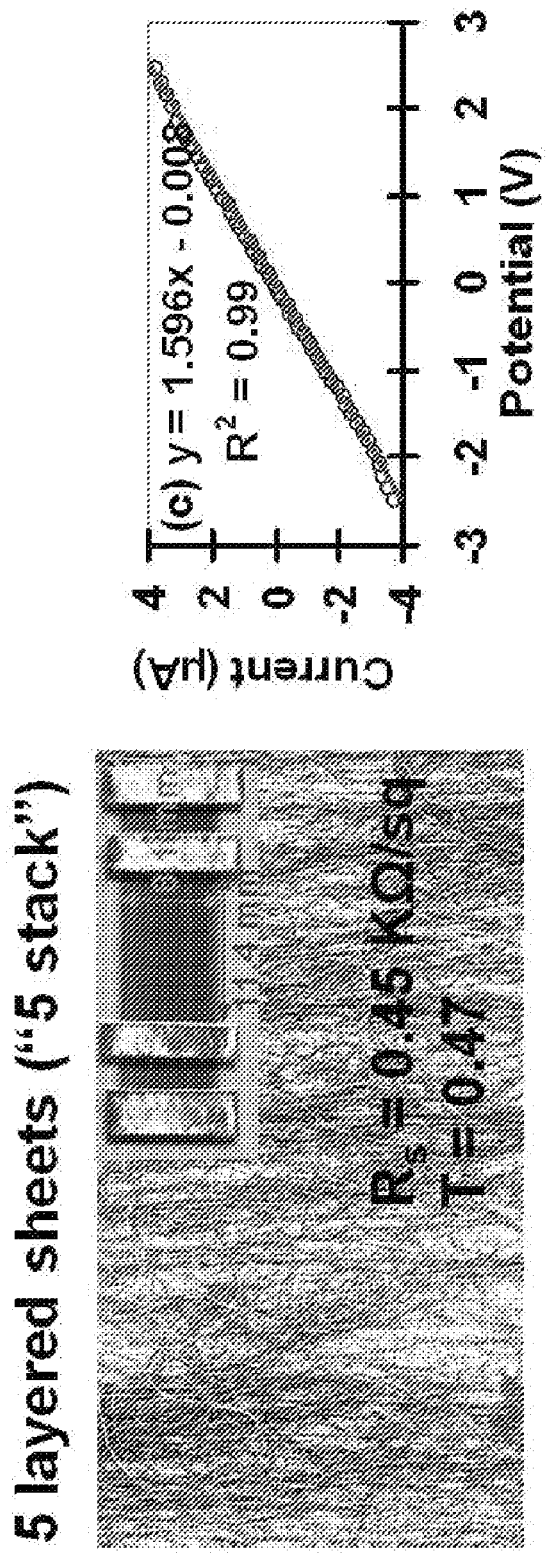
Figure 16D:
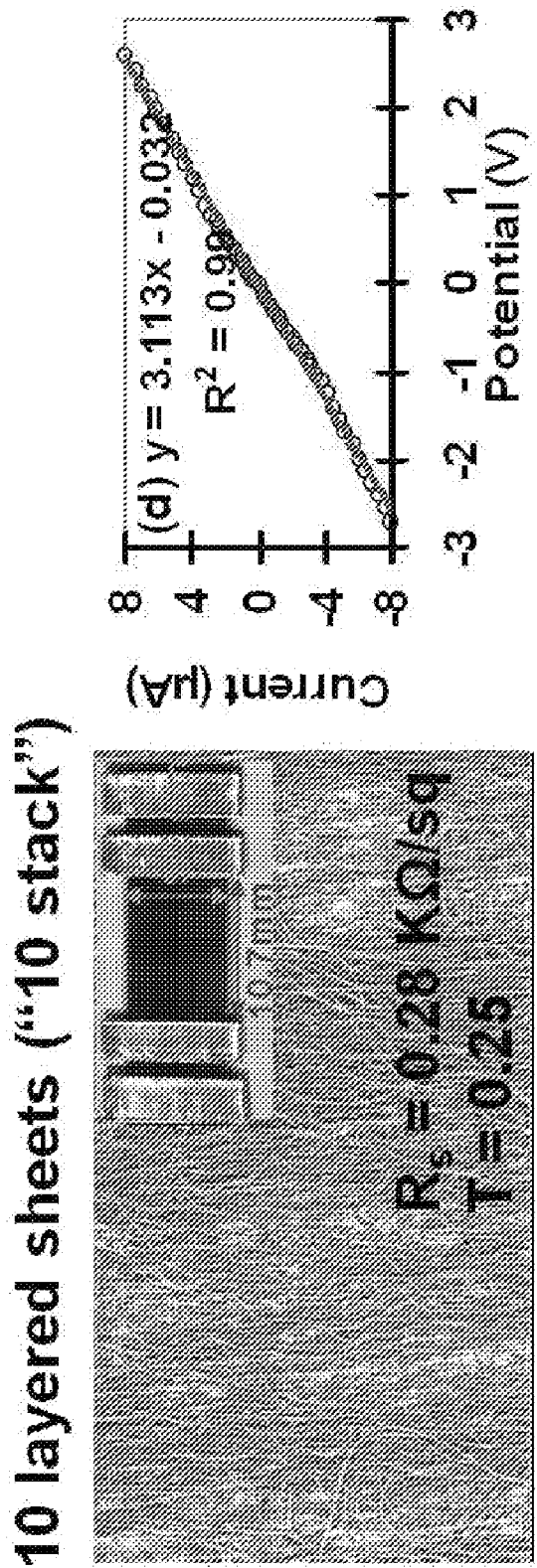
Figure 16E:
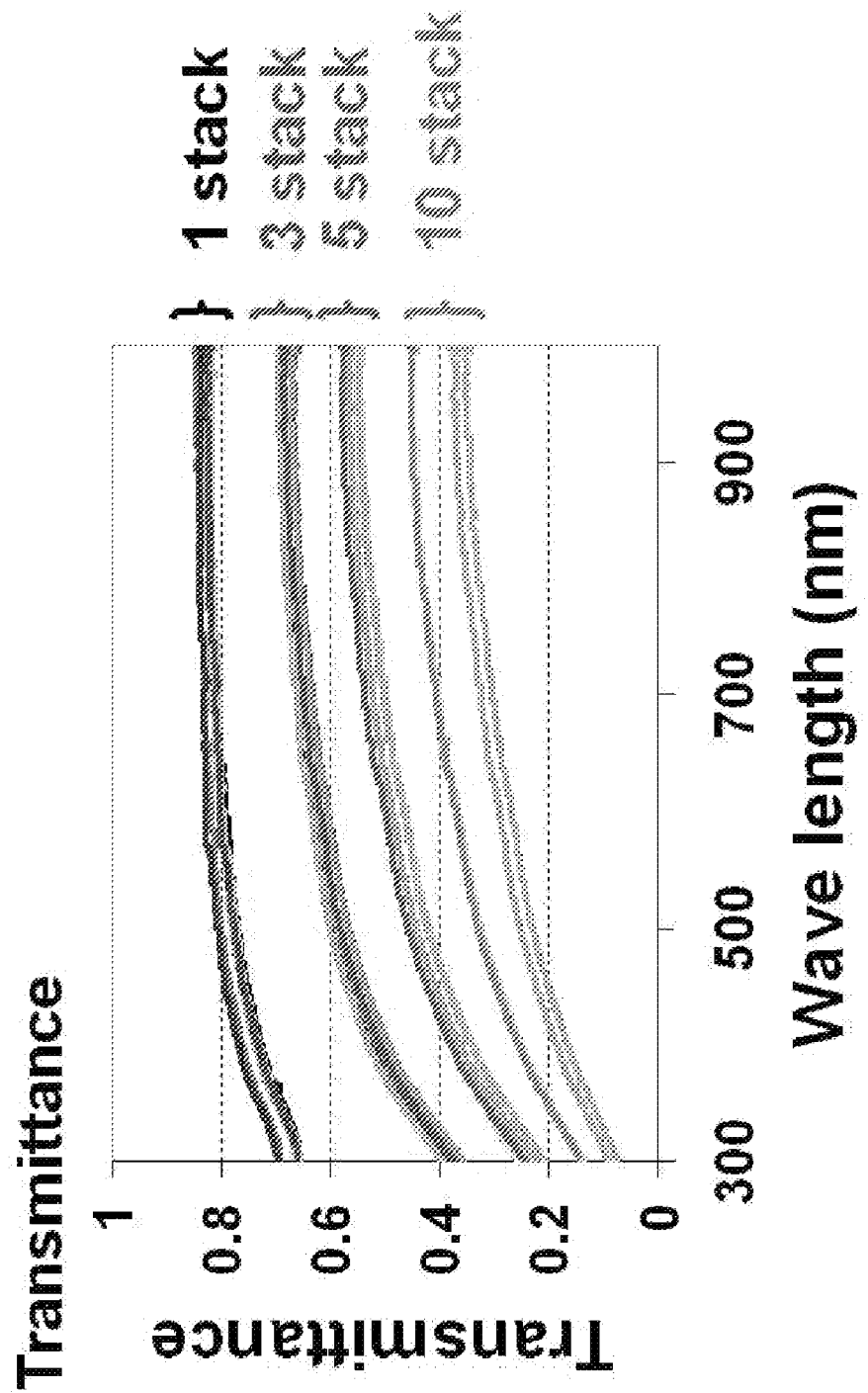
FIG. 16E shows the optical transmittance as a function of wavelength of these MWCNT sheet of FIGS. 16A-16D.
Figure 16F:
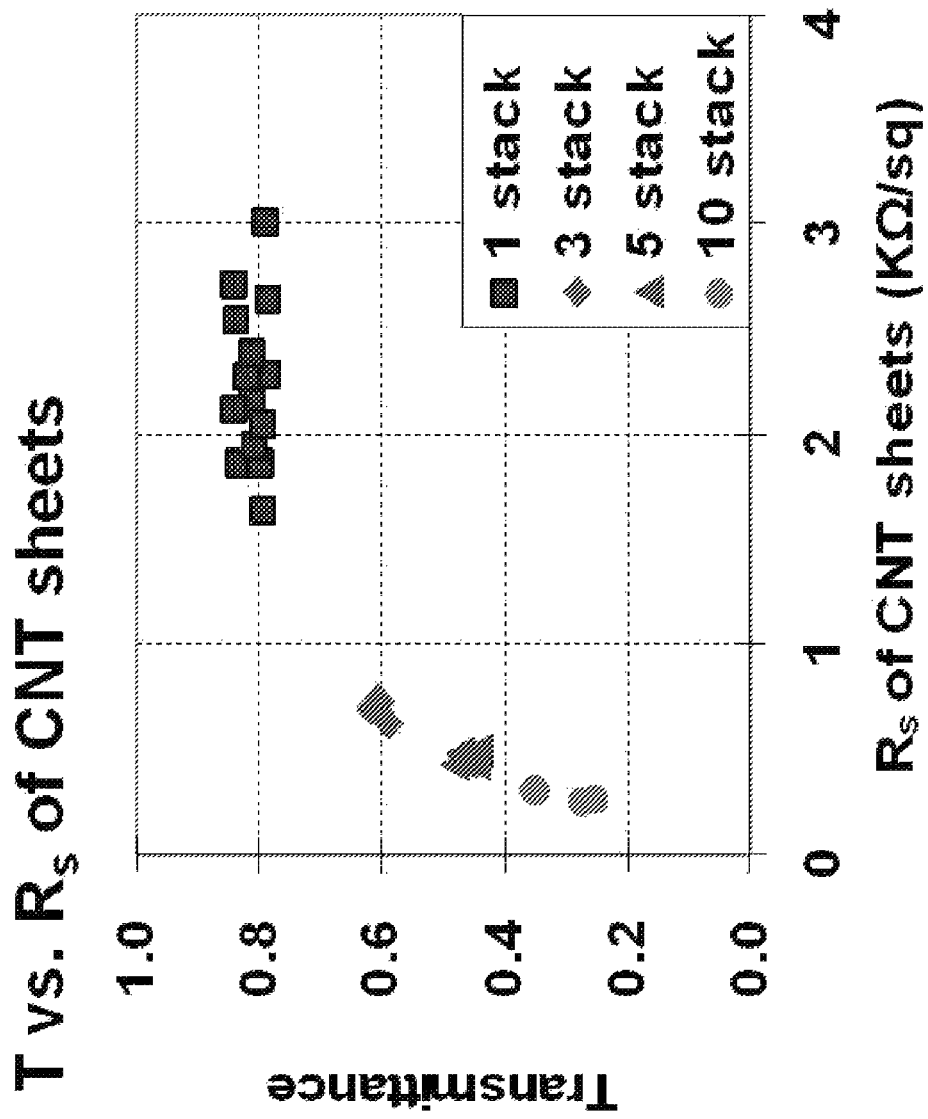
FIG. 16F shows the optical transmittance at 550 nm of MWCNT sheets as a function of the electrical sheet resistance of these MWCNT sheet of FIGS. 16A-16D.

FIGS. 16A-16D are MWCNT sheets (1, 3, 5, and 10, respectively) transferred onto glass substrates with the corresponding I-V curve measured by 4-point probe. FIG. 16E shows the optical transmittance as a function of wavelength of these MWCNT sheet of FIGS. 16A-16D. FIG. 16F shows the optical transmittance at 550 nm of MWCNT sheets as a function of the electrical sheet resistance of these MWCNT sheet of FIGS. 16A-16D.

The SEM images in FIGS. 8A-8D indicated that each single sheet consists of aligned CNT bundles so that the MWCNT density had significant variation across the sheet.

This locally dense structure led to the large variation in the sheet resistance and transmittance of each sheet. When sheets were overlaid, the resulting multi-sheet density became larger and more uniform, leading to both a lower sheet resistance and a lower transmittance with smaller variations.

The relationship between the spinning capability of MWCNT forests and the behavior of Fe catalyst films have been characterized by measuring the sheet resistance of the Fe catalyst films and correlating it to AFM thickness measurements. The spinning capability depends on the alignment of adjacent MWCNTs in the forest which in turn results from the synergistic combination of a high areal density of MWCNTs and short distance between the MWCNTs. This can be realized by starting with both the proper nanoparticle size at a sufficient density. In particular, the starting thickness of an Fe film along with $H_2$ gas in the ambient during the anneal process both play key roles in controlling the nanoparticle density. Proper Fe catalyst film thickness and the use of $H_2$ to reduce any iron oxides are significant factors for generating suitably sized Fe nanoparticles. The optical transmittance and sheet resistance of single MWCNT sheets showed significant variations between samples. When multiple sheets were laid on top of one another, the multi-sheet, sheet resistance and optical transmittance were both reduced and much more consistent. This is opens a practical route for controllable and reproducible spin-capable MWCNT forests.

Mechanism MWCNTs Are Pulled From Forests

Figure 13:
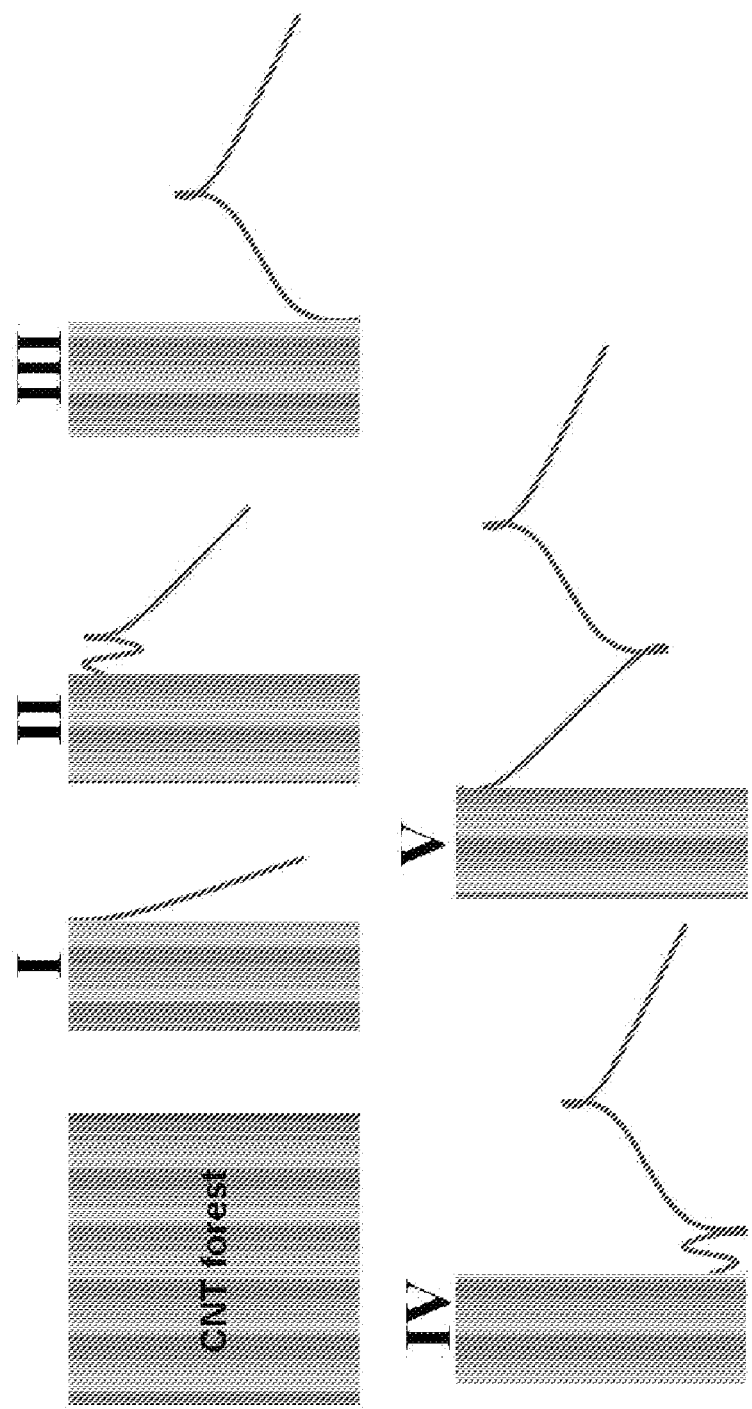
FIG. 13 illustrates the believed mechanism in which MWCNTs are pulled out from the multi-walled carbon nanotube forests.

FIG. 13 illustrates the believed mechanism in which MWCNTs are pulled out from the multi-walled carbon nanotube forests. This mechanism involves Steps I-V. FIGS. 14A-14J and FIGS. 15A-15B are TEM images that model the pulling the sheet from a multi-walled carbon nanotube forest.

Figure 14A:
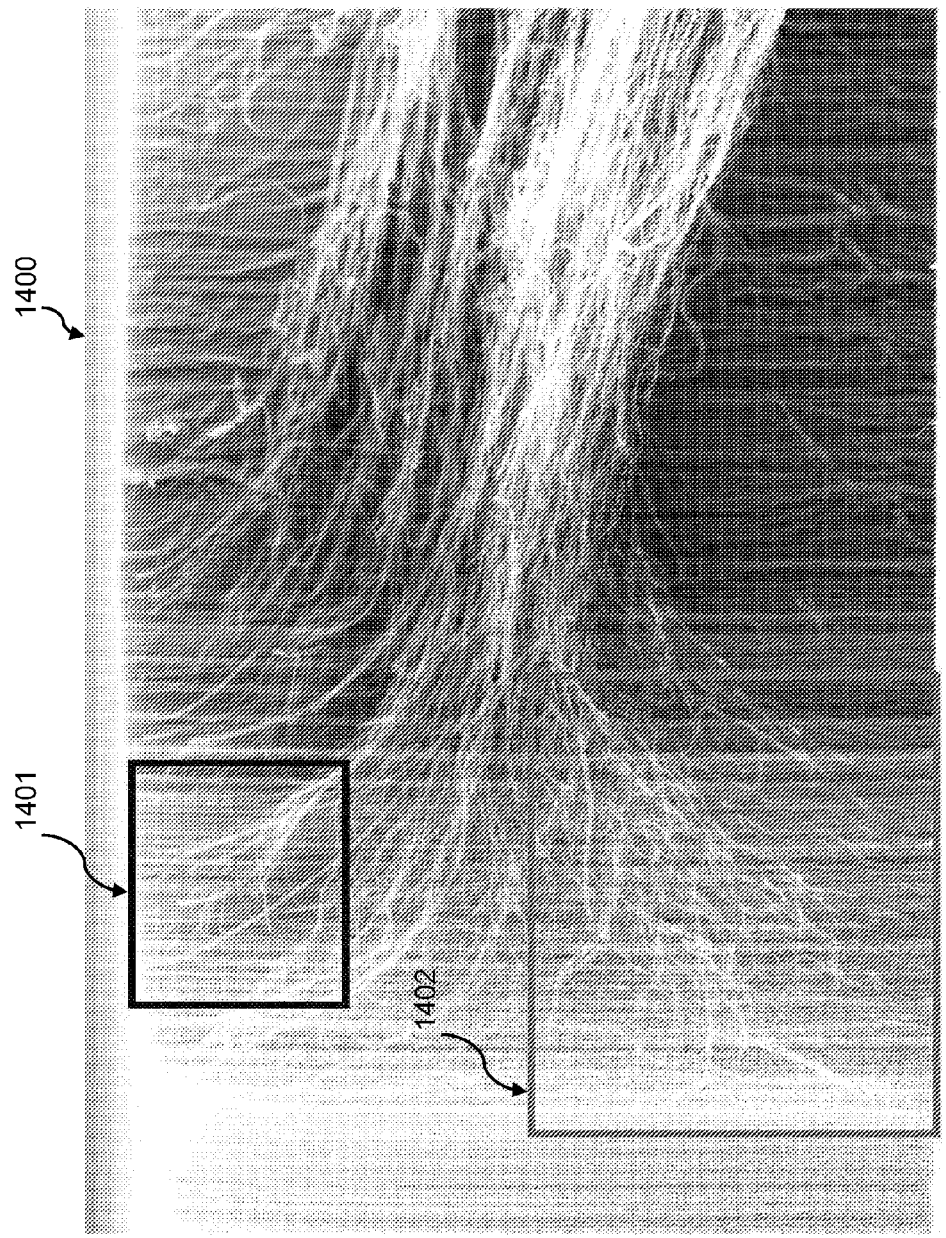
FIGS. 14A-14J are TEM images that model the pulling the sheet from a multi-walled carbon nanotube forest.
Figure 14B:
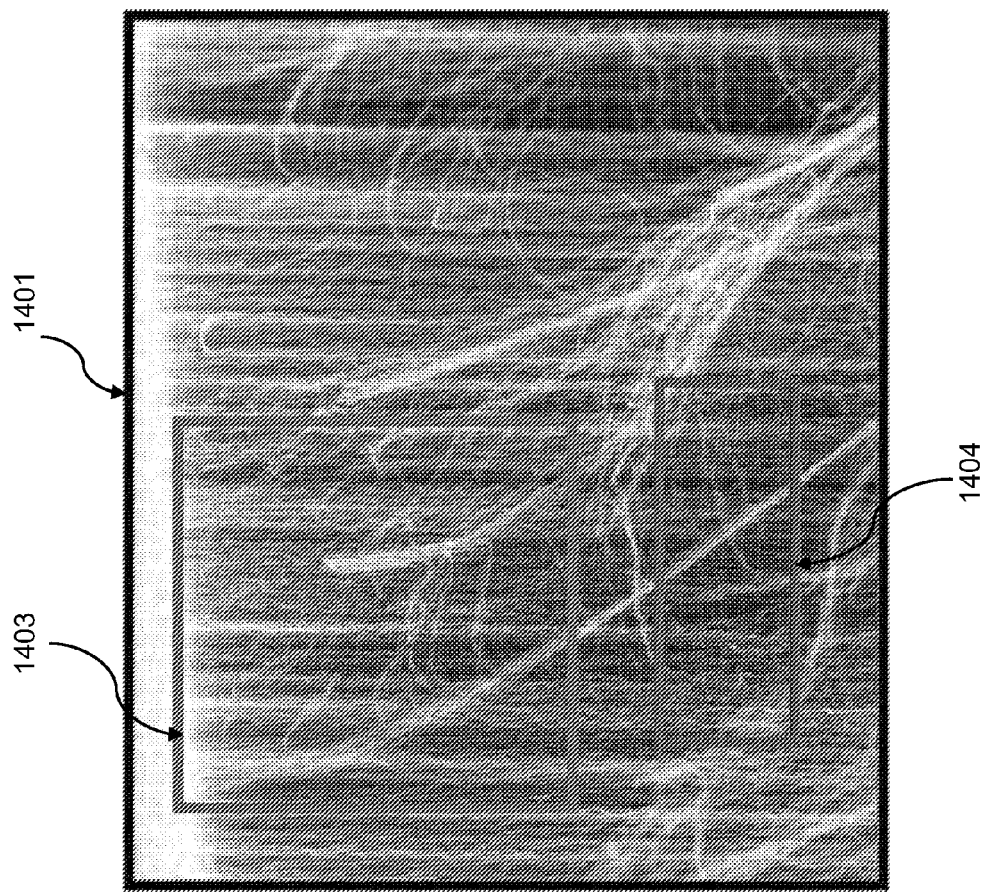
Figure 14C:
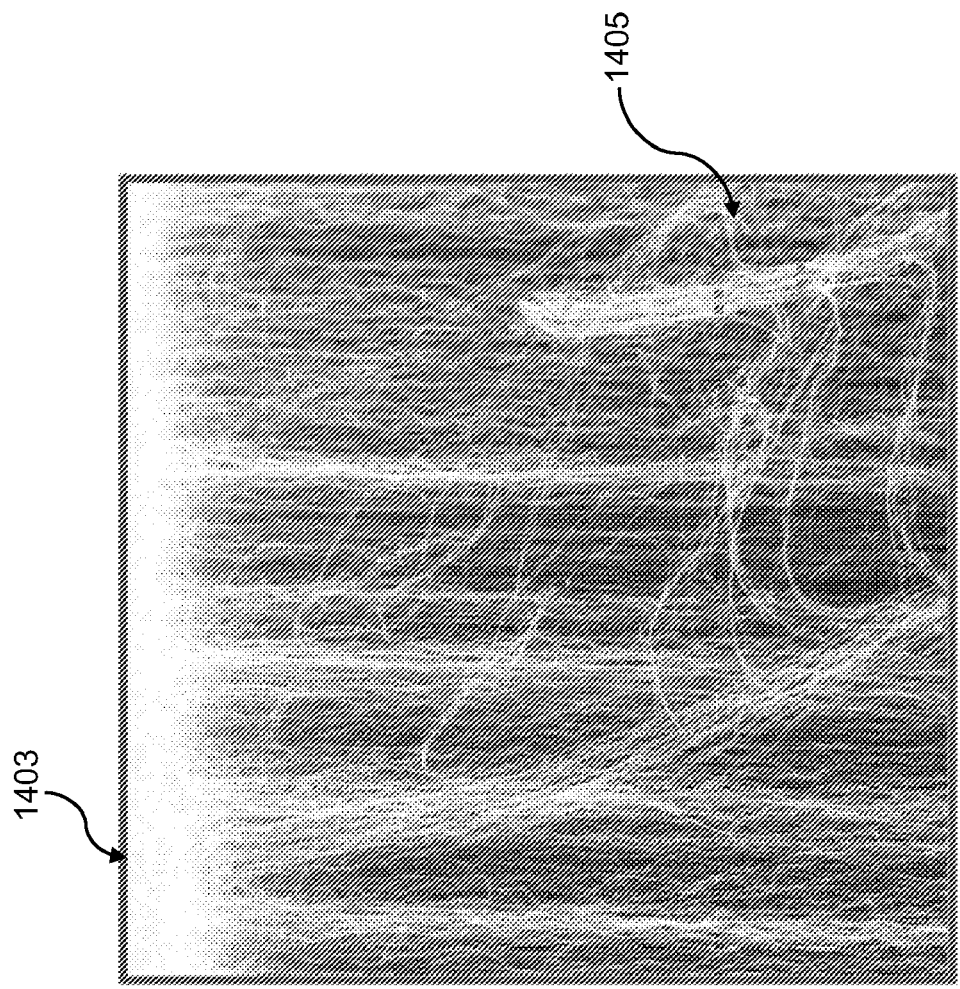
Figure 14D:
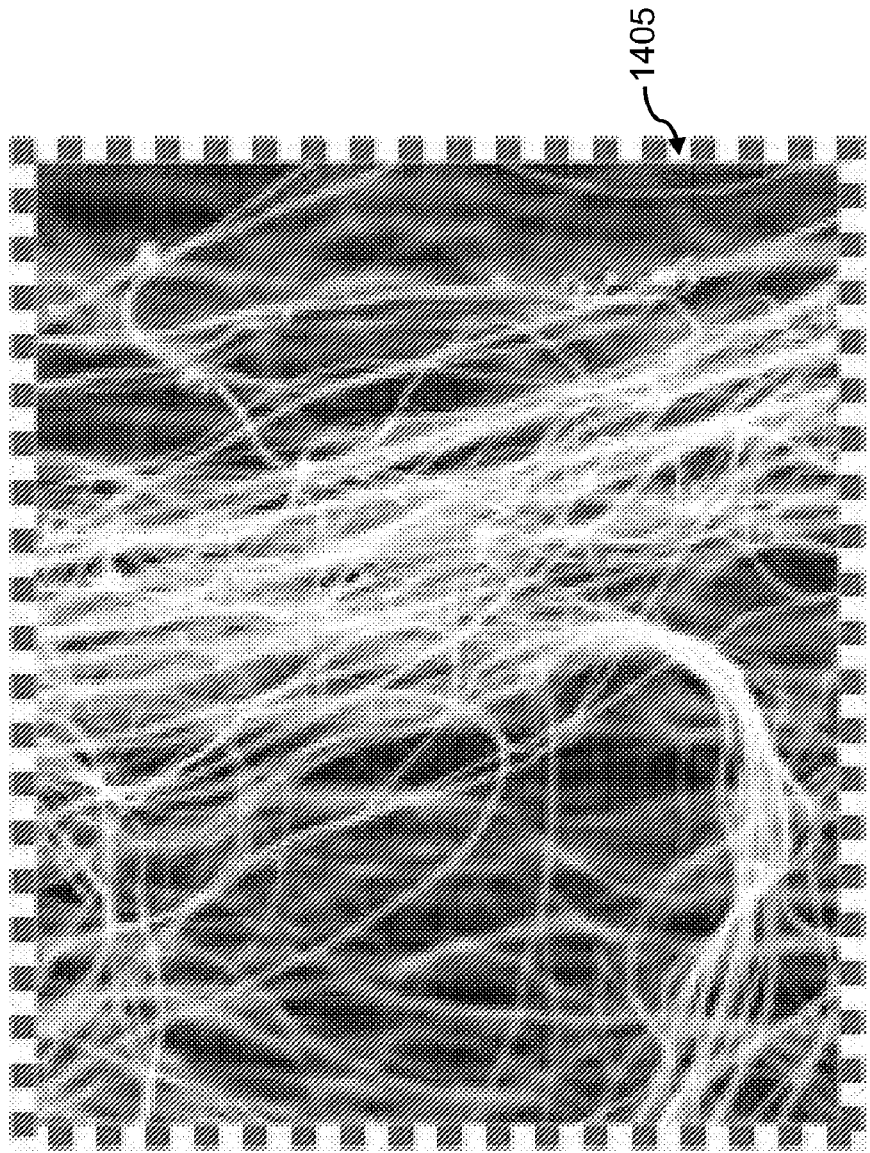

FIG. 14A shows a bundle of carbon nanotubes 1400 pulled out from a MWCNT forest. FIG. 14B shows a magnified view of the carbon nanotubes in block 1401 of FIG. 14A. FIG. 14C shows a magnified view of the carbon nanotubes in block 1403 of FIG. 14B. As seen in block 1403, the bundles are tangled at the top of the nanotube forest (Step I to Step II as shown in FIG. 13). FIG. 14D shows a magnified view of the carbon nanotubes in block 1405 of FIG. 14C.

Figure 14E:
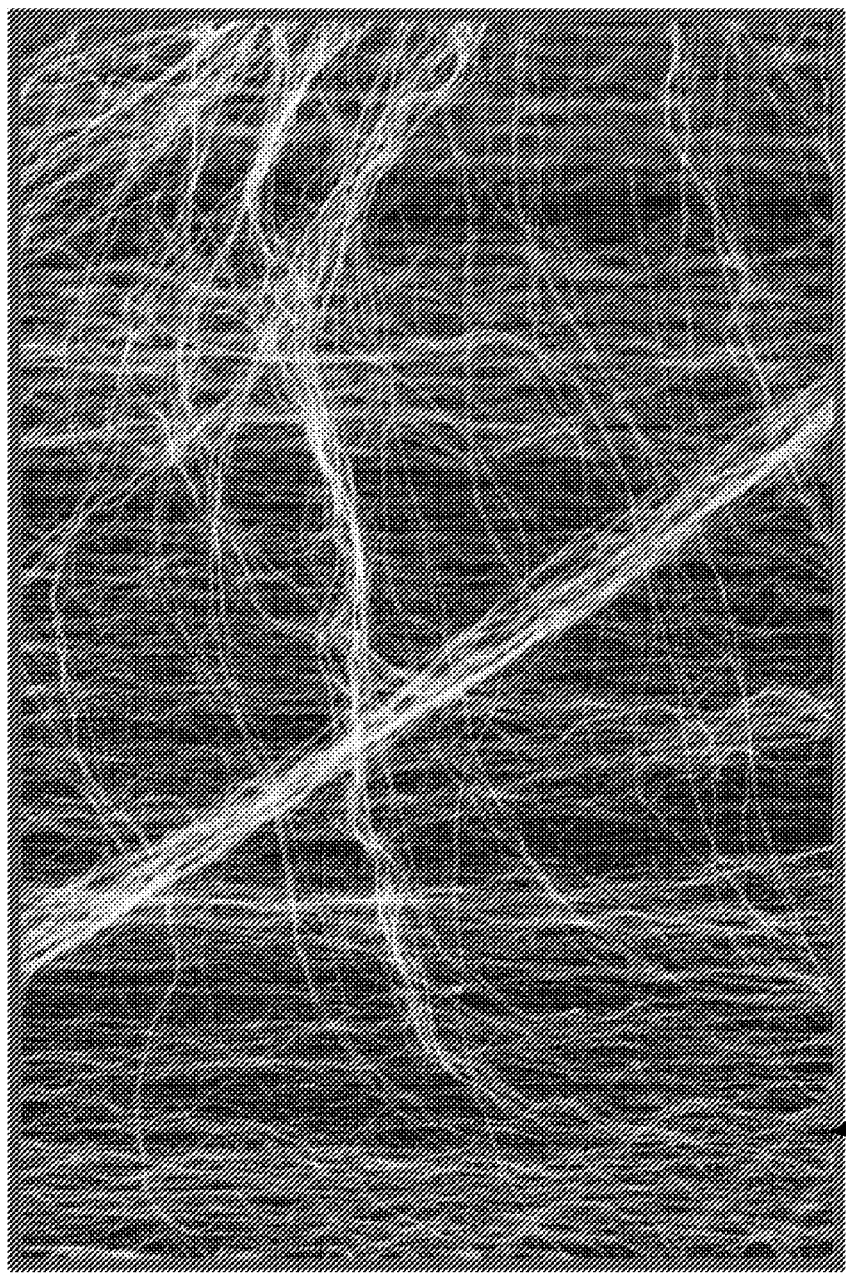

FIG. 14E shows a magnified view of the carbon nanotubes in block 1404 of FIG. 14B. As shown in block 1404, bundles are peeled off the MWCNT forests downwards (Step II to III as shown in FIG. 13).

Figure 14F:
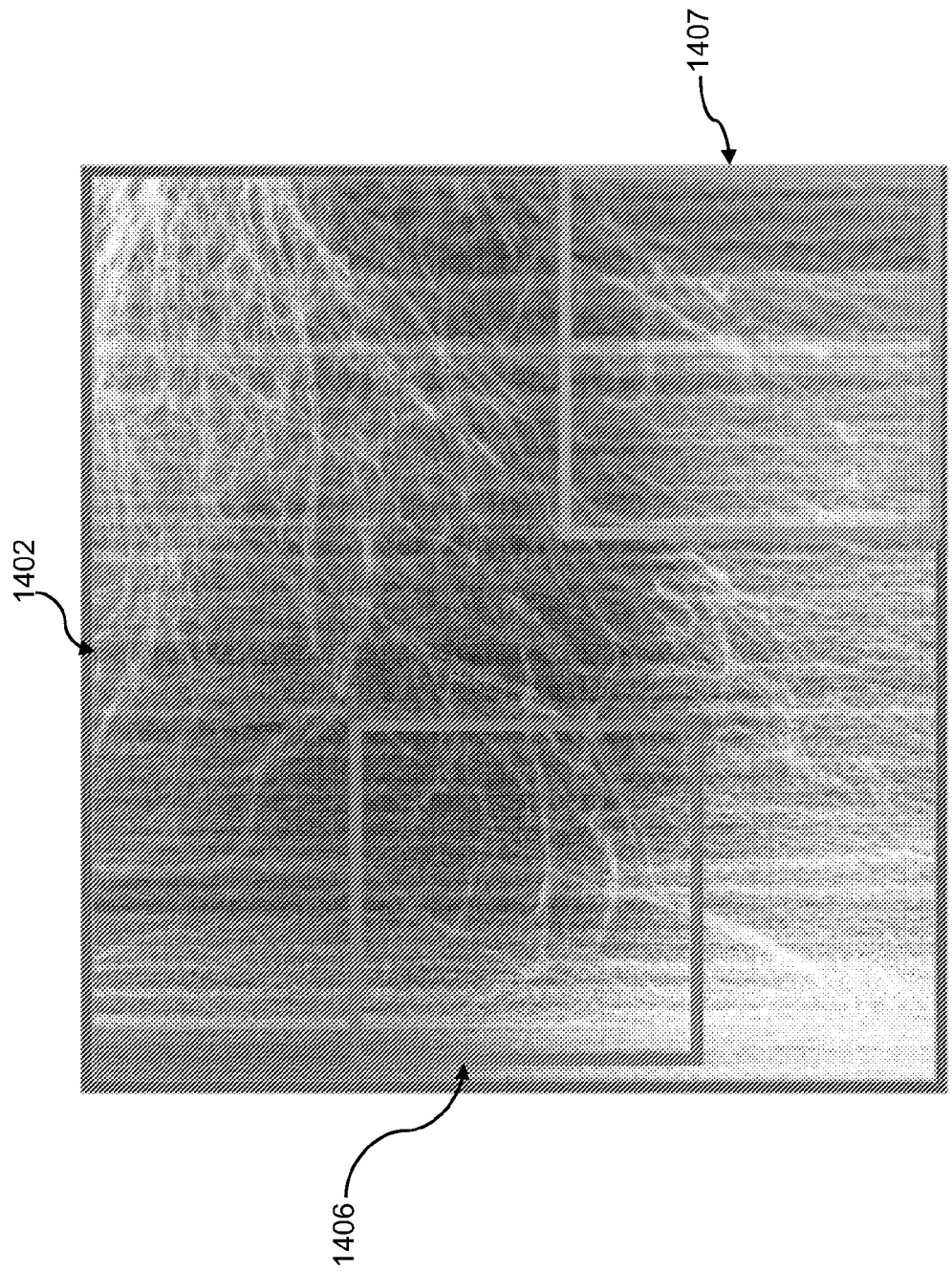
Figure 14G:
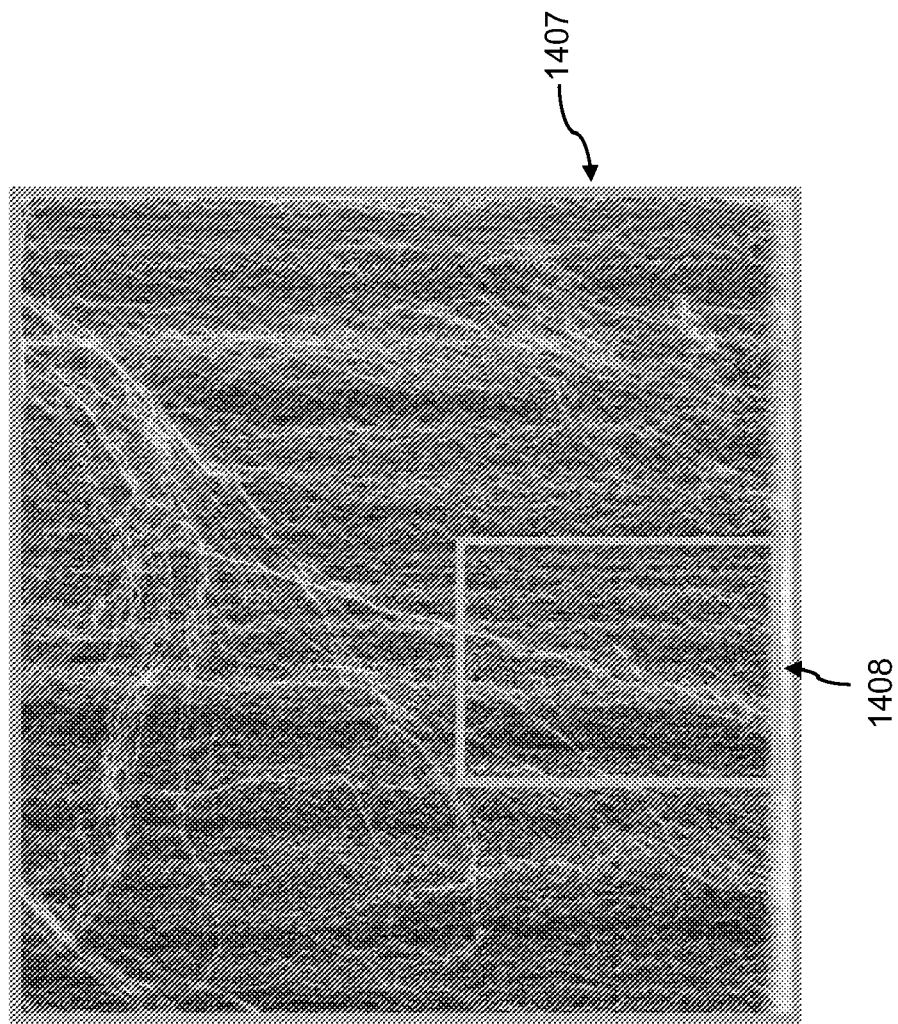

FIG. 14F shows a magnified view of the carbon nanotubes in block 1402 of FIG. 14A. FIG. 14G shows a magnified view of the carbon nanotubes in block 1407 of FIG. 14F. As shown in block 1407, bundles are stuck to the bottom of the MWCNT forests (Step III as shown in FIG. 13).

Figure 14H:
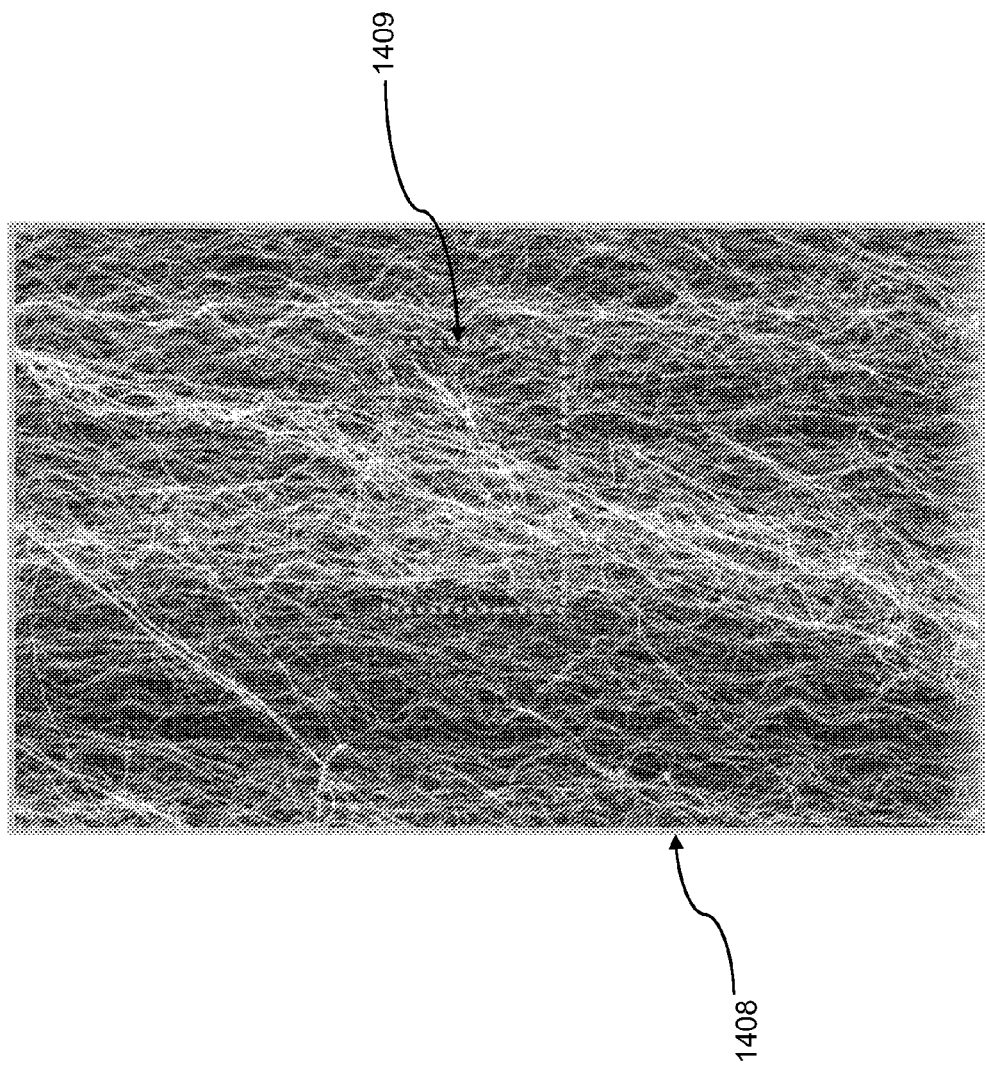

FIG. 14H shows a magnified view of the carbon nanotubes in block 1408 of FIG. 14G. As shown in block 1408, bundles are tangled at the bottom of the MWCNT forests (Step IV as shown in FIG. 13).

Figure 14I:
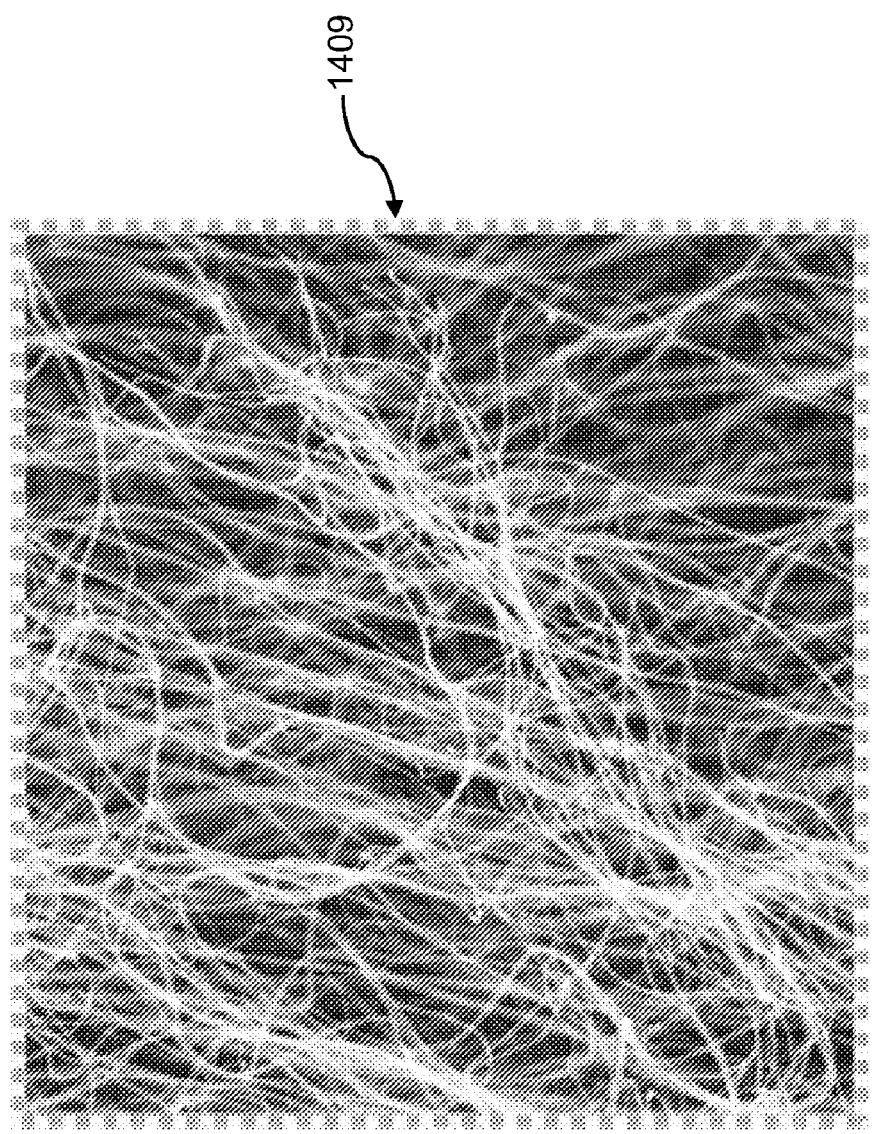
Figure 14J:
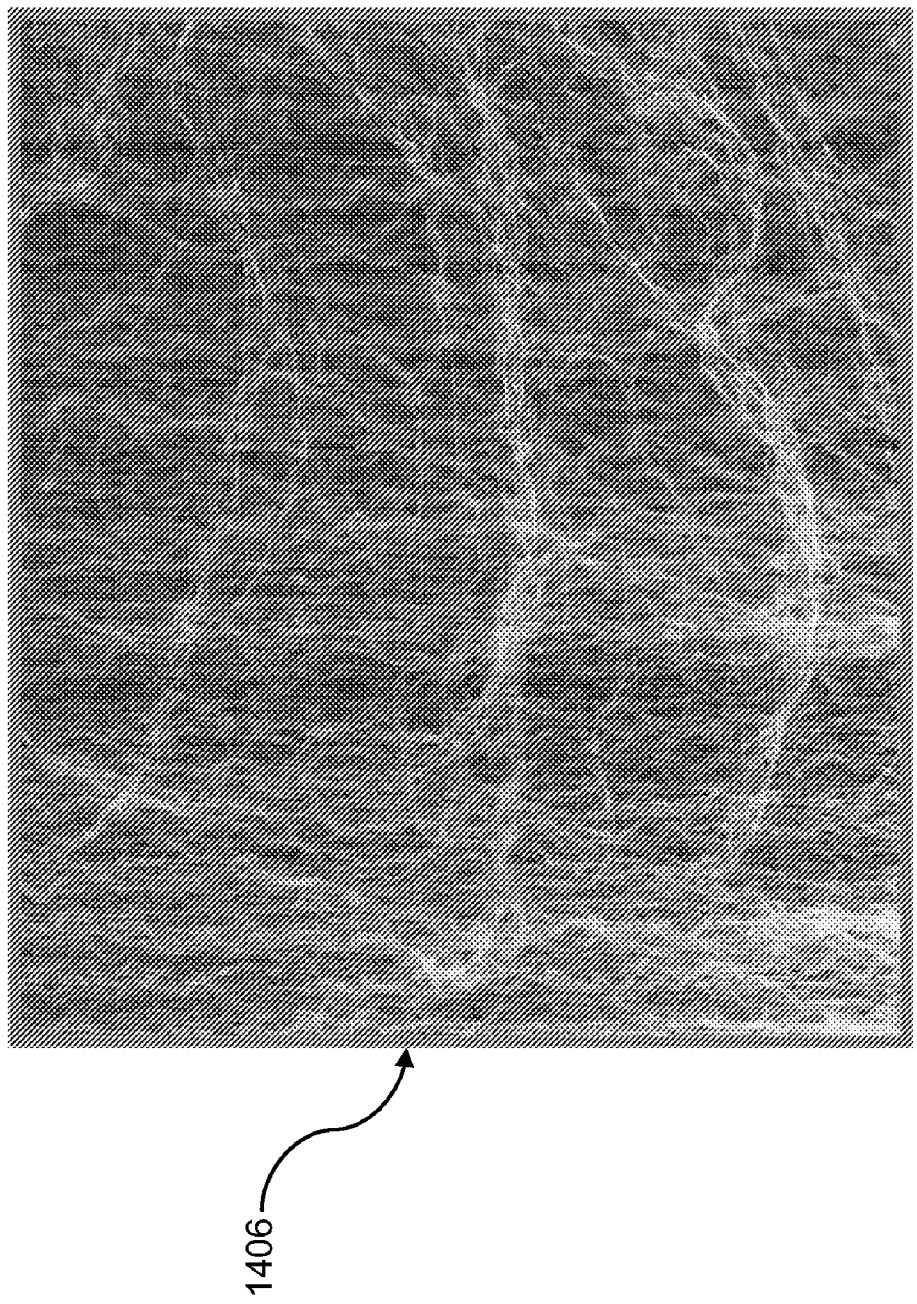

FIG. 14I shows a magnified view of the carbon nanotubes in block 1409 of FIG. 14H. As shown in block 1409, MWCNT tips pulled out from the bottom end of the CNT forests. FIG. 14J shows a magnified view of the carbon nanotubes in block 1406 of FIG. 14F. As shown in block 1406, bundles re peeled off the MWCNT forest upwards (Step IV to V as shown in FIG. 13).

Figure 15A:
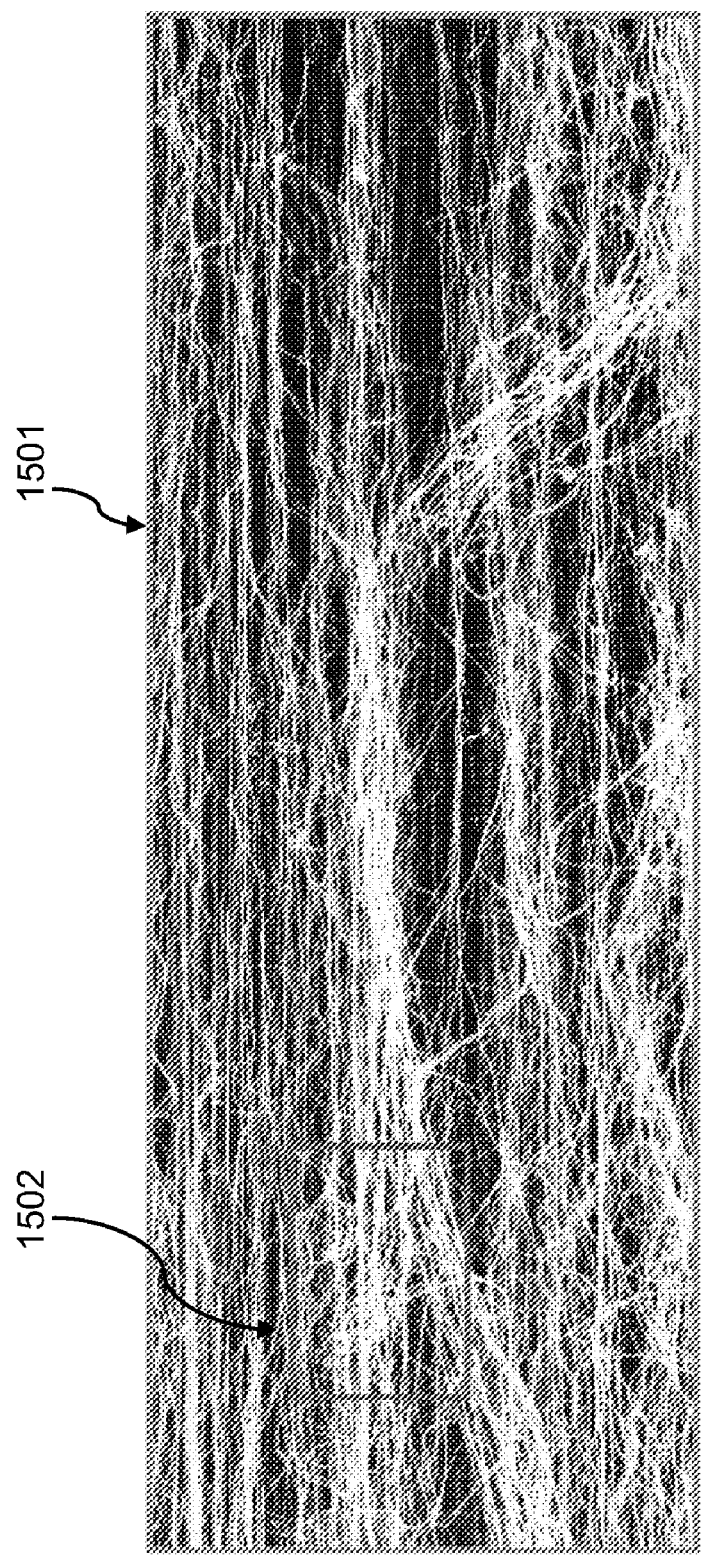
FIGS. 15A-15B are TEM images that model the pulling the sheet from a multi-walled carbon nanotube forest.
Figure 15B:
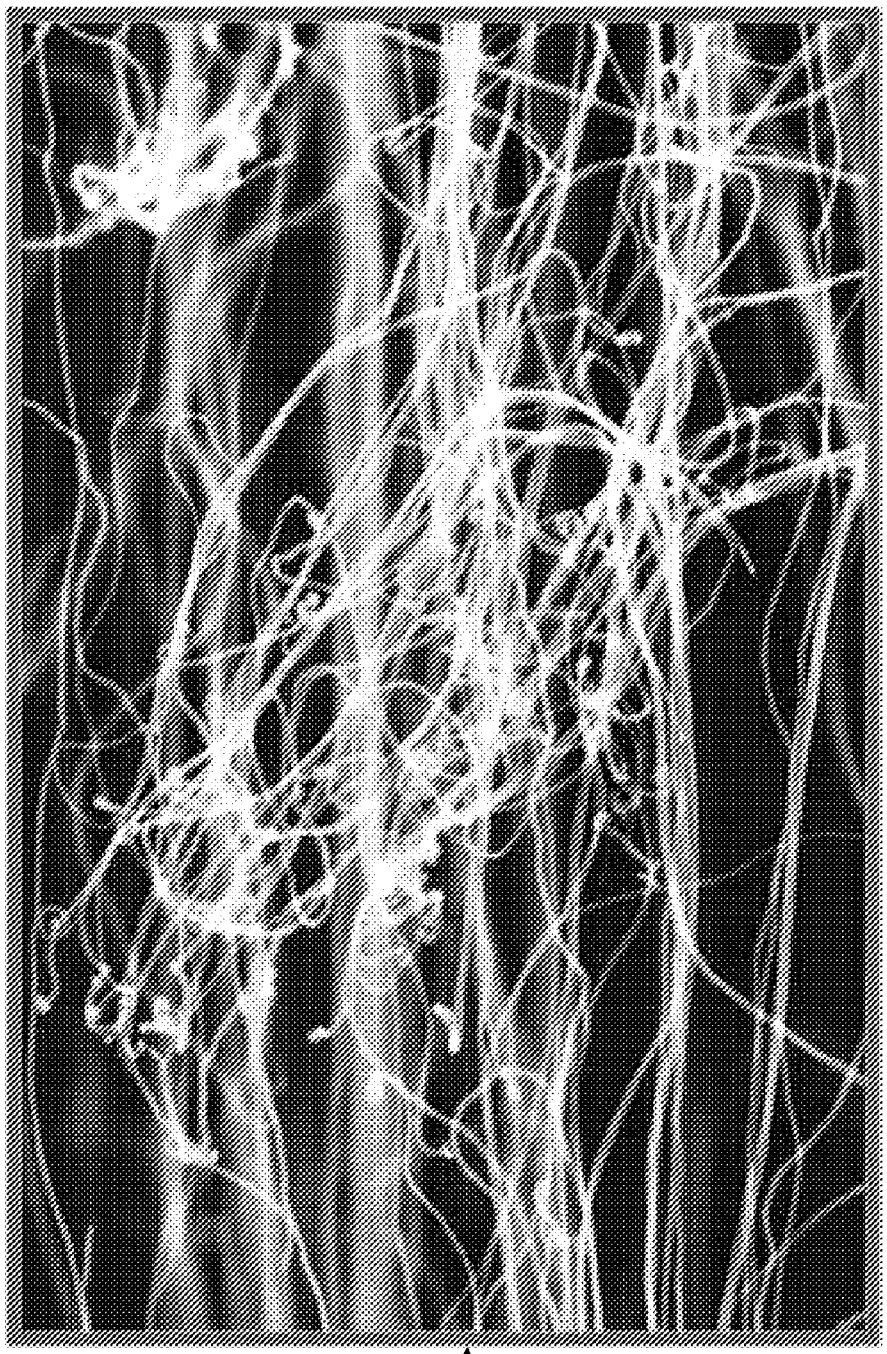

FIG. 15A shows a sheet 1501 pulled out from a MWCNT forest. FIG. 15B shows a magnified view of the carbon nanotubes in block 1502 of FIG. 15A. As shown in block 1502, the tangled parts in the MWCNT forest are preserved even after being pulled out in the form of sheets (Step V as shown in FIG. 13).

Applications

Figure 17:
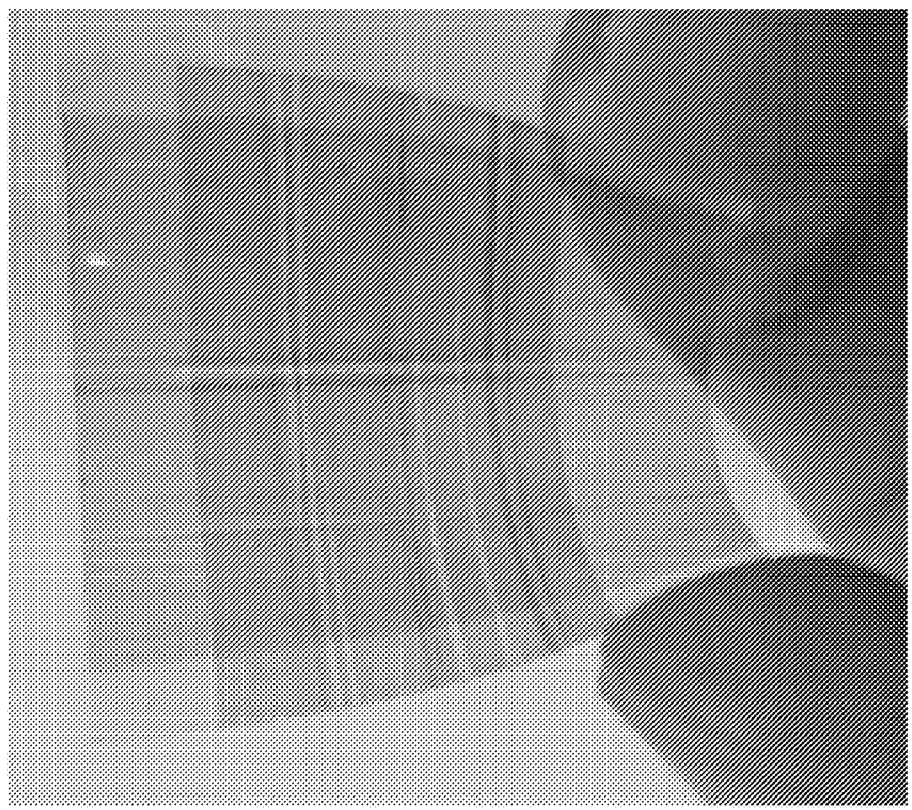
FIG. 17 shows a flexible electrode that can utilize the MWCNT yarns and sheets.
Figure 18:
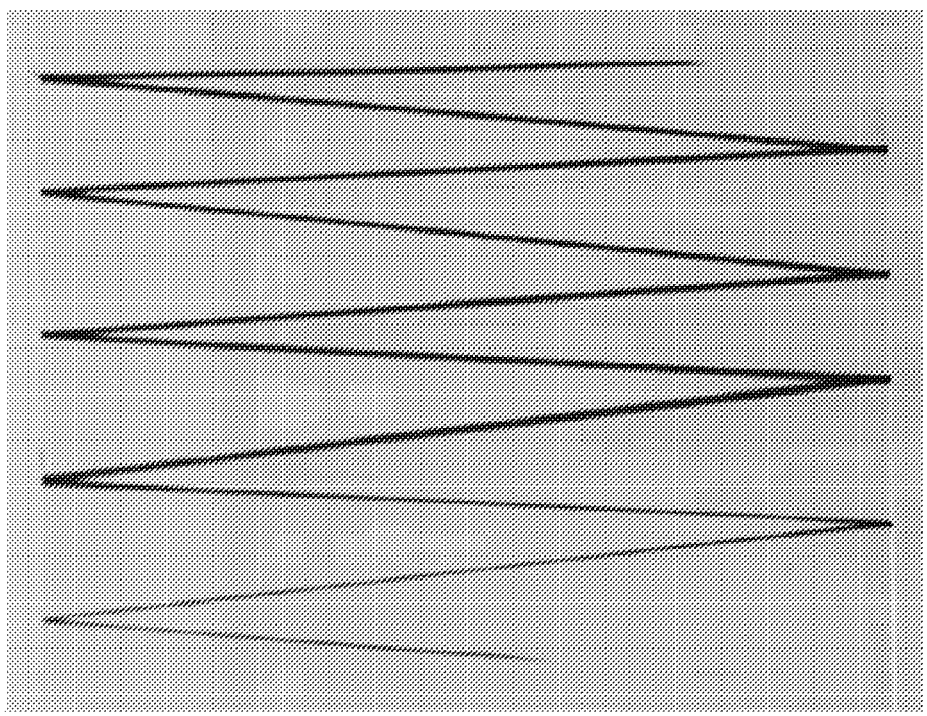
FIG. 18 shows a nanowire that can utilize the MWCNT sheets and yarns.
Figure 19:
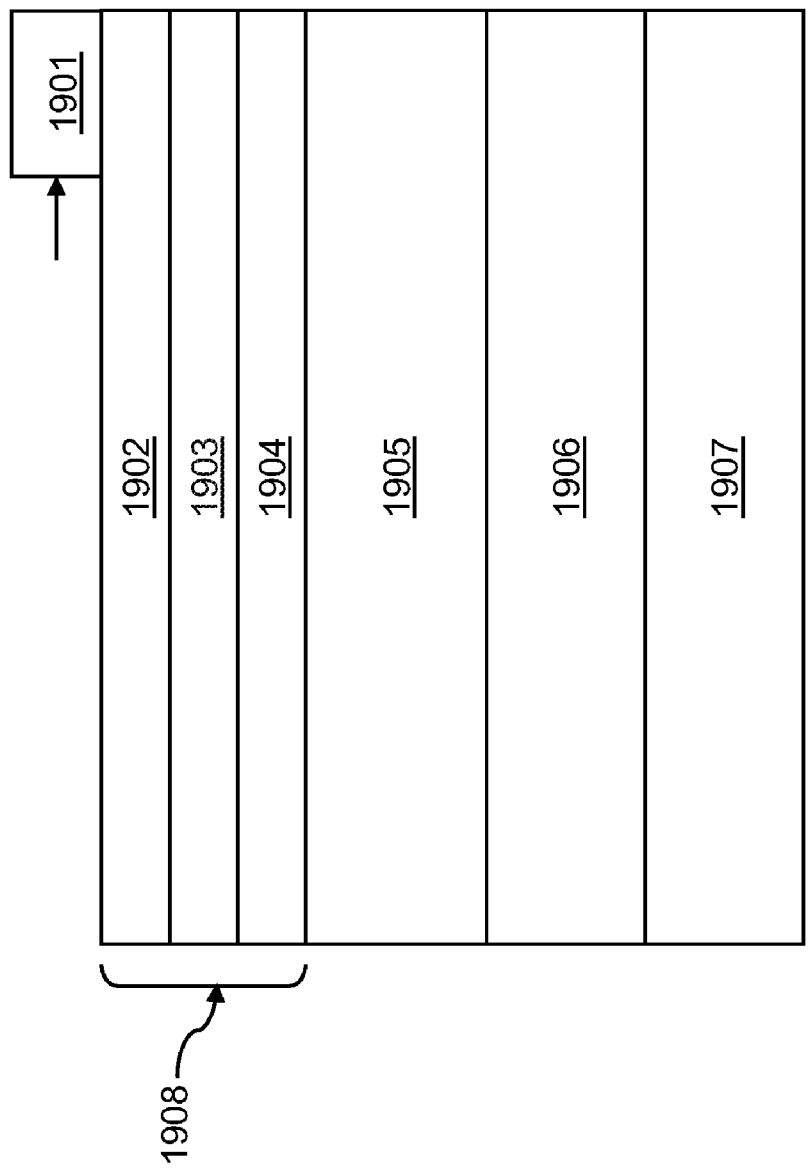
FIG. 19 illustrates a photovoltaic cell in which a MWCNT sheet or yarn can be utilized as a hole conducting layer.
Figure 20:
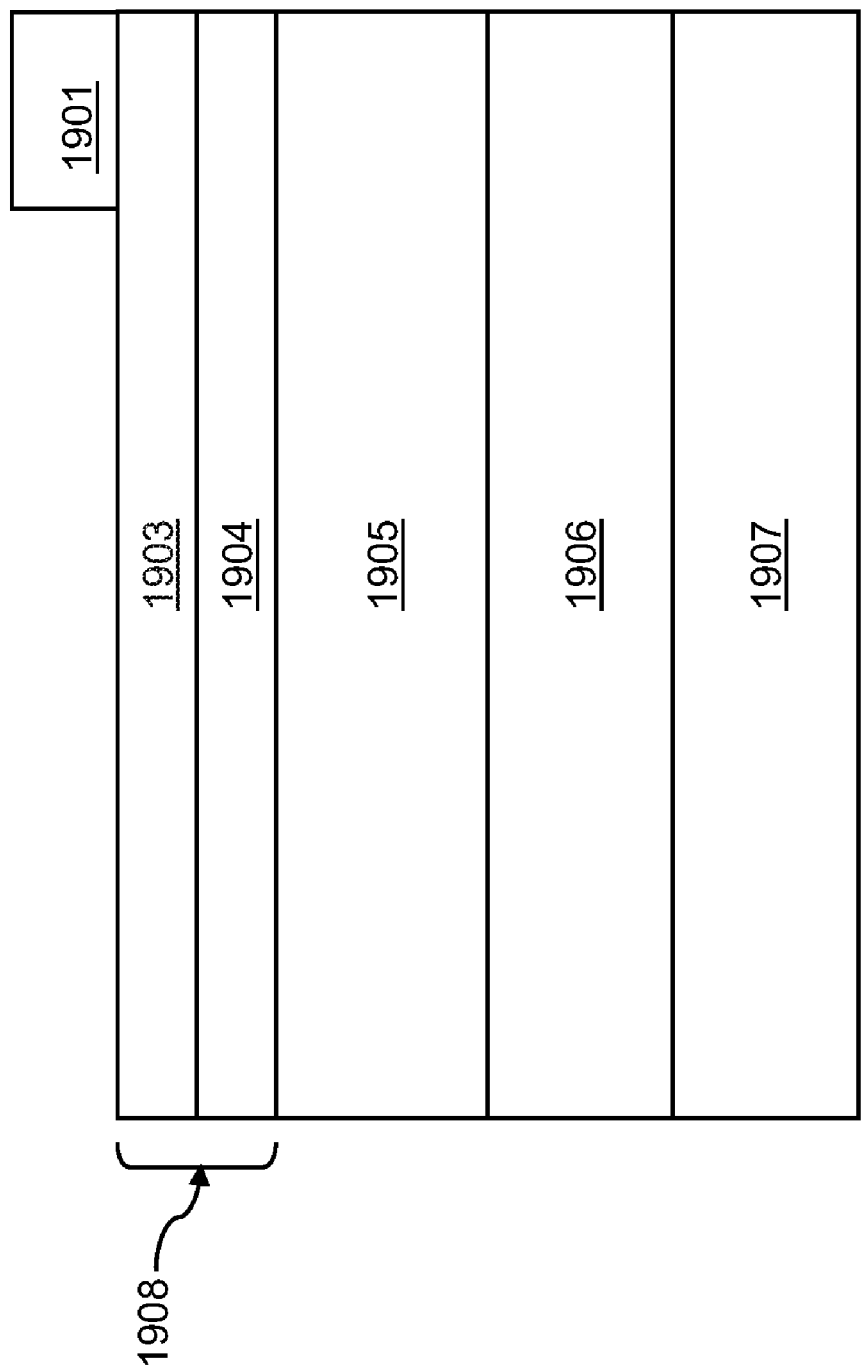
FIG. 20 illustrates an alternative photovoltaic cell in which a MWCNT sheet or yarn that can be utilized as a hole conducting layer.
Figure 22:
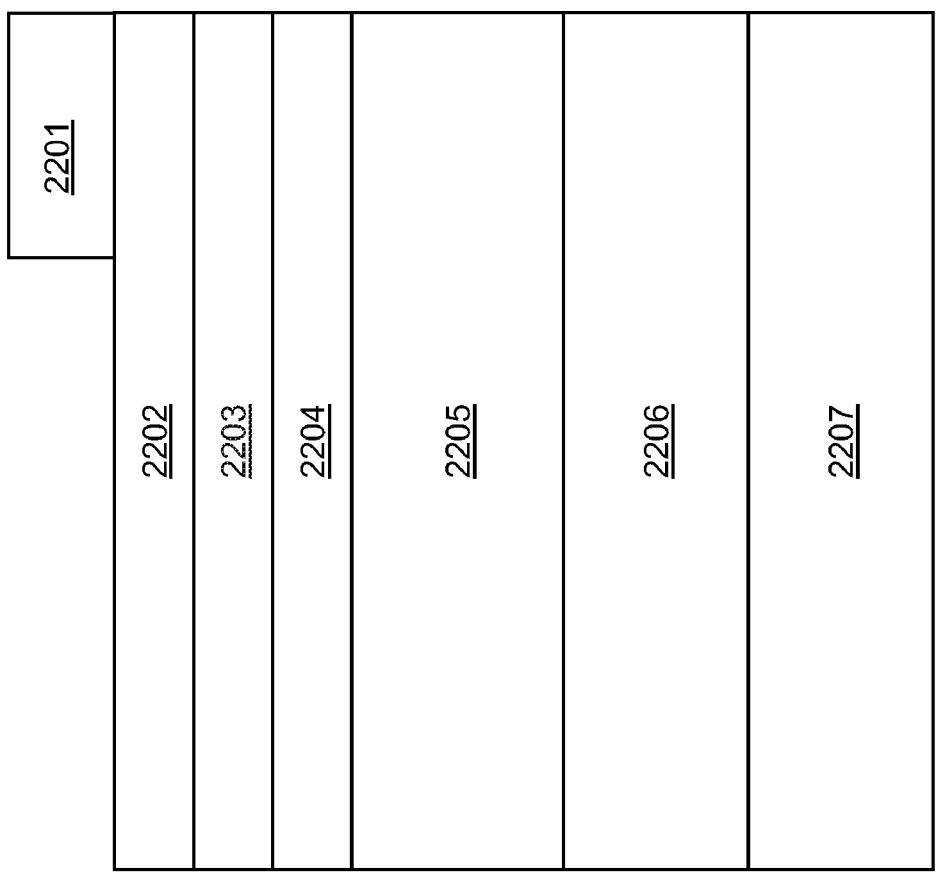
FIG. 22 illustrates a solar cell in which a MWCNT sheet or yarn can be utilized (in the form of a metal oxide/CNT sheet composite).
Figure 23:
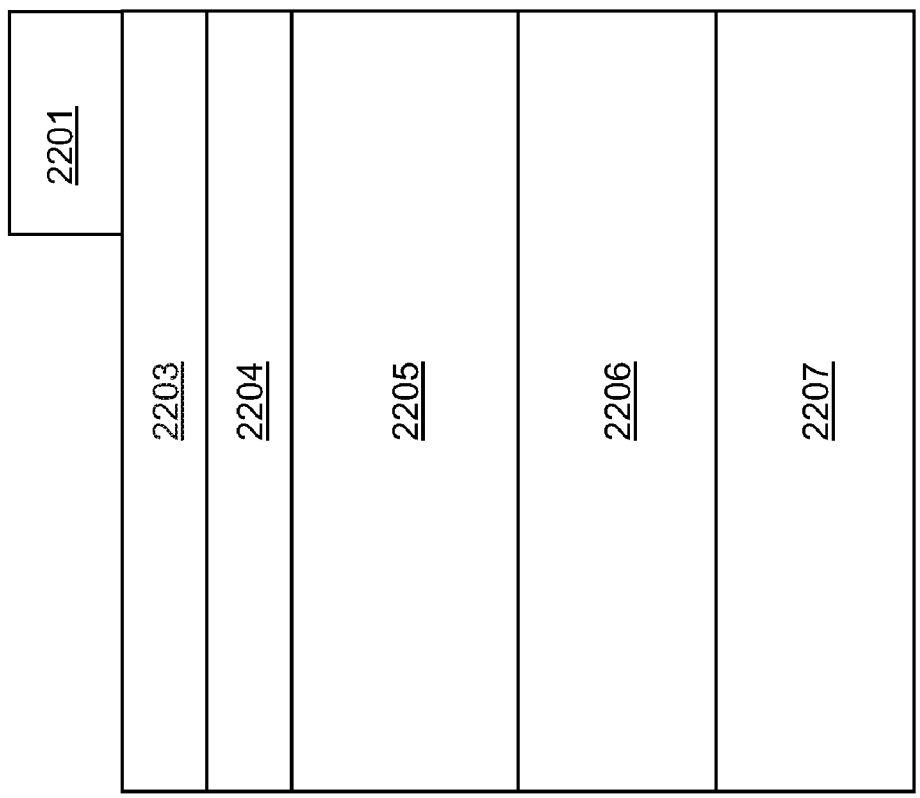
FIG. 23 illustrates an alternative embodiment of a solar cell in which a MWCNT sheet or yarn can be utilized (in the form of a metal oxide/CNT sheet composite).
Figure 24:
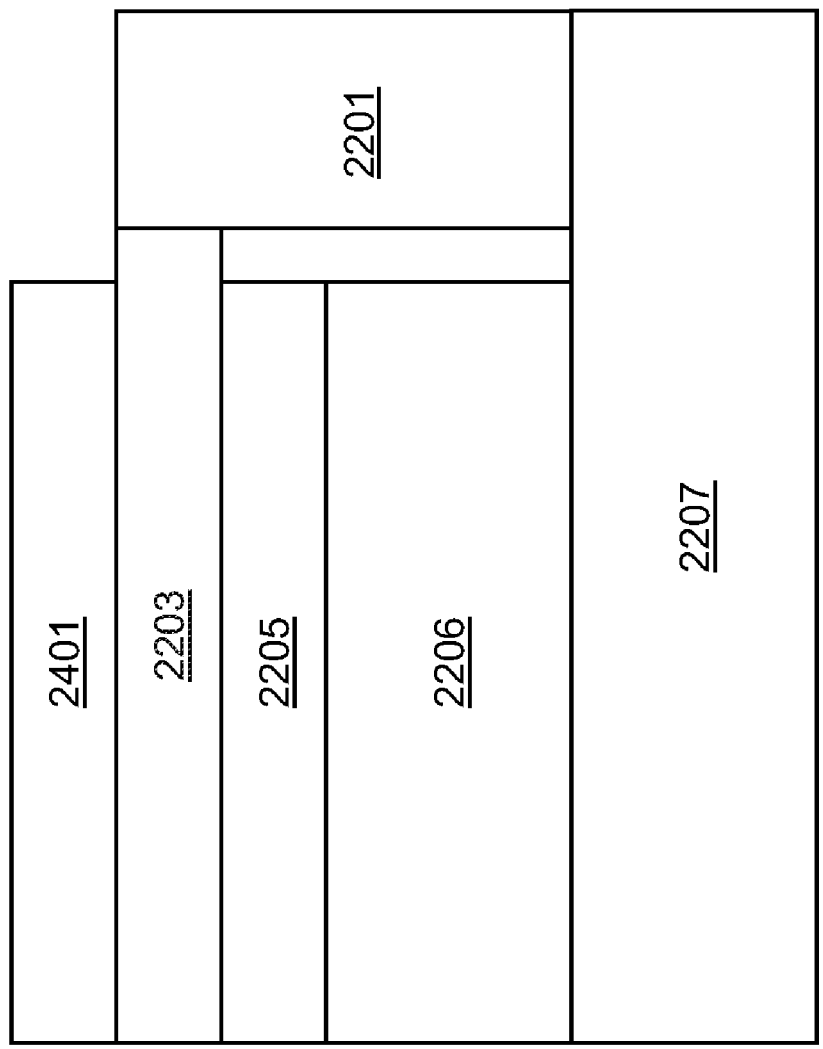
FIG. 24 illustrates an alternative embodiment of a solar cell in which a MWCNT sheet or yarn can be utilized (in the form of a metal oxide/CNT sheet composite).

These potential applications of the MWCNTs yarns and sheets are widespread and include, for example, flexible electrodes (such as shown in FIG. 17), nanowires (such as shown in FIG. 18), photovoltaic cells (such as shown in FIGS. 19-20), and solar cells (such as shown in FIGS. 22-24).

For instance, referring to FIG. 19, a photovoltaic cell can include a hole-conducting layer 1908 that has a hole-collecting material 1902, MWCNT sheets or yarns 1903, and hole collecting material 1904. Additionally, the photovoltaic cell can include a hole-conducting electrode 1901, a photovoltaic layer 1905, an electron-collecting electrode 1906, and a substrate 1907.

In an alternative embodiment (illustrated in FIG. 20), the photovoltaic cell is arranged similarly except for the absence of hole-collecting material 1902 in the hold conducting layer 1908.

Figure 21:
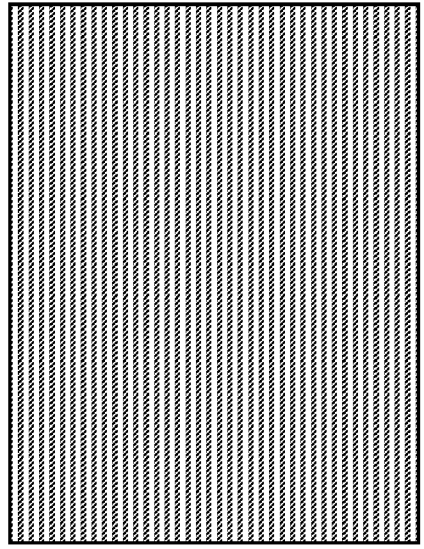
FIGS. 21A-21C are illustrations of MWCNT sheet that can be utilized as a hole conducting layer in a photovoltaic cell.
Figure 21:
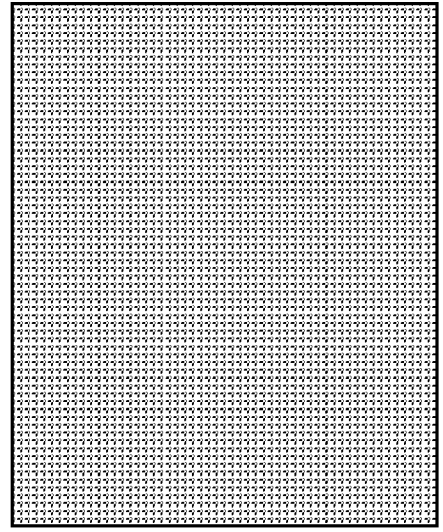
Figure 21:
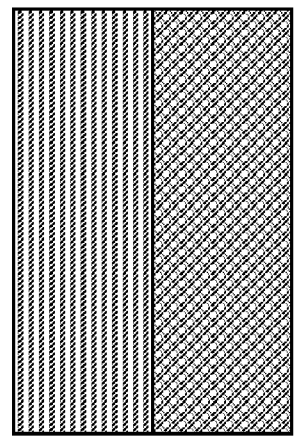

FIGS. 21A-21C are illustrations of MWCNT sheet that can be utilized as a hole conducting layer in a photovoltaic cell. FIG. 21A is a top view of a one-dimensional structure. FIG. 21B is a top view of a two-dimensional structure. FIG. 21C is a side view of the two-dimensional structure of FIG. 21B.

For instance, referring to FIG. 22, a solar cell can include a hole-conducting electrode 2201, a hole-collecting material 2202, a metal oxide/CNT sheet composite 2203, hole collecting material 2204, a photovoltaic layer 2205, an electron-collecting electrode 2206, and a substrate 2207.

In an alternative embodiment (illustrated in FIG. 23), the solar cell is arranged similarly except for the absence of hole-collecting material 2202.

In an alternative embodiment (illustrated in FIG. 23), the solar cell is arranged similarly except for the absence of hole-collecting material 2202 and hole collecting material 2204 and the addition of another photovoltaic layer 2401.

Figure 25:
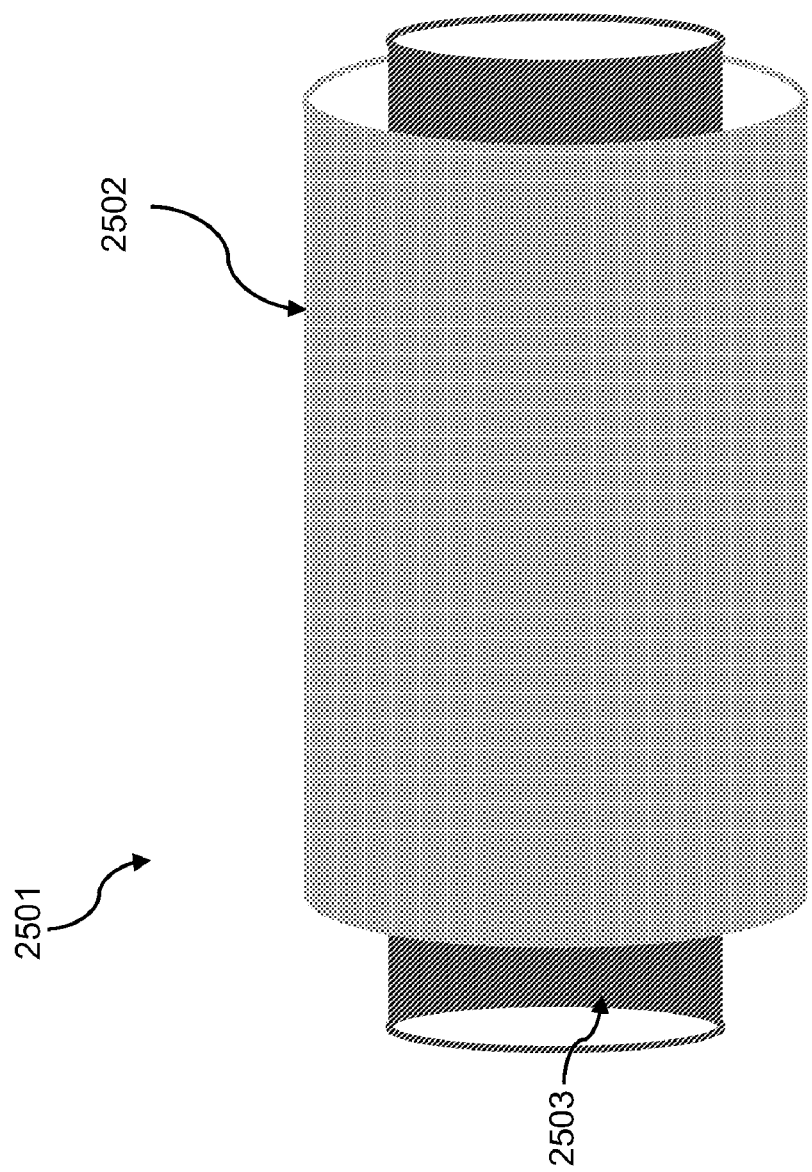
FIG. 25 illustrates a metal oxide/CNT sheet composite.
Figure 26A:
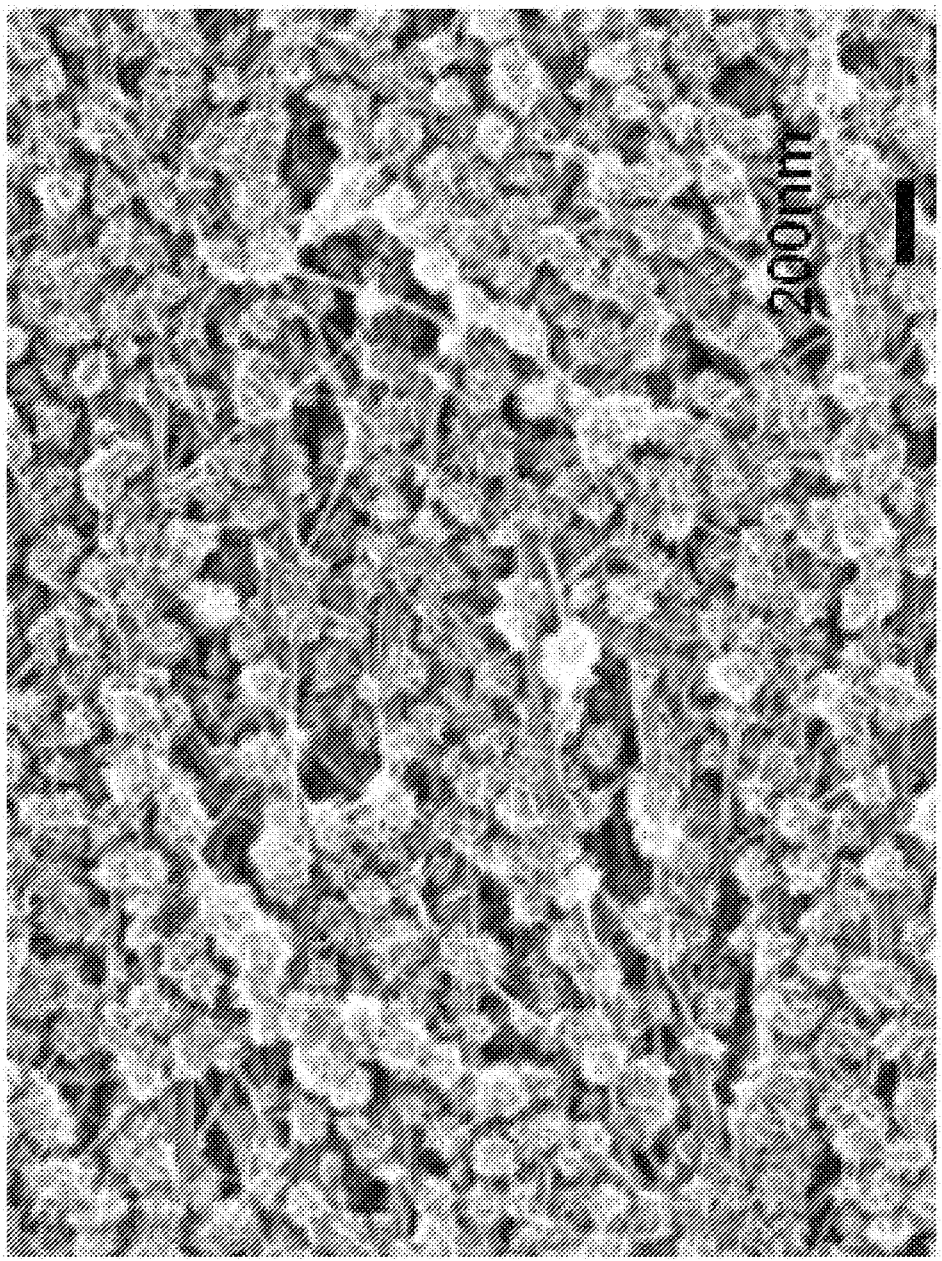
FIGS. 26A-26C are TEM images of embodiments the metal oxide/CNT sheet composite illustrated in FIG. 25, namely a manganese oxide/CNT sheet composite, a cobalt oxide/CNT sheet composite, and a nickel metal/CNT sheet composite, respectively.
Figure 26B:
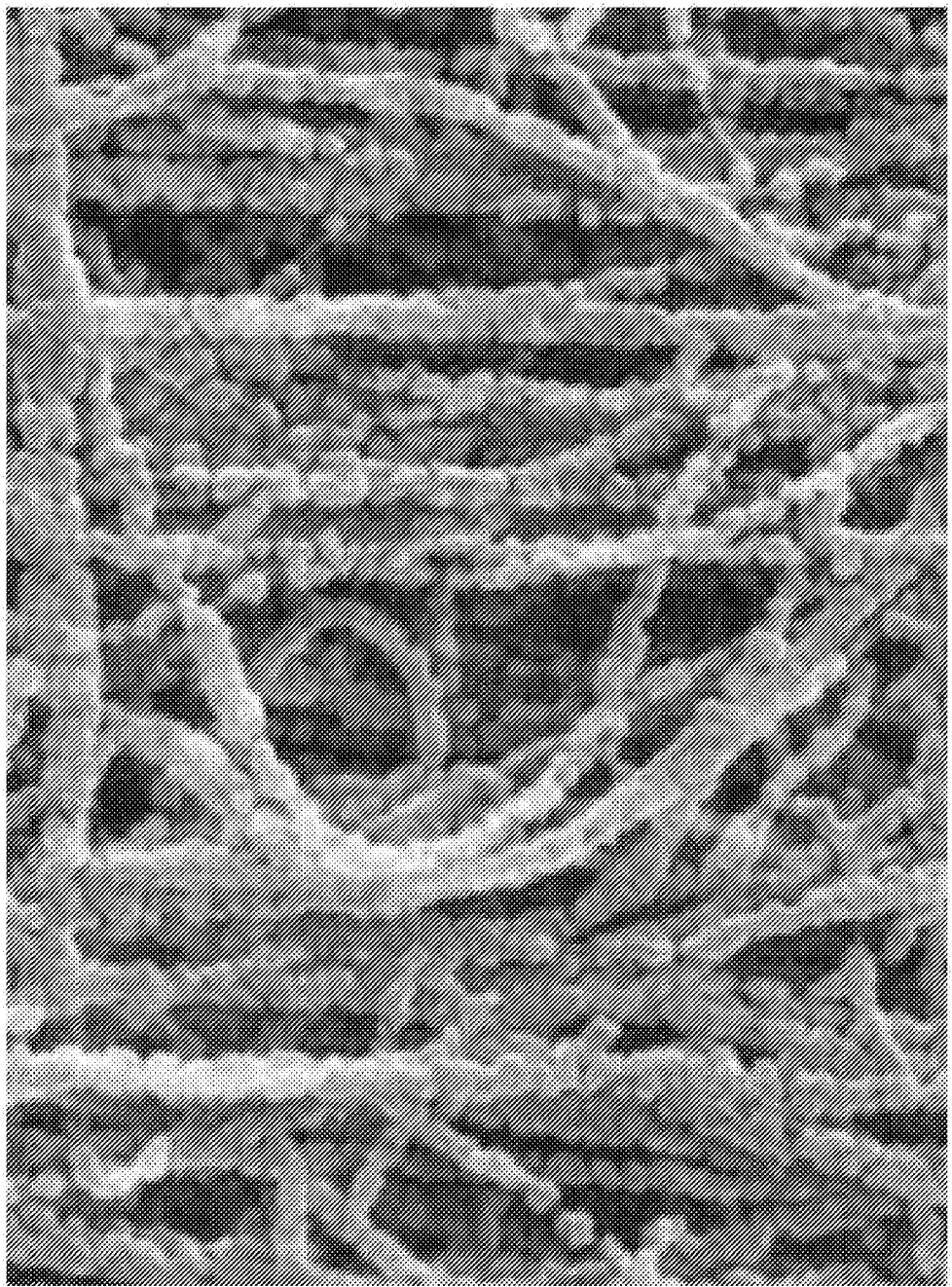
Figure 26C:
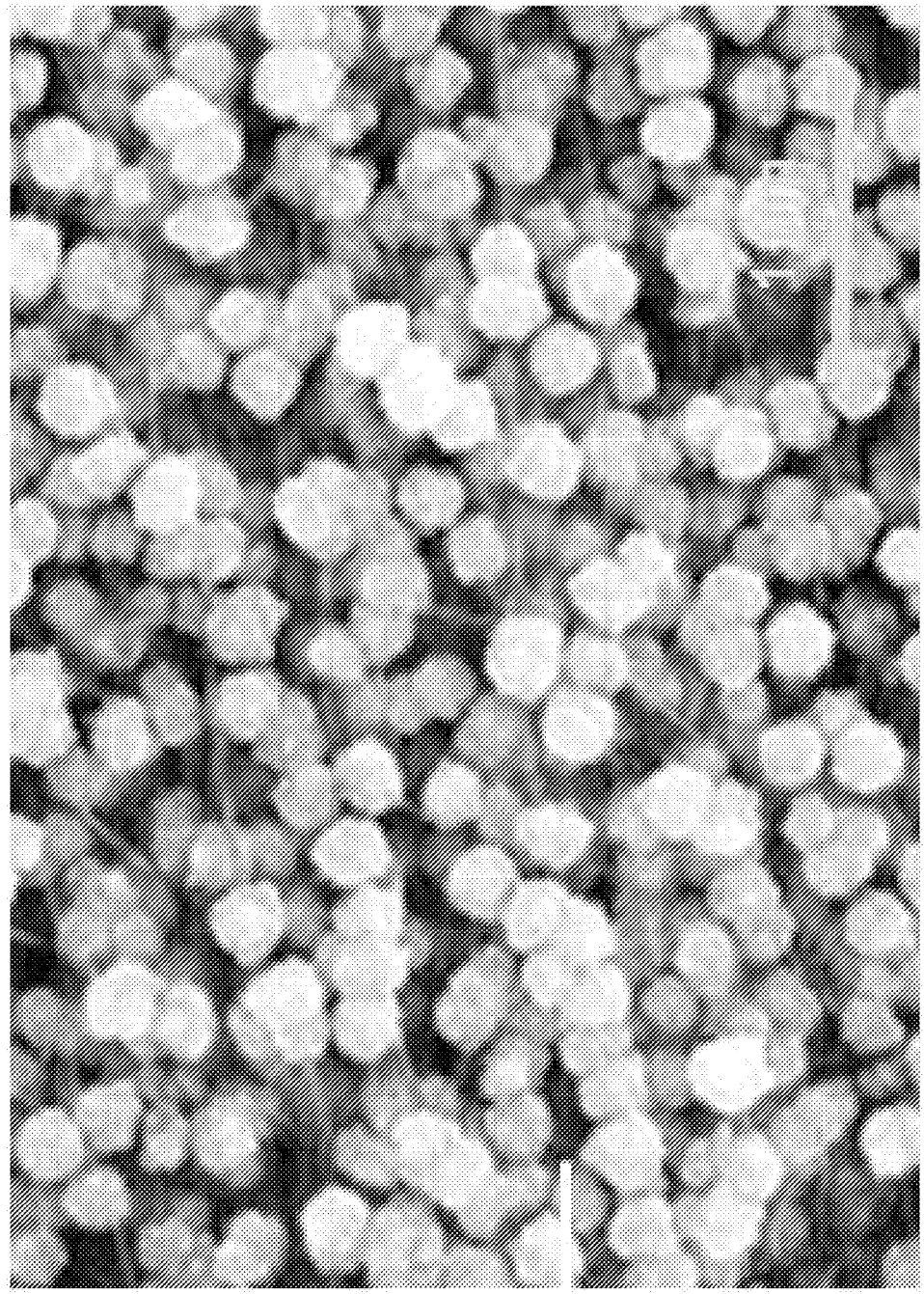

FIG. 25 illustrates a metal oxide/CNT sheet composite 2501 that can be utilized in the solar cells illustrated in FIGS. 22-24. Metal oxide/CNT sheet composite 2501 includes metal oxide 2502 and CNT sheet 2503. For example, such metal oxide/CNT sheet composites can be a manganese oxide/CNT sheet composite, a cobalt oxide/CNT sheet composite, and a nickel metal/CNT sheet composite, such as shown in FIGS. 26A-26C, respectively.

The examples provided herein are to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention.

What is claimed is:

1. A method comprising the steps of:
   (a) depositing a catalyst film on a substrate to form a catalyst-incorporated substrate, wherein the catalyst film has a sheet resistance in the range of about 10 kΩ/square to about 1 MΩ/square;
   (b) measuring the conductivity, sheet resistance, and resistivity of the catalyst film;
   (c) growing a CNT forest on the catalyst-incorporated substrate;

(d) pulling out a bundle of CNTs from said CNT forest; and
(e) forming a CNT sheet or yarn from the pulled bundle of CNTs.

2. The method of claim 1, wherein the step of measuring comprises using a four-point probe.

3. The method of claim 1, wherein the step of measuring comprises using an eddy current probe.

4. The method of claim 1, wherein the catalyst film comprises iron and wherein the sheet resistance of the catalyst film is in the range of about 10 k$\Omega$/square to about 1 M$\Omega$/square.

5. The method of claim 1, wherein the substrate comprises an oxidized material selected from the group consisting of silicon, metals, metal oxides, glass, and combinations thereof.

6. The method of claim 1, wherein the catalyst film comprises an iron deposited on the substrate by a process selected from the group consisting of electron-beam evaporation, sputtering, and chemical vapor deposition.

7. The method of claim 1, wherein the bundle of CNTs comprise multi-walled CNTs.

8. The method of claim 1, wherein the step of growing the CNT forest comprises:
   (i) putting the catalyst-incorporated substrate on a heater block in a chemical vapor deposition (CVD) chamber;
   (ii) heating the CVD chamber up to a temperature for the growth of CNT forest;
   (iii) holding the substrate in the CVD chamber at the temperature for the growth of CNT forest;
   (iv) providing a gas mixture consisting of CNT-forming precursors and carrier gases; and
   (v) growing the CNT forest on the substrate such that the CNT forest are substantially aligned in a direction perpendicular to the substrate.

9. The method of claim 8, wherein the hold temperature of the heater block in the CVD chamber is between room temperature and the temperature for the growth of CNT forest.

10. The method of claim 8, wherein the temperature for the growth of the CNT forest is between about 650° C. and about 850° C.

11. The method of claim 8, wherein the heating rate up to the temperature for the growth of CNT forest is between about 10° C./minute and about 1000° C./minute.

12. The method of claim 8, wherein the substrate that is heated up to the temperature for the growth of CNT forest stays less than 30 minutes in carrier gases.

13. The method of claim 8, wherein before growing the CNT forest, carrier gases is supplied into the CVD chamber.

14. The method of claim 8, wherein the CNT-forming precursor comprises acetylene, and the carrier gases comprise hydrogen and an inert gas.

15. The method of claim 14, wherein
   (i) the flow rate of the acetylene is between about 200 sccm and about 1000 sccm;
   (ii) the flow rate of the hydrogen is between about 50 sccm and about 1000 sccm; and
   (iii) the flow rate of the inert gas is between about 1 slm and 30 slm.

16. The method of claim 14, wherein the inert gas is selected from the group consisting of helium, nitrogen, and argon.

17. The method of claim 1, wherein
   (i) CNTs of the bundle of CNTs comprise multi-walled CNTs that are entangled end to end, and
   (ii) the multi-walled CNTs are substantially parallel to each other along the drawing direction.

18. A method of manufacturing an anode for fuel cells and lithium batteries comprising the steps of: growing a CNT forest on a substrate
   (i) pulling out a bundle of CNTs from said CNT forest;
   (ii) forming CNT sheets from the pulled bundle of CNTs; and
   (iii) forming metal oxide/CNT sheet composites comprising CNT sheets wherein the CNTs are encapsulated by metal oxides.

19. The method of claim 18, wherein the metal oxide comprises a transition metal oxide.

20. The method of claim 19, wherein the transition metal oxide is selected from the group consisting of manganese oxide, nickel oxide, cobalt oxide, and iron oxide.

21. The method of claim 18, wherein the metal oxide is coated onto the CNTs by a process selected from the group consisting of sputtering, electro-deposition, chemical vapor deposition (CVD), and combinations thereof.

22. The method of claim 18, wherein
   (i) the CNTs are encapsulated by metal oxides by a process comprising coating a metal onto the CNTs, wherein the process is selected from the group consisting of sputtering, electro-deposition, CVD, and combinations thereof; and,
   (ii) oxidizing the metal using oxidants.

23. The method of claim 22, wherein the oxidants are selected from the group consisting of oxygen, ozone, hydrogen peroxide, and nitric acid.

* * * * *